(12) United States Patent
Wang et al.

(10) Patent No.: US 9,942,798 B2
(45) Date of Patent: *Apr. 10, 2018

(54) METHOD AND SYSTEM FOR EFFICIENT COMMUNICATION

(71) Applicants: Tiejun Wang, Alexandria, VA (US); Tiehong Wang, Alexandria, VA (US)

(72) Inventors: Tiejun Wang, Alexandria, VA (US); Tiehong Wang, Alexandria, VA (US)

(73) Assignee: Virginia Innovation Sciences, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,439

(22) Filed: Mar. 15, 2016

(65) Prior Publication Data

US 2016/0198363 A1 Jul. 7, 2016

Related U.S. Application Data

(63) Continuation of application No. 13/833,328, filed on Mar. 15, 2013, now abandoned, which is a
(Continued)

(51) Int. Cl.
*G06F 9/46* (2006.01)
*H04L 25/20* (2006.01)
(Continued)

(52) U.S. Cl.
CPC .............. *H04W 28/06* (2013.01); *H04L 25/20* (2013.01); *H04L 65/4069* (2013.01);
(Continued)

(58) Field of Classification Search
None
See application file for complete search history.

(56) References Cited

U.S. PATENT DOCUMENTS

| 4,740,963 A | 4/1988 | Eckley |
| 5,610,971 A | 3/1997 | Vandivier |

(Continued)

FOREIGN PATENT DOCUMENTS

| CN | 1332417 A | 1/2002 |
| CN | 1365241 A | 8/2002 |

(Continued)

OTHER PUBLICATIONS

Notification of Transmittal of the International Search Report and the Written Opinion of the International Searching Authority, or the Declaration; International Application No. PCT/US05/25284; Filing Date: Jul. 15, 2005.

(Continued)

*Primary Examiner* — Wynuel Aquino

(57) ABSTRACT

Methods and apparatus for efficiently directing communications are disclosed. On example entails receiving, from a mobile terminal, a communication directed to a cellular communication network, the communication being received in an alternative channel that differs from a channel of the cellular communication network. The communication is then converted for a relayed communication to the cellular communication network on behalf of the mobile terminal, the relayed communication being made through the cellular communication network.

98 Claims, 33 Drawing Sheets

Related U.S. Application Data continuation-in-part of application No. 13/537,418, filed on Jun. 29, 2012, now Pat. No. 8,843,931, which is a continuation of application No. 12/926,716, filed on Dec. 7, 2010, now Pat. No. 8,285,211, which is a continuation of application No. 12/684,377, filed on Jan. 8, 2010, now Pat. No. 7,983,616, which is a continuation of application No. 11/540,637, filed on Oct. 2, 2006, now Pat. No. 7,647,024, said application No. 13/833,328 is a continuation-in-part of application No. 13/495,890, filed on Jun. 13, 2012, now Pat. No. 8,417,290, which is a continuation of application No. 13/397,156, filed on Feb. 15, 2012, now Pat. No. 8,224,381, which is a continuation of application No. 13/268,001, filed on Oct. 7, 2011, now Pat. No. 8,145,268, which is a continuation of application No. 12/929,408, filed on Jan. 21, 2011, now Pat. No. 8,050,711, which is a continuation of application No. 11/165,341, filed on Jun. 24, 2005, now Pat. No. 7,899,492, said application No. 13/833,328 is a continuation-in-part of application No. 13/370,483, filed on Feb. 10, 2012, now Pat. No. 8,805,358, which is a continuation of application No. 13/067,079, filed on May 6, 2011, now Pat. No. 8,135,398, which is a continuation of application No. 11/802,418, filed on May 22, 2007, now Pat. No. 7,957,733, which is a continuation-in-part of application No. 11/501,747, filed on Aug. 10, 2006, now Pat. No. 7,603,131.

(60) Provisional application No. 60/832,962, filed on Jul. 25, 2006, provisional application No. 60/787,510, filed on Mar. 31, 2006, provisional application No. 60/722,444, filed on Oct. 3, 2005, provisional application No. 60/588,358, filed on Jul. 16, 2004, provisional application No. 60/707,561, filed on Aug. 12, 2005.

(51) Int. Cl.
| | | |
|---|---|---|
| *H04L 29/08* | (2006.01) | |
| *H04W 4/02* | (2018.01) | |
| *H04W 28/06* | (2009.01) | |
| *H04W 84/04* | (2009.01) | |
| *H04L 29/06* | (2006.01) | |

(52) U.S. Cl.
CPC .............. *H04L 67/18* (2013.01); *H04L 67/22* (2013.01); *H04W 4/028* (2013.01); *H04W 84/047* (2013.01)

(56) References Cited

U.S. PATENT DOCUMENTS

| | | | |
|---|---|---|---|
| 5,680,295 A * | 10/1997 | Le | G06F 1/20 165/80.3 |
| 5,706,290 A | 1/1998 | Shaw | |
| 5,715,399 A | 2/1998 | Bezos | |
| 5,745,565 A | 4/1998 | Wakefield | |
| 5,784,683 A | 7/1998 | Sistanizadeh | |
| 5,822,737 A | 10/1998 | Ogram | |
| 5,880,732 A | 3/1999 | Tryding | |
| 5,889,863 A | 3/1999 | Weber | |
| 5,917,475 A | 6/1999 | Kuzunuki | |
| 5,990,882 A | 11/1999 | Heinonen | |
| 6,037,981 A | 3/2000 | Wilson | |
| 6,084,638 A | 7/2000 | Hare | |
| 6,128,509 A | 10/2000 | Veijola et al. | |
| 6,169,789 B1 | 1/2001 | Rao | |
| 6,181,954 B1 | 1/2001 | Monroe et al. | |
| 6,275,333 B1 | 8/2001 | Shaffer | |
| 6,317,082 B1 | 11/2001 | Bacon | |
| 6,349,223 B1 | 2/2002 | Chen | |
| 6,349,324 B1 | 2/2002 | Tokoro | |
| 6,404,763 B1 | 6/2002 | Renucci et al. | |
| 6,418,416 B1 | 7/2002 | Rosenberg | |
| 6,452,626 B1 | 9/2002 | Adair | |
| 6,484,042 B1 | 11/2002 | Loke | |
| 6,505,171 B1 | 1/2003 | Cohen | |
| 6,546,263 B1 | 4/2003 | Petty et al. | |
| 6,555,995 B2 | 4/2003 | Shih | |
| 6,593,860 B2 | 7/2003 | Lai | |
| 6,594,143 B2 | 7/2003 | Yana | |
| 6,614,470 B1 | 9/2003 | Manowitz | |
| 6,628,963 B1 | 9/2003 | Chung | |
| 6,690,417 B1 | 2/2004 | Yoshida et al. | |
| 6,705,990 B1 | 3/2004 | Gallant | |
| 6,718,182 B1 | 4/2004 | Kung | |
| 6,753,881 B1 | 6/2004 | Callway | |
| 6,763,226 B1 | 7/2004 | McZeal, Jr. | |
| 6,781,635 B1 | 8/2004 | Takeda | |
| 6,795,715 B1 | 9/2004 | Kubo | |
| 6,799,085 B1 * | 9/2004 | Crisp, III | B67D 1/0057 222/146.6 |
| 6,829,648 B1 | 12/2004 | Jones | |
| 6,859,358 B2 | 2/2005 | Baldwin et al. | |
| 6,871,243 B2 | 3/2005 | Iwase | |
| 6,873,853 B2 | 3/2005 | Kim | |
| 6,907,276 B2 | 6/2005 | Toba | |
| 6,943,682 B1 * | 9/2005 | Dowens | G08B 13/22 340/506 |
| 6,947,067 B2 | 9/2005 | Halttunen | |
| 6,950,624 B2 | 9/2005 | Kim | |
| 6,970,127 B2 | 11/2005 | Rakib | |
| 7,010,551 B2 | 3/2006 | Terayama | |
| 7,023,572 B2 | 4/2006 | Tuli | |
| 7,024,601 B2 | 4/2006 | Quinlan | |
| 7,027,768 B2 | 4/2006 | Hill | |
| 7,076,523 B2 | 7/2006 | Schneider | |
| 7,102,591 B2 | 9/2006 | Shih | |
| 7,102,691 B2 | 9/2006 | Dischert | |
| 7,130,616 B2 | 10/2006 | Janik | |
| 7,130,618 B2 | 10/2006 | Yokoyama | |
| 7,142,847 B2 | 11/2006 | Umeda | |
| 7,202,885 B2 | 4/2007 | Motohashi | |
| 7,209,874 B2 | 4/2007 | Salmonsen | |
| 7,239,323 B2 | 7/2007 | Park | |
| 7,248,888 B2 | 7/2007 | Inselberg | |
| 7,257,202 B2 | 8/2007 | Umemura et al. | |
| 7,258,276 B2 | 8/2007 | Linton | |
| 7,286,651 B1 | 10/2007 | Packingham | |
| 7,292,588 B2 | 11/2007 | Milley | |
| 7,295,608 B2 | 11/2007 | Reynolds | |
| 7,299,009 B2 | 11/2007 | Hussmann | |
| 7,301,900 B1 * | 11/2007 | Laksono | H04L 12/2856 370/230 |
| 7,312,813 B1 | 12/2007 | Heinonen | |
| 7,349,689 B2 | 3/2008 | Chandley | |
| 7,360,085 B2 | 4/2008 | Loveria, III | |
| 7,377,440 B2 | 5/2008 | Casey | |
| 7,426,329 B2 | 9/2008 | Calhoon | |
| 7,434,166 B2 | 10/2008 | Acharya | |
| 7,480,484 B2 | 1/2009 | Nam | |
| 7,490,171 B2 | 2/2009 | Saint-Hilaire | |
| 7,505,889 B2 | 3/2009 | Salmonsen | |
| 7,561,848 B2 | 7/2009 | Chen | |
| 7,562,379 B2 | 7/2009 | Hardacker | |
| 7,574,514 B2 | 8/2009 | Deshpande | |
| 7,580,005 B1 | 8/2009 | Palin | |
| 7,596,188 B2 | 9/2009 | Gotanda | |
| 7,613,893 B2 | 11/2009 | Saint-Hilaire | |
| 7,653,344 B1 | 1/2010 | Feldman | |
| 7,653,685 B2 | 1/2010 | Serenyi | |
| 7,730,223 B1 | 6/2010 | Bavor | |
| 7,784,077 B2 | 8/2010 | Fernandez | |
| 7,797,242 B2 | 9/2010 | Gautier | |
| 7,797,633 B2 | 9/2010 | Flick | |
| 7,877,299 B2 | 1/2011 | Bui | |
| 7,892,014 B2 | 2/2011 | Amidon | |
| 7,933,290 B2 | 4/2011 | Aholainen | |

(56) References Cited

U.S. PATENT DOCUMENTS

| | | |
|---|---|---|
| 8,028,093 B2 | 9/2011 | Karaoguz |
| 8,036,265 B1 | 10/2011 | Reynolds |
| 8,082,572 B1 | 12/2011 | Tilford |
| 8,131,208 B2 | 3/2012 | Slotznick |
| 8,205,235 B2 | 6/2012 | Hlasney |
| 8,321,302 B2 | 11/2012 | Bauer |
| 8,707,373 B2 | 4/2014 | Lee |
| 2001/0021998 A1 | 9/2001 | Margulis |
| 2001/0034724 A1 | 10/2001 | Thieme |
| 2001/0047517 A1 | 11/2001 | Christopoulos |
| 2002/0002707 A1 | 1/2002 | Ekel |
| 2002/0057265 A1 | 5/2002 | Tamura |
| 2002/0058530 A1* | 5/2002 | Akama ............... H04M 1/725 455/553.1 |
| 2002/0059410 A1* | 5/2002 | Hara ................... H04L 43/00 709/223 |
| 2002/0066115 A1 | 5/2002 | Wendelrup |
| 2002/0078149 A1 | 6/2002 | Chang |
| 2002/0080091 A1 | 6/2002 | Shrikant |
| 2002/0089589 A1 | 7/2002 | Adair |
| 2002/0090980 A1 | 7/2002 | Wilcox et al. |
| 2002/0092025 A1 | 7/2002 | Klumpp |
| 2002/0094826 A1 | 7/2002 | Lee |
| 2002/0094845 A1 | 7/2002 | Inasaka |
| 2002/0100063 A1 | 7/2002 | Herigstad |
| 2002/0101856 A1* | 8/2002 | Beeler ............... H04L 12/2602 370/352 |
| 2002/0102998 A1 | 8/2002 | Lin |
| 2002/0118762 A1 | 8/2002 | Shakiba |
| 2002/0119800 A1 | 8/2002 | Jaggers |
| 2002/0137505 A1 | 9/2002 | Eiche et al. |
| 2002/0137551 A1 | 9/2002 | Toba |
| 2002/0157112 A1 | 10/2002 | Kuhn |
| 2002/0180581 A1* | 12/2002 | Kamiwada ......... H04L 12/2803 340/5.2 |
| 2003/0001437 A1* | 1/2003 | Testin ................. H02M 1/00 307/98 |
| 2003/0017846 A1 | 1/2003 | Estevez |
| 2003/0027517 A1 | 2/2003 | Callway |
| 2003/0054794 A1 | 3/2003 | Zhang |
| 2003/0062997 A1* | 4/2003 | Naidoo ............ G08B 13/19656 340/531 |
| 2003/0083058 A1* | 5/2003 | Mayer .................. H04B 1/3838 455/422.1 |
| 2003/0104806 A1 | 6/2003 | Ruef et al. |
| 2003/0106067 A1 | 6/2003 | Hoskins |
| 2003/0115339 A1* | 6/2003 | Hodoshima ......... H04W 28/18 709/228 |
| 2003/0126293 A1 | 7/2003 | Bushey |
| 2003/0128197 A1 | 7/2003 | Turner |
| 2003/0130009 A1 | 7/2003 | Kung |
| 2003/0133024 A1 | 7/2003 | Shinji |
| 2003/0137609 A1 | 7/2003 | Hayakawa |
| 2003/0191849 A1* | 10/2003 | Leong ............... G06F 17/30073 709/229 |
| 2003/0220074 A1* | 11/2003 | Wee .................... H04W 88/04 455/11.1 |
| 2003/0226149 A1 | 12/2003 | Chun |
| 2003/0229900 A1 | 12/2003 | Reisman |
| 2003/0233034 A1* | 12/2003 | Varri ................... A61B 5/1102 600/301 |
| 2004/0015398 A1* | 1/2004 | Hayward ............. G06Q 30/02 705/14.49 |
| 2004/0033821 A1 | 2/2004 | Slesak |
| 2004/0046783 A1 | 3/2004 | Montebovi |
| 2004/0049797 A1 | 3/2004 | Salmonsen |
| 2004/0056985 A1 | 3/2004 | Scong |
| 2004/0057199 A1 | 3/2004 | Azuchi |
| 2004/0063456 A1 | 4/2004 | Griffin |
| 2004/0068583 A1* | 4/2004 | Monroe ............... H04N 1/32128 709/246 |
| 2004/0078219 A1 | 4/2004 | Kaylor |
| 2004/0090466 A1 | 5/2004 | Loveria |
| 2004/0098463 A1 | 5/2004 | Shen |
| 2004/0098515 A1* | 5/2004 | Rezvani ................. G06F 21/31 713/375 |
| 2004/0109061 A1* | 6/2004 | Walker ................. G06Q 30/06 348/152 |
| 2004/0125136 A1 | 7/2004 | Wallenius |
| 2004/0131336 A1* | 7/2004 | Matsuno .............. G11B 27/034 386/247 |
| 2004/0142724 A1 | 7/2004 | Buttet |
| 2004/0150713 A1 | 8/2004 | Cheng |
| 2004/0157642 A1 | 8/2004 | Lee et al. |
| 2004/0158873 A1 | 8/2004 | Pasqualino |
| 2004/0163073 A1* | 8/2004 | Krzyzanowski .... H04L 12/2803 717/107 |
| 2004/0176032 A1* | 9/2004 | Kotola ................. G06K 7/0008 455/41.2 |
| 2004/0177376 A1 | 9/2004 | Caspi et al. |
| 2004/0179580 A1* | 9/2004 | Yamaguchi ......... H04B 1/71632 375/141 |
| 2004/0181818 A1* | 9/2004 | Heyner .................. H04H 20/38 725/146 |
| 2004/0187158 A1* | 9/2004 | Fellenstein ........ H04N 7/17318 725/86 |
| 2004/0199763 A1* | 10/2004 | Freund .................. G06F 21/53 713/154 |
| 2004/0203374 A1 | 10/2004 | Zilliacus |
| 2004/0204151 A1 | 10/2004 | Muthuswamy |
| 2004/0207719 A1 | 10/2004 | Tervo |
| 2004/0212731 A1 | 10/2004 | Sie et al. |
| 2004/0223614 A1 | 11/2004 | Seaman |
| 2004/0243517 A1 | 12/2004 | Hansen |
| 2004/0252965 A1 | 12/2004 | Moreno |
| 2004/0254649 A1* | 12/2004 | Huang ............... G05B 19/0423 700/2 |
| 2004/0256474 A1* | 12/2004 | Park .................... F24F 11/001 236/51 |
| 2004/0268408 A1 | 12/2004 | Lee |
| 2005/0024208 A1* | 2/2005 | Maki .................. G08B 13/2497 340/545.3 |
| 2005/0024484 A1* | 2/2005 | Leonard ................. H04N 7/15 348/14.01 |
| 2005/0036509 A1 | 2/2005 | Acharya et al. |
| 2005/0060246 A1 | 3/2005 | Lastinger |
| 2005/0073608 A1* | 4/2005 | Stone ..................... H04N 7/08 348/468 |
| 2005/0074066 A1* | 4/2005 | Forse .................. H04N 21/8153 375/240.26 |
| 2005/0075954 A1 | 4/2005 | Matsumoto |
| 2005/0085183 A1 | 4/2005 | Lee |
| 2005/0086300 A1* | 4/2005 | Yeager ................... G06F 9/544 709/204 |
| 2005/0088463 A1 | 4/2005 | Schilling |
| 2005/0100166 A1* | 5/2005 | Smetters ............. H04L 63/0492 380/277 |
| 2005/0101343 A1 | 5/2005 | Hsiao |
| 2005/0120383 A1* | 6/2005 | Ozaki ..................... H04N 7/163 725/131 |
| 2005/0125082 A1 | 6/2005 | Hanson |
| 2005/0136972 A1 | 6/2005 | Smith |
| 2005/0138470 A1* | 6/2005 | Cromer ............... G06F 11/2294 714/22 |
| 2005/0144641 A1 | 6/2005 | Lewis |
| 2005/0188407 A1 | 8/2005 | van Beek |
| 2005/0235048 A1 | 10/2005 | Costa-Requena |
| 2005/0242948 A1* | 11/2005 | Tarr .................... G08B 25/009 340/539.22 |
| 2005/0264704 A1 | 12/2005 | Leinonen |
| 2005/0289631 A1 | 12/2005 | Shoemake |
| 2006/0001737 A1 | 1/2006 | Dawson et al. |
| 2006/0074810 A1 | 4/2006 | Verberkt |
| 2006/0112414 A1 | 5/2006 | Ikonen |
| 2006/0164550 A1 | 7/2006 | Yoshimoto |
| 2006/0218482 A1 | 9/2006 | Ralston |
| 2006/0236350 A1* | 10/2006 | Fifield ................... H04H 20/42 725/81 |
| 2007/0218837 A1 | 9/2007 | Lessing |
| 2007/0287498 A1 | 12/2007 | Wang et al. |
| 2008/0132859 A1 | 6/2008 | Pires |

(56) References Cited

U.S. PATENT DOCUMENTS

| | | | |
|---|---|---|---|
| 2009/0225863 | A1 | 9/2009 | Perlman |
| 2010/0097030 | A1* | 4/2010 | Kim ..................... G06F 1/266 |
| | | | 320/106 |
| 2010/0109795 | A1 | 5/2010 | Jones |
| 2011/0191480 | A1* | 8/2011 | Kobayashi ............ H01R 11/00 |
| | | | 709/227 |
| 2011/0212687 | A1 | 9/2011 | Foster |
| 2011/0212688 | A1 | 9/2011 | Griffin |

FOREIGN PATENT DOCUMENTS

| | | |
|---|---|---|
| CN | 1366758 A | 8/2002 |
| CN | 1367564 A | 9/2002 |
| CN | 1378133 A | 11/2002 |
| CN | 1401195 A | 3/2003 |
| CN | 1325592 A | 5/2004 |
| CN | 1363173 A | 8/2007 |
| EA | 1429511 | 6/2004 |
| EP | 1076445 | 2/2001 |
| EP | 1175068 | 1/2002 |
| EP | 1307062 | 5/2003 |
| GB | 2364478 | 1/2002 |
| GB | 2366954 | 3/2002 |
| GB | 2369959 | 6/2002 |
| GB | 2383728 | 7/2003 |
| JP | H6-113235 | 4/1994 |
| JP | 1999-284757 | 10/1999 |
| JP | 2001-352373 A | 12/2001 |
| JP | 2002-101457 | 4/2002 |
| JP | 2002-108736 | 4/2002 |
| JP | 2002-101457 | 12/2002 |
| JP | 2002-359670 | 12/2002 |
| JP | 2003-023548 | 1/2003 |
| JP | 2003-061163 | 2/2003 |
| JP | 2003-198960 | 7/2003 |
| JP | 2003-339041 | 11/2003 |
| JP | 2004-064734 | 2/2004 |
| KR | 2002-0014251 | 2/2002 |
| KR | 10-2004-0004307 | 1/2004 |
| KR | 20030092820 20031218 | 1/2004 |
| KR | 20040004307 A | 1/2004 |
| KR | 10-2004-0027996 | 4/2004 |
| WO | WO1999010999 | 3/1999 |
| WO | WO-1999-057900 | 11/1999 |
| WO | WO2000018054 | 3/2000 |
| WO | WO-2001-028235 | 4/2001 |
| WO | WO-2001-056297 | 8/2001 |
| WO | WO2004082284 A1 | 11/2001 |
| WO | WO-2002-032074 | 4/2002 |
| WO | WO-02/45424 | 6/2002 |
| WO | WO-2002-101457 | 12/2002 |
| WO | WO-03/077550 | 9/2003 |
| WO | WO-2003-087961 | 10/2003 |
| WO | WO2004025959 | 3/2004 |
| WO | WO2004082284 | 9/2004 |

OTHER PUBLICATIONS

Digital Display Working Group, Digital Video Interface (DVI) Spec. Rev. 1.0 (Apr. 2, 1999).
Wireless Application Protocol Forum, WAP MMS Client Transactions Version 12 (Jun. 12, 2001).
A. Bertella, et al., Mobile DVB-T Reception Quality of Streaming over IP of Audiovisual Services (Jun. 18, 2003).
Amoolya Singh et al., Performance Evaluation of UDP Lite for Cellular Video (Jun. 26, 2001).
Consumer Electronics Association, CES 2004, 5 Technologies to Watch, Special Supplement to CE Vision Magazine (2004).
N. Gerfelder, H. Jung, L.M. Santos, C. Belz, Challenges to Deliver 2D/3D Content for Multimedia Applications in Mobile Environments, ACTS Mobile Communications Summit 1998, Rhodos (1998).
Panasonic CES 2004 Keynote Presentation (Jan. 8, 2004).
Patrick Barwise, TV, PC, or Mobile? Future Media for Consumer e-Commerce, Business Strategy Review v12, issue 1 (2001).
Microsoft Press Release, Microsoft Unveils New Home PC Experiences With Freestyle and Mira (Jan. 7, 2002).
Francisco J. Gonzáles-Castaño et al., QoS Provisioning in Mobile Video Services with Satellite Sources, Proceedings of 2nd Int'l Workshop of Cost Actions (2003), at 55-59.
Emilia Bielli, et al., A Wireless Health Outcomes Monitoring System (WHOMS): development and field testing with cancer patients using mobile phones (Jun. 15, 2004).
Digital Entertainment in the Home, The Home Computer & Connectivity, Parks Associates (2004).
Derek Ball, Barry Shilmover, How to Do Everything With Your iPAQ Pocket PC (Second Ed. 2003).
Richard Han, et al., WebSplitter: A Unified XML Framework for Multi-Device Collaborative Web Browsing, CSCW (Dec. 2, 2000) ("Han, WebSplitter").
Takayuki Warabino, Video Transcoding Proxy for 3G wireless Mobile Internet Access, IEEE 0163-6804/00 (2000) ("Warabino").
Teresa H. Meng, Portable video-on-demand in wireless communication, 0018-9219/95 (Apr. 1995) ("Meng, Portable Video-On-Demand").
Thai-Lai Pham, Georg Schneider, Stuart Goose, Arturo Pizano, Siemens Corporate Research, Composite Device Computing Environment: A Framework for Augmenting the PDA Using Surrounding Resources (Jun. 2000) ("Pham, Composite Device Computing Environment").
Thai-Lai Pham, Georg Schneider, and Stuart Goose, Siemens Corporate Research, Exploiting Location-Based Composite Devices to Support and Facilitate Situated Ubiquitous Computing (2000).
Thomas E. Truman, et al., The InfoPad Multimedia Terminal: A Portable Device for Wireless Information Access, 47 IEEE Transactions on Computers 10 (Oct. 1998) ("Truman").
Yamauchi, A 1440X1080 Pixels 30 Frames/s Motion-JPEG2000 Codec for HD Movie Transmission, IEEE 0-7803-8267-6/04 (2004).
Wai Yip Lum, A Context-Aware Decision Engine for Content Adaptation, Pervasive Computing, IEEE 1536-1268/02 (Sep. 2002) ("Lum, Decision Engine for Content Adaptation").
Xueyan Tang et al., Streaming Media Caching Algorithms for Transcoding Proxies, Proceeding of the Int'l Conference on Parallel Processing (ICPP '02), 0-7695-1677-7/02 (2002).
Ralf Schäfer et al., MPEG-4 Transmission Over Wireless Networks, Proceeding of 9th European Signal Processing Conference (EUSIPCO) (Sep. 1998), at 245-248.
Stephan Hartwig et al., Mobile Multimedia—Challenges and Opportunities, 46 IEEE Transactions on Consumer Electronics 4 (Nov. 2000), at 1167-1178.
Connection Manager:1; service Template Version 1.01; for universal plug and play version 1.0; status: standardized DCP; Jun. 25, 2002.
MbOS Overview; mediabolic, inc>Products>middleware>MbOS Overview.
Innovative devices for the home and car to free your MP3s! CED Dec. 1 2001, LexisNexis, Dec. 1, 2001.
HDMI events & press.
HP Wireless digital media receiver ew5000; the HP wireless digital media receiver ew50000 is easy to set up, fairly easy to use, and surpassed only by the prismiq mediaplayer in features, PC magazine J, LexisNexis Jul. 1, 2003.
Bluetooth wireless the specification.
UPnP Design by Example.
Toshiba Updates Updates Pocket PCs, by Tom Krazit, Oct. 23, 2003, Phones (/category/phones).
Intel tools for Upnp technologies license agreement.
Intel authoring tools for UPnP technologies.
Basic:1.0 Device definition version 1.0; for universal plug and play version 1.0 Dec. 12, 2002; UPnP basic: device template version 1.01 MediaRenderer:1 device template version 1.01 Jun. 25, 2002.
AVTransport:1 service template version 1.01, Jun. 25, 2002
Intel's Upnp tools package; Intel copyright 2002.
Popular science journey to the 10th dimension, Mar. 2004.

(56) References Cited

OTHER PUBLICATIONS

Intel News Release, Intel, industry leaders develop first standards-based products enabling premium content for the digital home.

\* cited by examiner

METHOD AND SYSTEM FOR EFFICIENT COMMUNICATION

CROSS REFERENCE TO RELATED APPLICATIONS

This application is a continuation-in-part of application Ser. No. 13/370,483, filed on Feb. 10, 2012, now U.S. Pat. No. 8,135,398, which is a continuation of application Ser. No. 13/067,079, now U.S. Pat. No. 8,135,398, which is a continuation of Ser. No. 11/802,418, now U.S. Pat. No. 7,957,733, which is a continuation-in-part of application Ser. No. 11/501,747, now U.S. Pat. No. 7,603,131, entitled "System and Method for providing Locally Applicable Internet Content with Secure Acton Requests and Item Condition Alert" and filed on Aug. 10, 2006, which claims priority to provisional Application Ser. No. 60/787,510, entitled "An Intelligent Kiosk for Mobile Payment" and filed on Mar. 31, 2006, and also claims the benefit of provisional Application Ser. No. 60/707,561, entitled "A Novel Structure of Cellular System or Internet Access" and filed on Aug. 12, 2005. The entire contents of these applications are hereby incorporated by reference.

As a continuation-in-part claiming priority to application Ser. No. 11/501,747, now U.S. Pat. No. 7,603,131, this application is also a continuation-in-part of application Ser. No. 11/165,341, now U.S. Pat. No. 7,899,492, filed on Jun. 24, 2005 and entitled "Methods, System, and Apparatus for Displaying the Multimedia Information from Wireless Communication Networks," which claims priority to provisional Application Ser. No. 60/588,358, filed on Jul. 16, 2004 and entitled "A Method and System for Displaying the Multimedia Information from Wireless Communications or Portable IT." The entire contents of these applications are also hereby incorporated by reference.

This application is also a continuation-in-part of application Ser. No. 13/573,418, (WAN-0007 chain of utility application ser. No. references), which is a continuation of application Ser. No. 11/540,637, filed on Oct. 2, 2006 and entitled "A Method and System for Improving Client Server Transmission over Fading Channel with Wireless Location and Authentication Technology via Electromagnetic Radiation", which claims priority to provisional Application Ser. Nos. 60/722,444 filed on Oct. 3, 2005, 60/787,510 filed on Mar. 31, 2006, and 60/832,962 flied on Jul. 25, 2006. The entire contents of these applications are also hereby incorporated by reference.

BACKGROUND OF THE INVENTION

1. Field of the Invention

This invention relates generally to providing systems and methods for efficient communication.

2. Description of the Related Art

Empowered by the next generation of wireless technology, cellular networks can provide users with access to information from the Internet such as video on demand, video conferences, databases, etc. The use of cellular phones is thus no longer limited to voice transmission.

However, there are still some problems with the delivery of Internet content through cellular phones. For example, even with the high bandwidth connection provided by advanced cellular Systems, there remains a bottleneck between the Internet and the cellular network (CN), as well as delays caused by the Internet itself. This condition hinders the ability of cellular phone users to fully exploit the capabilities of the advanced CN. Since smooth and effective data flow is important to users, this bottleneck hinders the adoption of cellular phones for Internet access.

Making payment requests is another area of need. Although more and more individuals have become accustomed to purchasing goods and services online, there is not a streamlined and consistent mechanism for securely making requests for such payments.

Still another area of need relates to alerts. Locations including homes, offices, and other environments typically include computing devices as well as at least some form of network connection. Despite all of this connectivity, there are certain conditions for which adequate alerts remain unavailable. For example, billions of children wear diapers, and probably a quarter of them may suffer the effects of wet diapers at any given moment, since caretakers (e.g., parents, baby sitters, etc.) are not apprised of the status of their diapers in real time.

Thus, there remains a need for Systems and corresponding devices and processes that avoid the shortcomings of existing networks for delivering Internet content using the CN. There also remains a need for Systems and corresponding techniques for making payment requests. There also remains a need for Systems and corresponding techniques for delivering alerts to individuals such as caregivers tasked with managing a child in diapers.

Handheld mobile terminals (e.g., cellular phones, personal digital assistants (PDA)) continue to evolve both in terms of execution platform and functionality. It is believed that the much of the functionality provided by a personal computer (e.g., desktop or laptop) will ultimately become virtually available in handheld mobile terminals, which will allow users to work with and access multimedia information any time and anywhere.

For example, one particularly appealing advantage of the next generation wireless communication system and beyond (i.e., 3G, 4G, etc.) is the capacity to support high rate multimedia data services as well as conventional voice services. In a conventional cellular system a mobile terminal communicates with a base station wirelessly. Multimedia information including but not limited to television, 3D images, network games, and video phone calls is transmitted from various service providers and received for display on the screen of a mobile terminal. The net result of such a system is rich multimedia information being destined for display on the small screens typical of cellular phones (or the like).

In these and similar Systems, the mobile terminal functions as a multimedia terminal to display multimedia information (including high-resolution graphics and high-quality real-time audio/video) sent from high data rate wireless communications network. The limited size (e.g., 2×3") and capability of the mobile terminal screen may render enjoyment of the high rate data flow applications inconvenient, and in some instances useless. One consequence of this inadequacy is likely shrinkage of the potential market size for handheld mobile terminals. Indeed, some have suggested that development of high data rate Systems such as 3G Systems may be pointless given the limitations imposed by the small screen.

Some mobile units appear to provide a remote control function to an external display system. However, these do not appear to solve the small screen problem outlined above. That is, they do not accommodate display on a larger, external display of video and other multimedia information originally destined for the mobile terminal display screen.

For example, one such interface accommodates usage of the mobile terminal as a remote control for a television, by feeding programming guide information to the mobile terminal. This is useful for allowing the programming guide to be viewed locally while the larger screen displays a current program, but does not address to the above-described small screen problem.

Still another issue is the various different devices that a user may have to engage in communications, as well as the various different vehicles for the enjoyment of content that the user now has. No longer does the typical user merely watch television. Instead, the user may use their home computer, television, MP3, PDA, cellular phone or various hybrid devices to enjoy content. This content also arrives from a variety of sources, not just broadcast television as in the past. While it may be desirable to have more options, some consumers may feel overwhelmed trying to manage everything.

Still another issue is presented with regard to a user's ability to use their mobile terminal efficiently, such as in conditions where direct communications with the user's assigned cellular communication may be unavailable or undesirable.

What is needed is a solution to the problem of diminished user enjoyment of the various devices and corresponding content that a user may enjoy due to the complications of trying to manage content and interface with a variety of different devices that are not necessarily compatible.

SUMMARY OF THE INVENTION

The present invention provides methods and apparatus for multimedia communications with different user terminals, delivering multimedia information to multiple user terminals concurrently, dynamically, and efficiently.

According to one aspect, methods and apparatus for efficiently directing communications are disclosed. On example entails receiving, from a mobile terminal, a communication directed to a cellular communication network, the communication being received in an alternative channel that differs from a channel of the cellular communication network. The communication is then converted for a relayed communication to the cellular communication network on behalf of the mobile terminal, the relayed communication being made through the cellular communication network.

According to another aspect, directing a television display from a mobile terminal such as a cellular phone is provided. This may entail receiving video content originated from the mobile terminal through a cellular communications channel, recognizing that the video content has a display destination of the television, configuring the video content for display on the television, and directing the television to display the video content at a predetermined tunable channel upon recognition that the received video content originates from the mobile terminal and has the display destination of the television. In addition, the communication between a mobile terminal and a television may be bidirectional.

According to another aspect, conversion and routing of content to devices that employ differing communication protocols is provided. This may entail receiving a multimedia content item originated from a source located outside a home location and destined for a destination device located within the home location, determining a communications protocol, a signal format and an address for the destination device, converting the first multimedia content item for reproduction by the destination device according to the determined signal format, and routing the converted multimedia content item to the destination device using the determined address and communications protocol. A plurality of user terminals may be served concurrently according to one embodiment of the present invention.

According to another aspect, bidirectional conversion and routing of content to differing devices is provided. This may entail receiving a first multimedia content item originated from a first device located outside a home location and destined for a second device located within the home location, converting the first multimedia content item for reproduction by the second device and routing the first converted multimedia content item to the second device, receiving a second multimedia content item originated from a third device located within the home location and destined for a fourth device located outside the home location, and converting the second multimedia content item for reproduction by the fourth device and routing the second converted multimedia content item to the fourth device. The third device can also be the second device and the fourth device can also be the first device.

According to another aspect, remotely receiving and accommodating completion of multimedia content requests from a plurality of content sources is provided. This may entail receiving a request to order access to a first multimedia content item and a second multimedia content item, wherein the request is received through a cellular communication with a user initiating the request using a mobile terminal, identifying a first source corresponding to the first multimedia content item and a second source corresponding to the second multimedia content item, wherein the first source and the second source implement different communications protocols, separately initiating communications with the first source and the second source using the different communications protocols to fulfill the request to order access to the first multimedia content item and the second multimedia content item, receiving the first multimedia content item and the second multimedia content item from the first source and the second source; and converting the first multimedia content item and the second multimedia content item for reproduction by a destination device and routing the converted multimedia content items to the destination device.

According to another aspect, a method for optimizing the delivery of content that is commonly requested by a plurality of users in a particular location is provided. This may entail monitoring network content requested by users corresponding to the particular location, receiving a request for a particular content item from a given user in the particular location, wherein the particular content item is ordinarily served from a location outside the particular location, determining that the particular content item is locally applicable where the particular content item is also requested by and converted for other users in the particular location, and concurrently serving the particular content item to the given user and the other users using a server that is logically proximate to users in the particular location, in lieu of separately serving the particular content item to the given user and the other users from locations outside the particular location.

The present invention can be embodied in various forms, including business processes, computer implemented methods, computer program products, computer Systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Internet content is requested and accessed by cellular users in correlation with their determined location. Provision of Internet content is customized according to location, and provided in a series of locally customized networks. A given local network includes servers configured to include content believed appropriate for its location. The delivery of content is made from a particular local network configured as such, to a user's cellular phone through the local base station.

For example, information about Hollywood may be accessed through cellular network base station(s) in the Hollywood area, when the cellular user is detected as being proximate to the Hollywood area. These base stations deliver Internet content that is relevant to the area, such as web sites about film and movie stars. This Internet content is stored in servers that the base stations covering the area can access conveniently to provide faster and more efficient transmission to the cellular users in the service area.

Optimizing the location of the Internet content for the wireless network users enables an optimum data flow for cellular users to access rich information and data of all kinds from the Internet.

Figure 1:
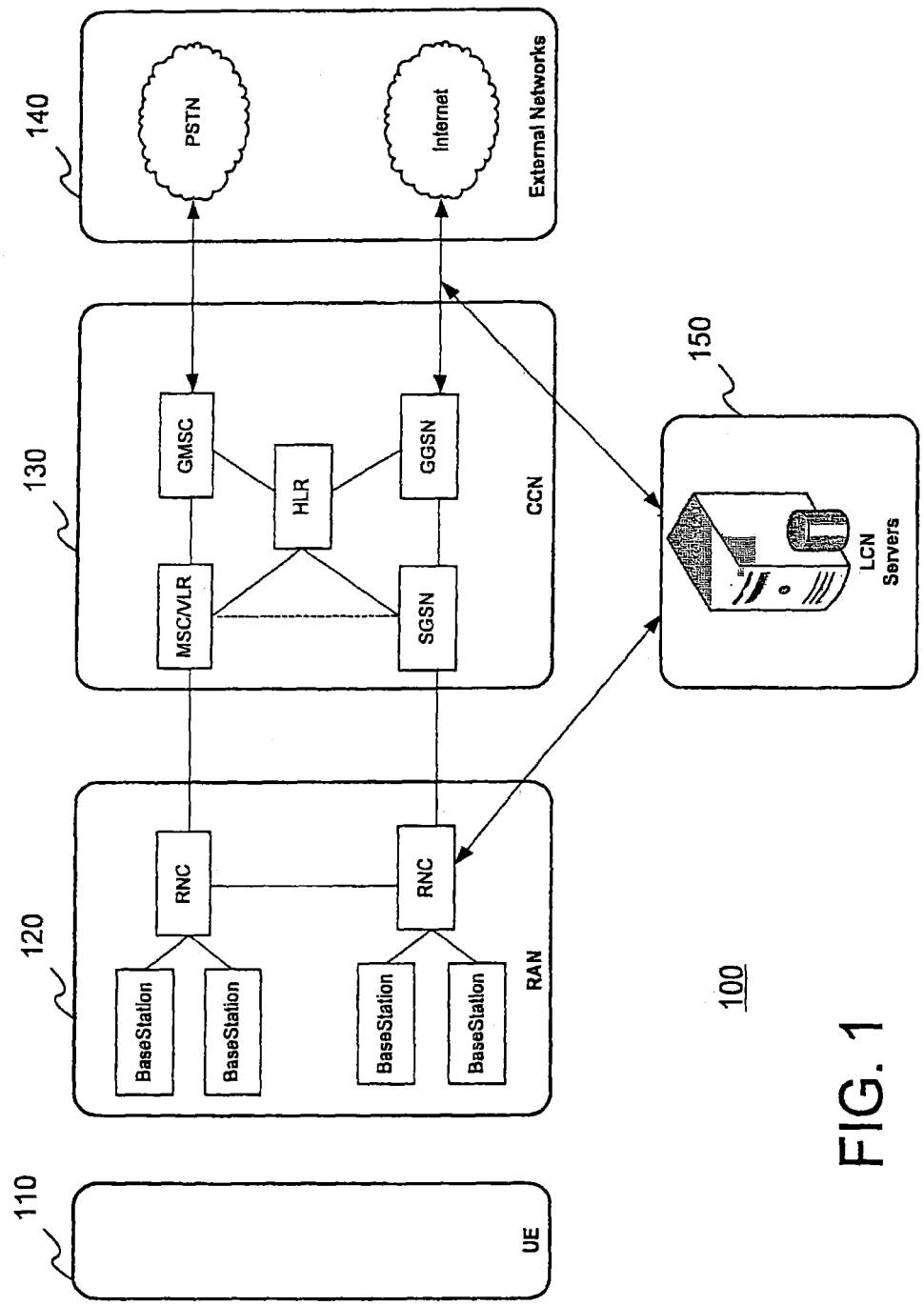
FIG. 1 is a block diagram illustrating a system for optimized delivery of Internet content to users.

FIG. 1 is a block diagram illustrating a system 100 configured to provide Internet content delivery in accordance with the present invention. The basic elements of the system 100 are the User Equipment (UE) 110, the Radio Access Network (RAN) 120, the Core Cellular Network (CCN) 130, the External Network (EN) 140, and the Local Customized Network (LCN) 150.

The UE 110 is a cellular phone configured to communicate with base station(s) of the RAN 120. Although the UE 110 is preferably a cellular phone, it should be understood that a variety of devices may be equipped with same communication functionality. Other examples of the UE 110 include a Personal Digital Assistant (PDA), Set Top Box, Kiosk, or any personal computing device configured to include the wireless communication capability.

The RAN 120 and CCN 130 preferably implement conventional elements of a cellular network and are described further as follows. The RAN 120 includes Base Station and Radio Network Controller (RNC) elements. The Base Station provides resource management and provides an interface that converts the data flow between the UE 110 and RNC. The RNC controls radio resources for the Base Stations to which it is connected, and also manages connections to the UE 110.

The CCN 130 is connected with the EN 140. The most notable examples of the EN 140 can be grouped into two kinds: Circuit Switched (CS) 142 networks and Packet Switched (PS) 144 networks. The CS 142 network provides circuit-switched connections for circuit-switched services, such as telephony and ISDN. The PS 144 network provides connections for package data services. The Internet is a significant and notable application of a PS network.

The CCN 130 comprises MSC/VLR, GMSC, HLR, SGSN and GGSN elements. The HLR (Home Location Register) is a database that stores information such as user service profiles. The service profile includes information including allowed services, roaming areas, forwarding numbers and the like. The HLR stores the UE 110 location to accommodate that routing of calls and other information to the UE 110.

The MSC/VLR (Mobile Services Switching Center and Visitor Location Register) respectively provide switch operations and a database for the UE in its current location for Circuit Switch (CS) services. The VLR stores the user's service profile, as well as more precise information on the UE's location within the serving system. CS connections go through the GMSC (Gateway MSC), which is the switch at the point of connection to the external CS network.

The SGSN (Serving GPRS (General Packet Radio Service) Support Node) functionality is similar to that of MSC/VLR but is typically used for Packet Switch (PS) service. PS connections go through the GGSN (Gateway GPRS Support Node).

The LCN 150 comprises one or more computing devices configured to include memory, processing capability, and interfaces to provide the functionality described herein. The LCN 150 includes local servers that are configured to provide custom Internet content. The LCN 150 is also configured to include a content access monitoring module, which monitors Internet access and determines content applicable to the designated location of the LCN 150.

The LCN 150 thus performs monitoring and caching related to locally applicable content. With regard to the monitoring functionality, the monitoring includes local access, which determines which content users in the location are accessing. With regard to the caching functionality, the LCN 150 maintains a cache of locally applicable Internet content, which includes refreshing to add new content and remove stale content as determined by information received from the monitoring functionality.

One technique for determining whether content is locally applicable is measuring access frequency. If many users in the location are determined to be accessing particular Internet content, then that particular Internet content is determined to be locally applicable and is included in the cache during the next update.

In addition to monitoring and caching locally applicable content, the LCN 150 is configured to be logically proximate to the base station(s) of the cellular network at the particular location. In one example, logical proximity is carried out by having the LCN 150 physically proximate to the relevant base station(s), such as in the same geographical area. For example, the LCN 150 may be located in a metropolitan area or within an area the covers certain zip code(s) of a metropolitan area. Logical proximity may alternatively be carried out without requiring physical proximity. This, for example, may be done by providing dedicated resources including a high bandwidth connection between the LCN 150 and the local users. In this example, the LCN 150 is configured to deliver locally applicable content more efficiently and rapidly because of the dedicated resources, without necessarily requiring physical proximity.

According to another aspect, to further increase efficiency, the locally applicable content for a given LCN is organized in a layered architecture. A "first layer" of content is considered to be the content that has the highest local applicability. Additional layers are also provided upon the first layer, with succeeding layers progressively covering larger geographical areas (i.e., progressively larger numbers of base stations). According to one aspect, the layering involves communication with neighboring LCNs covering increasing areas, to determine the content that is locally applicable for the additional levels. Thus, for example, a first layer corresponds to locally applicable content at a first level of granularity (e.g., as monitored/determined only for the location of the LCN or a small local group of LCNs), a second layer corresponds to locally applicable content at a second level of granularity (e.g., the logical "AND" or intersection of content that is frequently accessed across a larger area as determined by the monitoring of access for several LCNs in the defined larger area, and so on.

Figure 2:
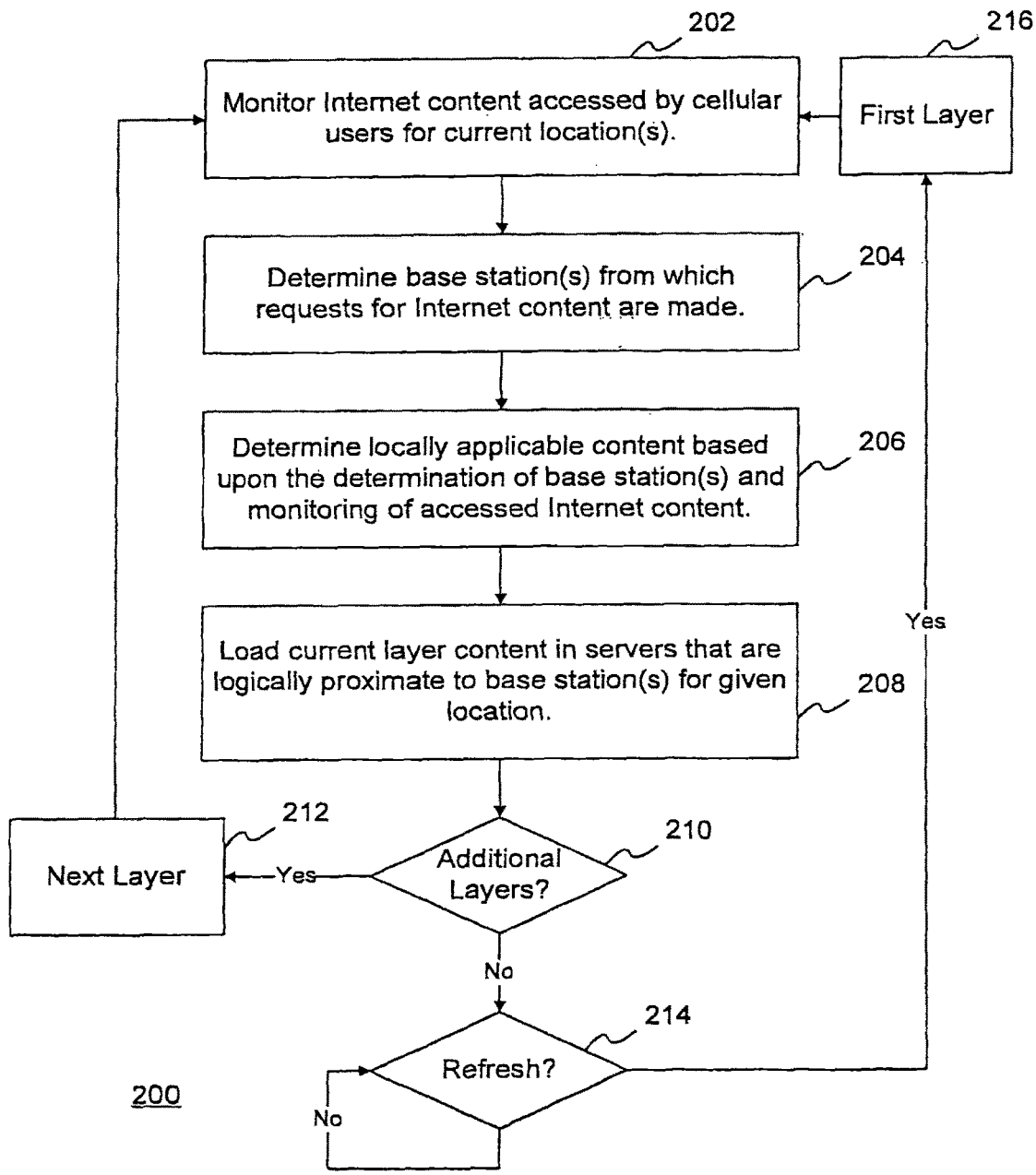
FIG. 2 is a flow diagram illustrating an embodiment of a process for determining locally applicable content for optimized content delivery.

The operation of the system to update the LCN accordingly is described as follows, with concurrent reference to FIG. 1 and the flow diagram of FIG. 2. The process commences by monitoring 202 Internet content accessed by users for a current location. This is done by monitoring the gateway of the connection between the CCN 140 and PS 144 networks to track the Internet content accessed by the cellular users.

It is noted that the monitored content may have two useful purposes. One is to accommodate the delivery of locally applicable content, which may be determined by frequency of access for the given location. Another is to allow the providers of content (e.g., merchants or other commercial entities) to receive an indication which content is locally applicable. This allows the providers of content to assist or participate further in determining what is locally applicable. For example, a merchant provided with an indication of local applicability for certain content may wish to make advertisements, coupons, or the like available to the users in that domain.

In conjunction with this monitoring 202, determination(s) 204 of the base station(s) from which requests for the Internet content are made. This may be performed by checking the VLR and HLR to discover the base stations from which the requests for the Internet content are sent from through. It is noted that base station discovery is just one way that physical location may be determined. Other examples include but are not limited to using GPS, zip code, telephone number, and IP address information to make the determinations.

The next step comprises determining 206 locally applicable content based upon the monitoring 202 and determination(s) 204 of the base station(s). Determination of local applicability is performed by determining access frequency. Alternatively, local applicability may be determined by comparing the location of the requesting user (base station) to a location that is identified in association with the requested content.

Then, for the current (e.g., first) layer, the content is loaded 208 in servers that are logically proximate to users for the given location. This may be done by placing the current (e.g., first) layer server(s) loaded with the Internet content and/or other information/data to achieve an optimum and faster data transmission for the cellular users to access the data stored in the servers through the base stations. For example, the servers can be placed logically close to the base station through which the cellular users access the data stored in the server(s).

The process iterates through as many layers as desired. If it is determined 210 that additional layers are to be updated, then steps 202-208 are performed to load the next 212 (e.g., second) layer server(s) with locally applicable content. As described, this preferably entails a broader geographical area as the layers increase. The process continues until it is determined 210 that no more layers need to be determined and loaded. The number of layers in a given system will vary according to application, and as desired. Layering will typically involve a trade-off between maximizing locally available content and the processing resources required to generate and manage layers for progressively broader areas.

The content that is loaded into the base station(s) may be refreshed 214 on any desired schedule or trigger. For a refresh operation, the process described above repeats, starting again with the first layer. Content that is stale or otherwise determined to no longer be locally applicable may be removed, and of course new content may be added during a refresh cycle.

Additional servers may be added vertically and/or horizontally as desired. Vertically means that servers may be added at a given physical location to cover first, second, third, etc. layers. Horizontally refers to adding different sets of servers corresponding to different locations (i.e., one set for the first layer, a second set for the second layer, and so on).

A regular schedule or certain amount of activity can be used to trigger a refresh of the layering. The Internet content in the LCN 150 servers is modified according to the updated findings on the requests for the Internet content sent from the base stations. The Internet content stored in the servers is refreshed at a proper time, such as when the servers are not overwhelmed by the users accessing the contents.

The servers are thus loaded with the information for broadcast and/or multicast and/or any data to be accessed by the cellular users for an optimum transmission to the users in service areas.

The locally applicable content may be sent and delivered upon request to the users. Examples of communication pathways for sending the locally applicable Internet content include the relatively direct pathway through the RAN 120, the pathway through the CCN 130 and then the RAN 120, or others.

A variety of techniques may be used to implement the locally applicable content cached by the LCN 150 in conjunction with requests for Internet content by UE 110 (or other device) users. In one example, the UE 110 request for Internet content prompts an initial check for content in the locally applicable content, followed by conventional Internet access should the content prove to be absent from the locally applicable content that is currently cached. Additionally, based upon the layered approach described above, the first attempt to satisfy the request may be made from the first layer, followed by the second layer, and so on. The number of layers searched to respond to a particular request may vary as desired. When the number of layers designated to be searched for the current request is exhausted, conventional Internet access is used to retrieve content related to the request.

Various cache management and network optimization techniques may be used to manage the locally applicable content. For example, fully associative (FA), direct mapped (DM), and set associative (SA) mechanisms are examples of techniques that can be used to determine where a specific content can be stored on the server. Additionally, techniques to ensure block validity and to manage cache hits and misses can also be used. Random, LRU (Least Recently Used) and FIFO (First In First Out) block replacement schemes are among those that can be used to manage the blocks in the cache.

According to another aspect, the present invention facilitates a systematical solution for mobile payment (or the communication of other information, as well as the receipt of information such as alerts). Preferably, this aspect of the present invention implements a cellular network, a wireless personal area network (WPAN) and wireless identification technology. Various technologies may be used for these components, including but not limited to 3G technology for the cellular network; Zigbee, Bluetooth, or UWB technologies for the WPAN; and RFID (e.g., NFC) for the wireless identification technology.

Figure 3:
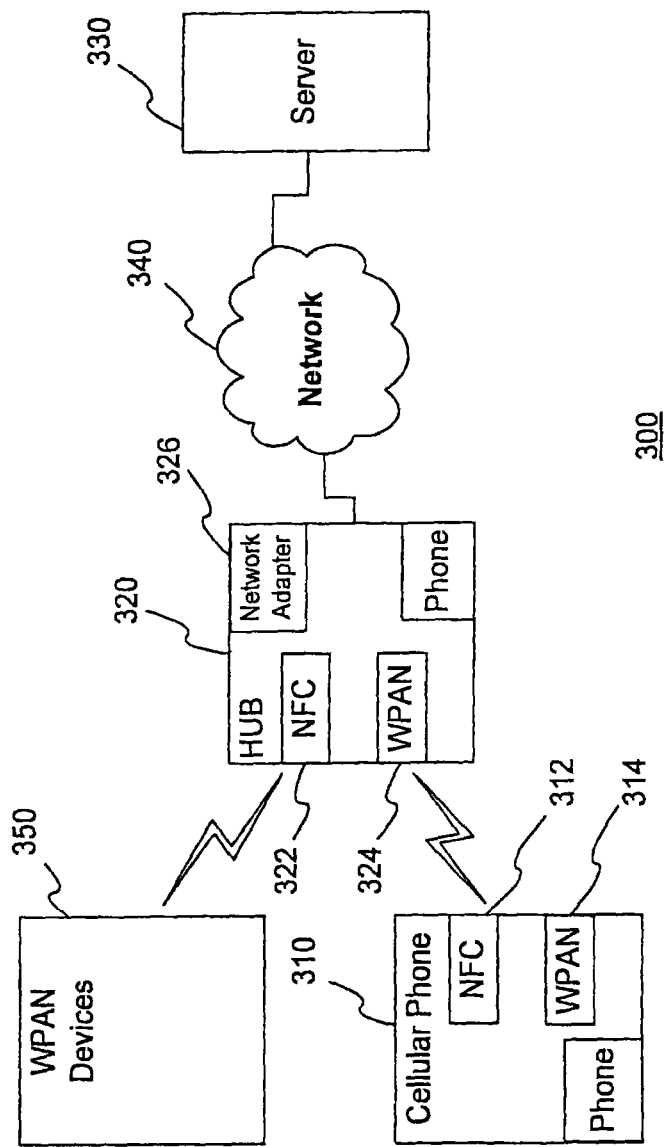
FIG. 3 is a block diagram illustrating a system for facilitating secure receipt and satisfaction of an action request such as a bill payment.

FIG. 3 illustrates an example of a system 300 that implements this aspect of the present invention. The system 300 includes a user equipment (e.g., cellular phone, PDA, etc.) 310 and wireless HUB 320, which is connected to servers 330 through a network 340, such as the Internet.

The wireless HUB (WHUB) 320 may be located in a public or private location. For a public location, the WHUB 320 is preferably housed in a kiosk. The kiosk may be located on a street, or in an airport, shopping mall, or any location that is perceived as convenient and likely to include user traffic. For private locations, the WHUB 320 is preferably configured for usage in locations like homes or hotel rooms. In these environments, the WHUB 320 may be provided in a smaller device such as part of a Set Top Box (STB).

The handset 310 is equipped with a tag that provides a unique identifier that can be wirelessly communicated to the WHUB 320. A preferred tag is a Near Field Communication (NFC) tag 312. NFC provides short-range wireless connectivity that uses magnetic field induction to enable communication between the devices. It has a short range of a few centimeters, which is believed to be advantageous for applications of this aspect of the present invention. Although NFC is preferred, RFID or other substitutes may also be provided. The handset 310 also includes a WPAN transceiver 314, which allows additional communication channel between the handset and the WHUB 320.

The wireless WHUB 320 is similarly equipped with an NFC reader 322, a WPAN transceiver 324 and a network adaptor 326. The NFC technology accommodates secure and automatic authentication and data exchange between the NFC tag and NFC reader. According to this aspect of the present invention, the NFC is uniquely associated with other information that allows the appropriate action (payment, alert, etc.) to take place. For example, where the system is being used to accommodate mobile payment, the RFID tag is associated with the user's bank account. Further, once the device is authenticated through the unique identifier, a second secure communication channel with more capabilities is established between the handset 310 and WHUB 320. This allows the action request and related communications to be reliably transmitted between the two devices.

Accordingly, once the NFC based authentication is accomplished, a secure wireless connection between the handset 310 and WHUB 320 is established. This communication can implement the WPAN transceiver, which has a higher data rate and longer operational range compared to NFC. The secure communication allows the exchange of additional information related to the action, such as price and credit card information for a purchase request and corresponding payment scenario, to be sent between the handset 310 and the WHUB 320. The secure communication can be implemented by hardware (e.g., a dedicated hardware chipset) and software (e.g., data encryption algorithm).

The WHUB 320 can also exchange data with other WPAN devices 350. It may be useful for the WHUB 320 to communicate with these devices 340 to exchange information related to the action. For example, the WHUB 320 may collect water usage information from a water meter equipped with the WPAN device 340 functionality. This data may be stored locally by the WHUB 320, or may be transmitted to the appropriate server 330 through the network connection 350. The data does not necessarily need to be collected by the WHUB 320 concurrently with the user-requested action. For example, the acquisition and transmission of water usage information may occur periodically, and separate from the user's request to make a corresponding payment.

It is also noted that the WHUB 320 may optionally be configured with a wireless communication capability such as that provided in a cellular phone. The WHUB 320 is thus configurable to operate with a system that delivers locally applicable Internet content as described above in connection with FIGS. 1 and 2.

Figure 4:
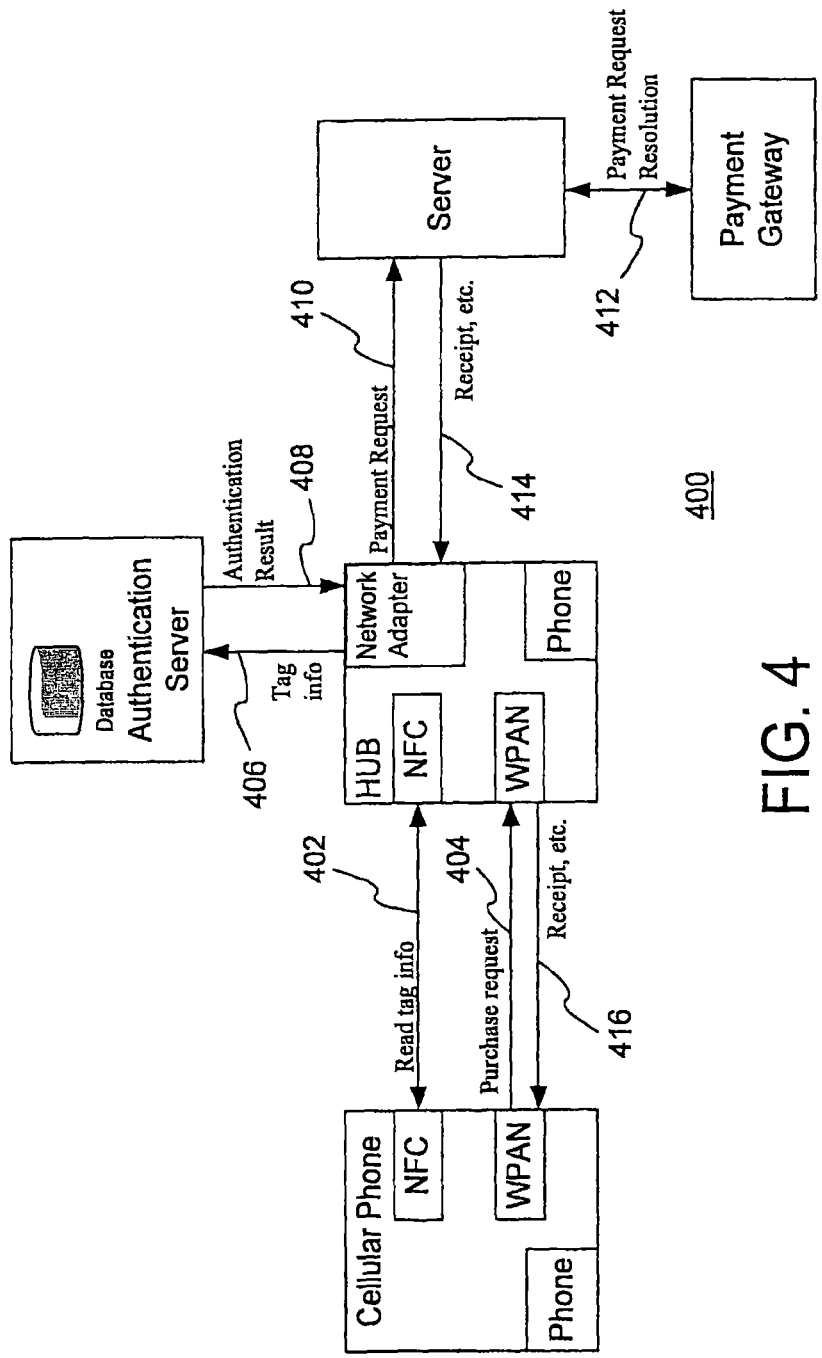
FIG. 4 is a block diagram illustrating an example of an action request process.

FIG. 4 further illustrates and provides an example of a payment process 400 in accordance with this aspect of the present invention. The process 400 initiates with an authentication 402 process that accommodates recognition and identification of the handset by the wireless WHUB via the NFC tag.

The communication through the separate secure communication channel (e.g., WPAN) is then established. The WPAN functionality is used to communicate between the handset and the WHUB, so that content related to a requested action may be securely exchanged. In this example, the requested action is a purchase request 404.

It should be noted that the action may or may not immediately follow authentication 402. For example, the cellular phone may be configured to include browsing capability, which allows that interface of the cellular phone to be used to review items prior to making a purchase request.

Various purchase types may be made with the purchase request. Examples may include a physical item that is separately shipped to an address, a download that is made available immediately, possibly to the cellular phone, a service, etc.

Internet content may be accessed by the cellular phone in association with an action request. One example of providing content to the cellular phone may be the locally applicable Internet content as described above in connection with FIGS. 1-2. Also, the cellular phone may access Internet content through channels other than through the WHUB.

It is also noted that a purchase request is just one form of an action that may be carried out. Actions include but are not limited to bill payment, populating an account with funds, online shopping transactions, and others.

The process of authentication may be based upon a Tag ID and password. The Tag ID and password are sent 406 to the authentication server, which then returns a notification 408 confirming authentication. Preferably, this authentication indicates whether the individual is who he or she claims to be, but does not address the access rights of the individual. The authentication server may reside within or outside the WHUB.

As necessary, additional information may also be required in association with a requested action. For example, account identification information or passwords to access an online account may be required by an external server. In these circumstances, the external server sends a request to the WHUB for the information. The WHUB may store such information and respond to such a request. Alternatively, the WHUB may further exchange information with the user (through the handset), in order to obtain the additional information requested by the external server.

In connection with the purchase request 404, a payment request 410 is made between the WHUB and external server through the network connection. The payment request 410 allows the user to complete the transaction related to the purchase request 404. To accommodate a satisfactory completion of the payment request, the server corresponds with a payment gateway, and a resolution 412 indicating whether the payment request succeeds or fails follows.

Upon an indication of a successful payment request, the WHUB receives 414 a receipt or confirmation number from the external server relating to the requested action, and passes 416 that and/or related information to the handset confirming completion of the action. This may be a receipt, confirmation numbers, coupon codes, or the like.

According to still another aspect, the present invention provides for wireless management of tasks and corresponding alerts. One such task is diaper management, which is described in detail as follows.

This aspect of the present invention accommodates task management based upon wireless delivery of alerts to overcome the problem of estimating when the task requires completion. These alert based tasks include but are not limited to diaper management. For example, home security monitoring may also be accommodated.

Figure 5:
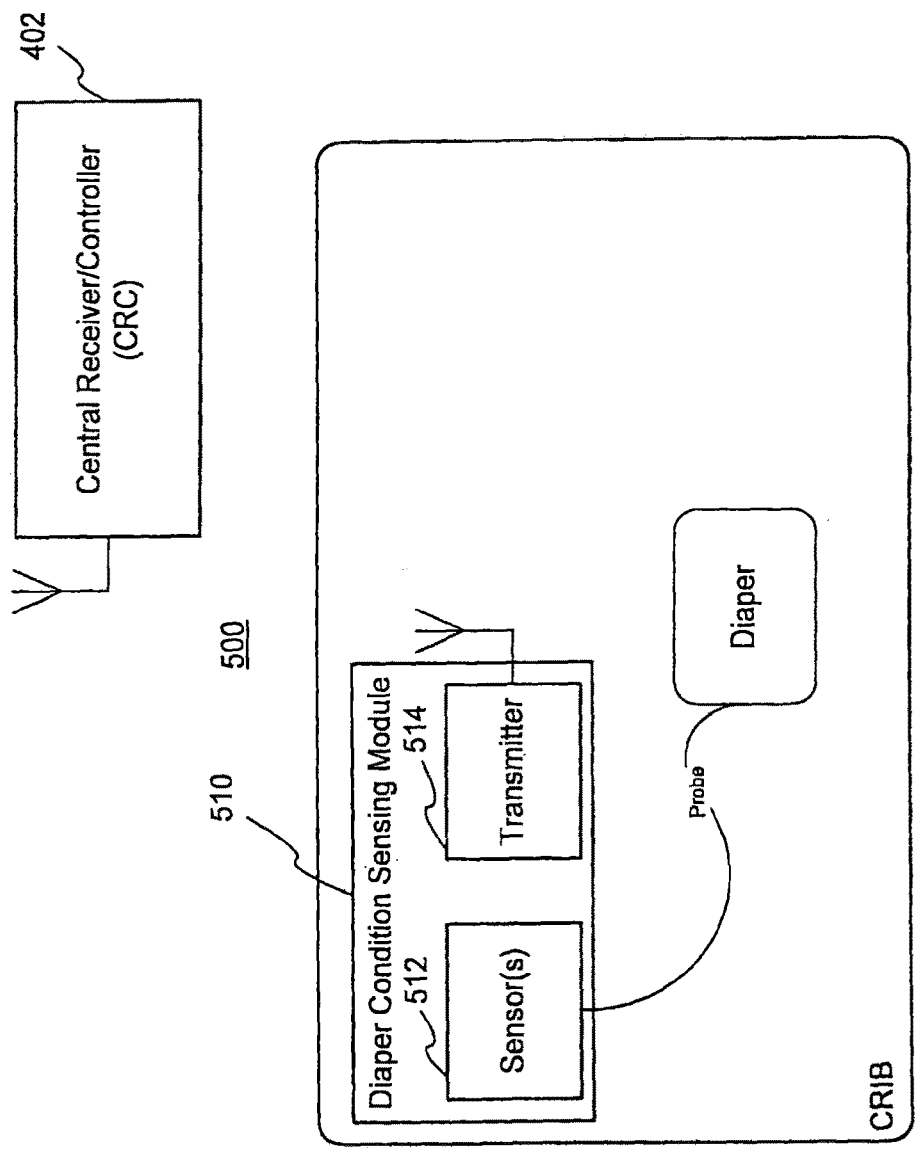
FIG. 5 is a block diagram illustrating a system for providing item status updates.

FIG. 5 illustrates an example of a diaper management system 510 according to the present invention. The diaper management system 500 includes a diaper condition sensing module 510 and a central receiver/controller (CRC) 520. The CRC 520 operates on a conventional processing platform, and is configured to communicate wirelessly with the diaper condition sensing module 510. The CRC 520 also includes a network interface. The wireless and/or network interface accommodate the transmission of appropriate alerts to caregivers.

The diaper condition sensing module 510 includes a sensor 512 and a transmitter 514. The sensor 512 is configured to monitor one or more of the following conditions, whose results indicate whether the diaper is wet or not:

1. The weight of the diaper—urine or feces make the diaper heavier than a dry and clean diaper;
2. Electric conduction of urine;
3. Chemical properties of urine—volatilized air including volatile acid or ammonia, pH, starch enzymes, ketone bodies, and/or urobilinogen may all be detected and analyzed to determine the presence of urine;
4. Feces: the solid waste material; the bilirubin, or stercobilinogens in the feces; the specific food decomposed material including starch, fat, plant fiber, muscle fiber and so on; and/or
5. Any other elements, features, characteristics, and reflections of the unwanted on babies' diapers.

The sensor 512 triggers the transmitter 514 to establish a wireless communication channel between itself and the CRC 520. A signal is sent by the transmitter 514 to inform the CRC 520 that the diaper is wet. This wireless communication channel preferably uses wireless technologies such as UWB, Bluetooth, RFID, Spread Spectrum, or other conventional wireless communication technologies.

Each sensor 512 preferably has a unique ID. Multiple access mechanisms, such as TDMA, CDMA, FDMA, or other conventional approaches, may also be applied to allow the central receiver to communicate with multiple sensors at the same resource. It is believed that Zigbee/Bluetooth may be useful for many applications in light of the competing demands of working range, data rate and cost.

After the CRC 520 receives the signal, the receiver triggers sound, light, text and/or other indications of the status of the diaper. These indications may be variously displayed, broadcasted, reflected, etc. through speakers, telephones, pagers, beepers, computers, and so on to inform the caregiver(s) so that they can remedy the situation.

The diaper condition sensing module 510 may be variously provided. One example connects to the diaper using a probe that measures for desired criteria as described above and as shown in FIG. 5.

Another example provides the diaper condition sensing module 510 within the diaper. In this example, the sensor 512 also includes interfaces (probes) for measuring the desired criteria, within the confines of the diaper. The transmitter 514 may use various communication techniques as described above. For an RFID embodiment, the function may be provided by causing the circuit loop of the RFID tag to transition from open to close when the diaper condition (e.g., wet) is detected by the sensor, which automatically causes the ID Tag to be sensed by the tag reader of the CRC.

Still further, in this example the diaper condition sensing module 510 may be placed within a diaper and reused. Diapers may be configured with pouches or the like to allow the placement of the diaper condition sensing module 510. In another alternative, the diaper condition sensing module 510 is manufactured and sold as an integrated part of each diaper, so that caregivers do not have to be concerned about the placement of the module 510 each time a diaper is changed.

Figure 6:
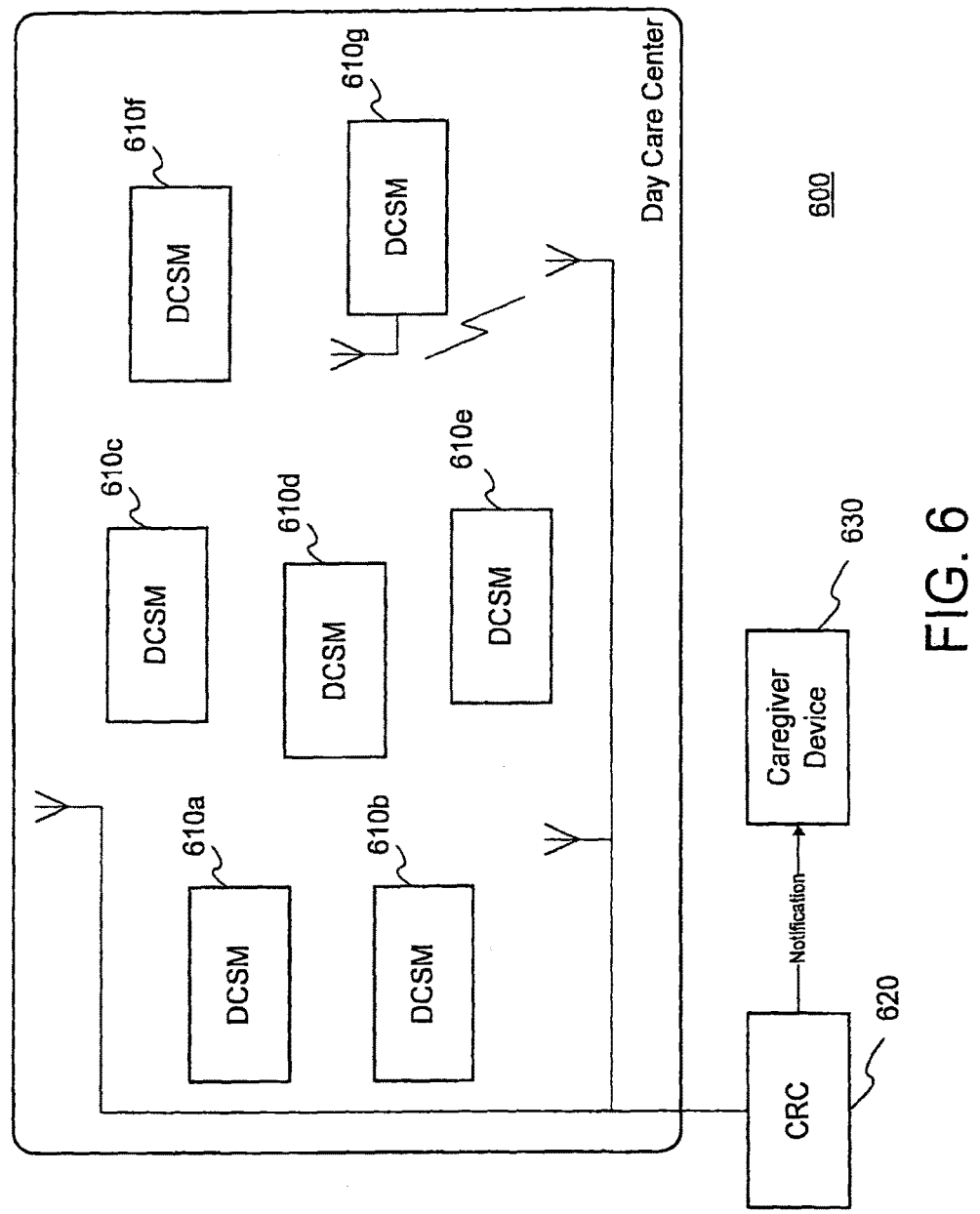
FIG. 6 is a block diagram illustrating a system for receiving and delivering a status update for multiple items.

In addition to assisting a caregiver with regard to an individual child's diaper, a diaper management system may be configured to manage the diapers for groups of children, such as a pre-school class or a day care facility where many children may potentially wear diapers. An example of such a system 600 is shown in FIG. 6. The CRC 620 is configured to distinguish children in need of new diapers from those that are not and respectively sends messages to appropriate caregivers. To carry out this functionality, the CRC 620 is equipped with a database that associates the unique identifier corresponding to each diaper condition sensing module 610*a-g* to at least one contact party. Alternative communication pathways (phone, e-mail, etc.), multiple contacts (caregiver#1, caregiver#2), and various other information may be associated to a given diaper condition sensing module 610*a-i* in the database.

In addition to providing a status alert about the condition of the diaper, the CRC 620 also determines the location of the diaper by using wireless location techniques, including but not limited to Angle of Arrival, Time of Arrival, and Received Signal Strength Indication. This allows the option of also giving the designated caregiver information about the location of the child having the soiled diaper.

Figure 7:
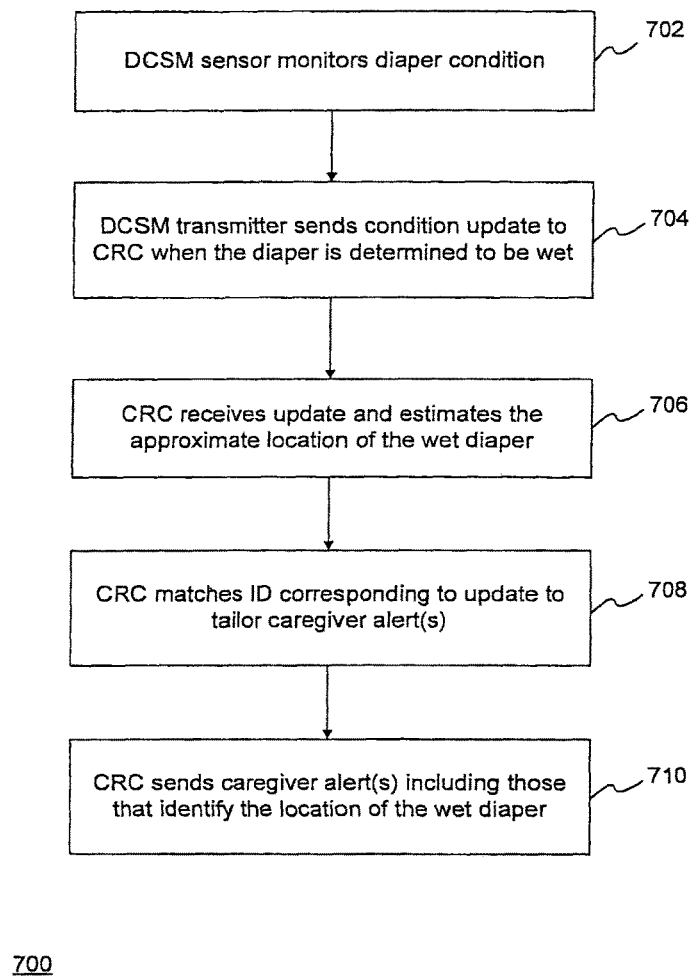
FIG. 7 is a flow diagram illustrating a process for providing a diaper condition update.

FIG. 7 is a flow diagram illustrating a process 700 for sending a caregiver alert according to a diaper condition in accordance with the present invention. The process 700 commences with the DCSM sensor monitoring 702 the diaper condition. When the diaper condition changes, such as when it is wet, the DCSM sensor detects the updated condition of the diaper. When this occurs, the DCSM transmitter sends 704 the diaper condition update to the CRC. The CRC receives 706 the update and corresponding indications. Many conditions may be updated and the DCSM and CRC are configured to communicate them accordingly. The CRC, once provided with the update, proceeds to estimate the location of the (e.g., wet) diaper. The DCSM sends an ID corresponding to the update, which identifies the diaper/child. The CRC queries its database and thus matches 708 the ID corresponding to the update to tailor caregiver alert(s). These alerts are then sent 710 to the caregiver(s) accordingly.

In the situation where there are multiple children/diapers being monitored, the CRC provided alert may be to a PC having a display screen with a map of the room(s) and the estimated location of the wet diaper. Other CRC provided alerts may merely notify additional caregiver(s) as to the status of the diaper, without the location, so that the additional caregiver(s) may be apprised of the status. The CRC may also poll the DCSM after a given period of time to ensure that the diaper condition has been updated. The CRC may be configured with configuration settings that allow a caregiver to specify when and how they should be updated. For example, if one caregiver is a baby sitter watching the child while the parents are out, the parent may configure the CRC not to send an alert to them when the diaper is first detected as being wet, but to wait until a certain period of time elapses. By contrast, the baby-sitter alert may be provided immediately. If the certain period of time passes and the diaper remains wet, the CRC can then notify the parent about the diaper condition, and the parent will realize that the diaper has not been changed.

Figure 8:
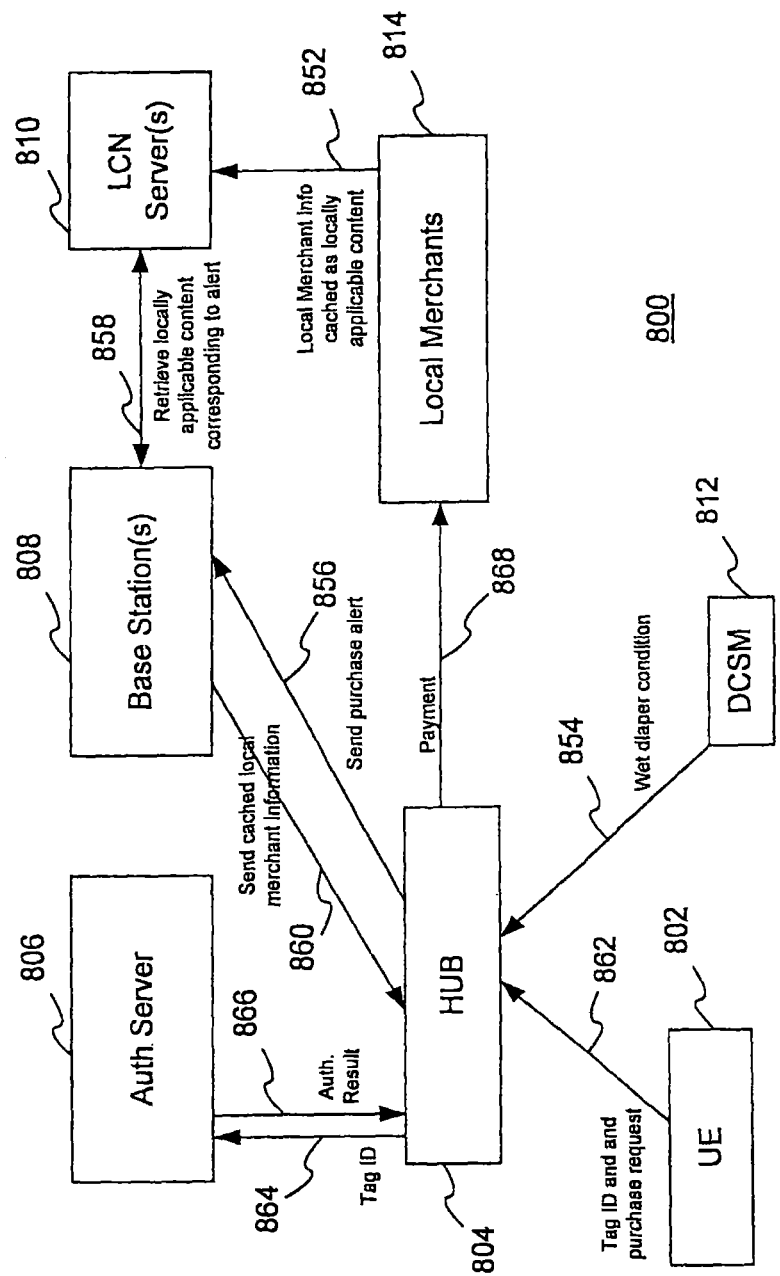
FIG. 8 is a block and event diagram illustrating the provision of locally applicable Internet content to a user in relation to a status update, and secure receipt and satisfaction of an action request related to the same.

FIG. 8 is a block and event diagram illustrating an example of a system 800 that implements several aspects of the invention described above. The system 800 includes UE 802, WHUB 804, Authorization Server 806, Base Station(s) 808, LCN Server(s) 810 and DCSM 812, which respectively provide the functionality described above for the components having the same names.

Local Merchant Server(s) 814 are also illustrated. As described in connection with the provision of locally applicable Internet content, merchants are apprised as to the local applicability of content, such as may be determined by frequency of access by users at a particular location corresponding to given base station(s). The WHUB 804, in addition to being configured to facilitate secure receipt and performance of an action such as a purchase request and corresponding payment request, includes the CRC functionality that allows a response to diaper condition update as provided by the DCSM 712 (the diaper being just one example of an item for which updates may be provided).

With the system 800 configured as such, the delivery of locally applicable Internet content may be provided in conjunction with the diaper update. Also, a local merchant (and corresponding server) 814 that sells diapers is able to present a coupon or other incentive to the user in conjunction with the determination that a diaper is wet by the DCSM 812. Moreover, in addition to having the capability of reminding the caregiver about this, the WHUB 804 may keep a database of household requirements and inventories. For example, the WHUB 804 may monitor the number of diapers detected as being used. When the amount of used diapers is close to the amount known to have been purchased previously, an additional alert may be presented to the user so that they are aware that they need diapers and they can get the discount if they buy brand x based upon the information provided by the local merchant.

The process for providing such functionality may be as follows. Based upon historical activity relating to access of locally applicable Internet content, as well as whatever merchant participation is desired in conjunction with the system 800, the local merchant's information is cached 852 at the relevant LCN Server(s). A wet diaper is detected 854 by the DCSM 812 and this information is transmitted to the WHUB 804. The WHUB 804, managing the diaper inventory for the household, determines that the inventory of diapers is low, and thus sends 856 a purchase alert through the Base Station 808 requesting information related to the current need. In response to this, the LCN Server(s) 810 determine that the local merchant information is relevant to the current need, and thus retrieve 858 and send 860 the cached local merchant information to the WHUB 804.

In conjunction with the above exchange of information, alerts of both the diaper condition and the low diaper inventory may be provided and retained for user review. When the user is ready to make a purchase, this may be accommodated via the WHUB 804. This purchase request may be made by directly interfacing with the WHUB 804, or by using the UE 802 in the fashion described above. The latter option is shown. There, the UE 802 sends 862 its Tag ID and purchase request to the WHUB 804. This, of course, may follow some browsing activity prior to the purchase request, so as to review the possible purchase options. The authentication may be as described above, based upon a Tag ID and password. The Tag ID and password are sent 864 to the authentication server, which returns a notification 868 confirming authentication.

Once the authorization is obtained, payment is sent 868 to the Local Merchant server 814 to complete the transaction, and the receipt, confirmation and other information may be fed back to the WHUB 804 regarding the same. For physical product like diapers, the WHUB will have provided (or the Local Merchant may already have) the shipping address. Additionally, if the Local Merchant is a provider of several items (such as a supermarket), then items may be accumulated prior to completing a purchase and/or making a shipment and/or making the products available for pick up by the user. The WHUB is preferably configured with a shopping list that allows organization of periodic cumulative purchases to accommodate this functionality.

Figure 9:
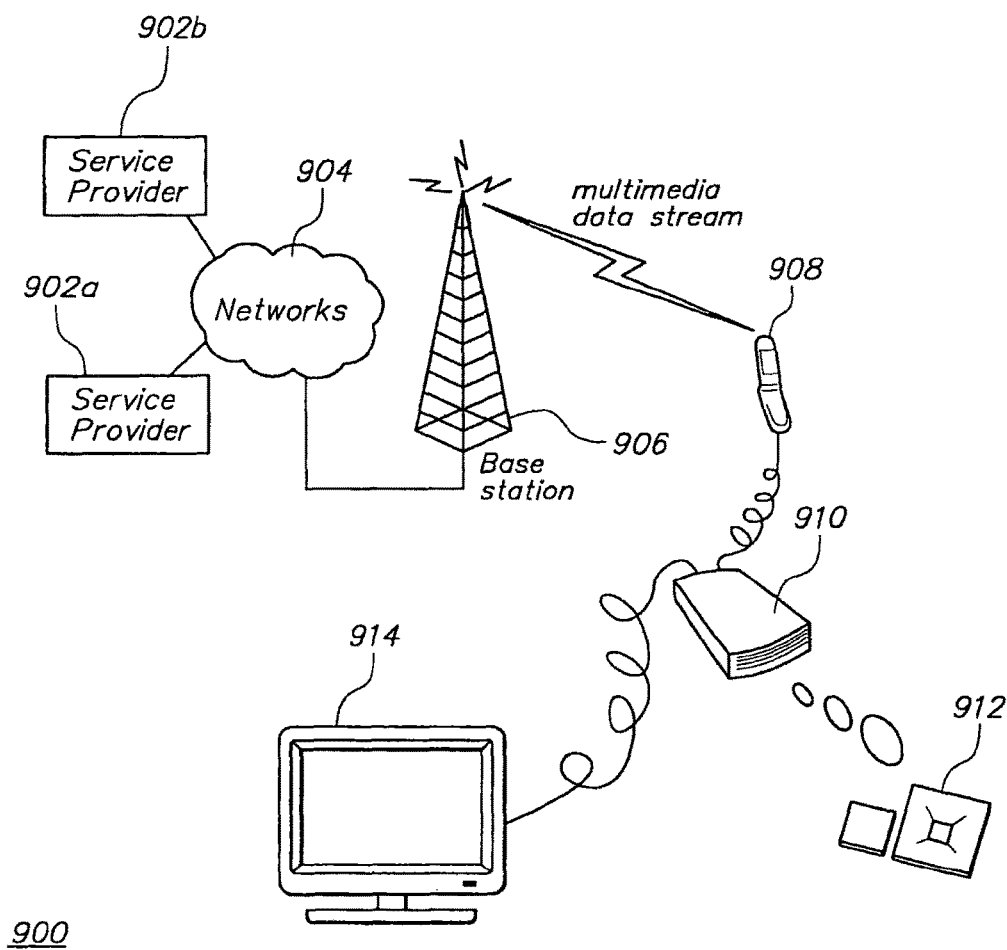
FIG. 9 is a schematic diagram illustrating an example of a system in which mobile terminal signal conversion may reside.

FIG. 9 is a schematic diagram illustrating an example of a system 900 with mobile terminal signal conversion.

Mobile terminal signal conversion accommodates displaying the high rate data flow multimedia information available in a wireless communication environment in an external device, which allows true realization and enjoyment of the benefits of the multimedia content.

In one example, the multimedia information is provided to a wireless mobile terminal using so-called next generation cellular technology (i.e., 3G and 4G), which can be employed in transmitting multimedia information (e.g., rich graphics, real-time audio/video). Because of the relatively small screen size and low quality ear phones, for many applications the mobile terminal cannot adequately reproduce the high quality multimedia information that can be communicated using next generation technology with adequate clarity and satisfaction. Mobile terminal signal conversion makes usage of a separate multimedia display terminal including but not limited to a monitor, television set, projector, or LCD display. These displays typically have video and audio reproduction capabilities that are superior to those found on mobile terminals. They also use a power supply that is separate from the mobile terminal.

Still referring to the system 900 illustrated in FIG. 9, multimedia information may be provided by any number of service providers 902*a-b* and delivered through a network 904 to a base station 906 to ultimately accommodate transmission of the multimedia information, among other things, to a cellular phone 908. This system 900 is provided by way of example, and it should be understood that any conventional or to-be-developed technology for delivering voice and/or data to mobile terminals may be provided. These wireless communication networks include but are not limited to a cellular communications network or a wireless local area network.

Also illustrated is a typical external display system 914. This may also be variously provided and may be digital or analog. Examples of digital Systems include HDTV, LCD and plasma. Examples of analog Systems include television sets that implement standards such as NTSC, PAL, SECAM, and analog computer monitors (SVGA, VGA). The external display system 914 does not have the size constraints of the display screen on the cellular phone 908 and is preferably powered independently.

In the illustrated embodiment, a mobile terminal signal conversion module (MTSCM) 912 resides within a separate housing 910, outside the cellular phone 908.

Figure 12:
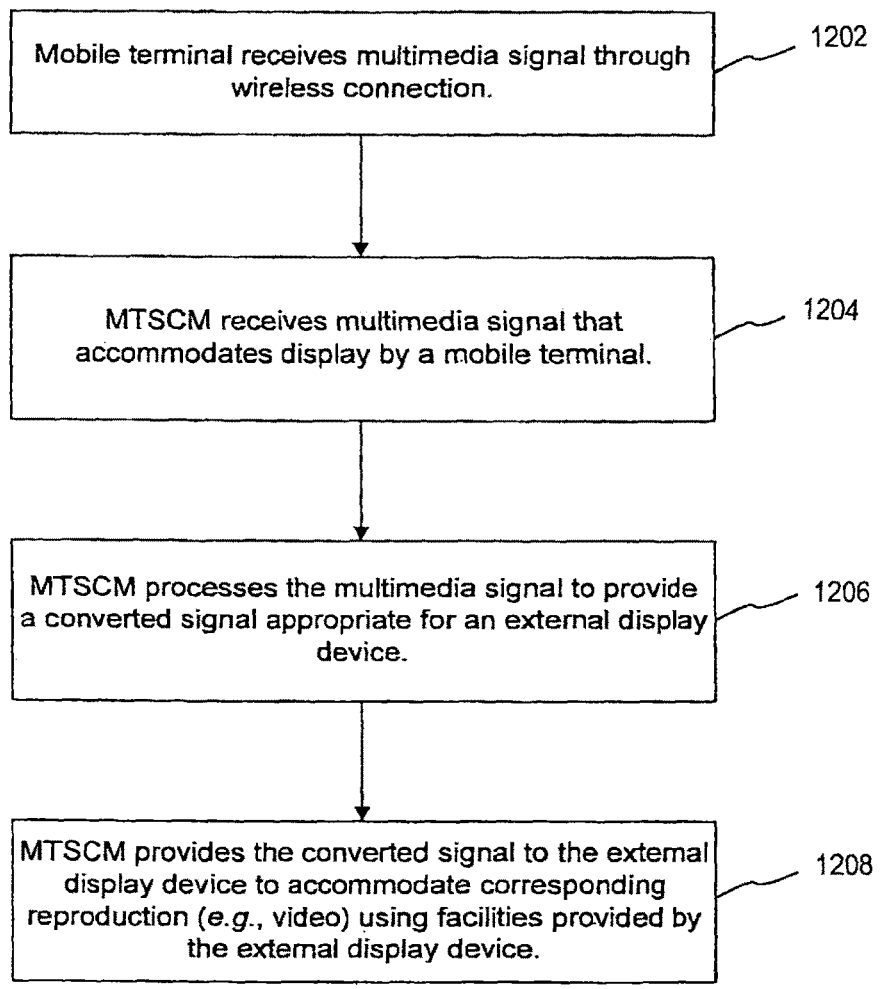
FIG. 12 is a flow diagram illustrating an embodiment of a process including mobile terminal signal conversion.

The functionality of the MTSCM 912 is now further described with concurrent reference to FIG. 9 and the flow diagram of FIG. 12.

The MTSCM 912 processes signals to accommodate reproduction by an external device. Specifically, a multimedia signal is transmitted to the cellular phone 908 through the wireless communications network as previously described (step 1202). The multimedia signal may include a video signal intended for reproduction by the cellular phone 908, using the cellular phone display screen. For ease of description, processing of a video signal is described, although it should be understood that any multimedia signal or component thereof may be converted in accordance with the present invention.

The cellular phone 908 is connected to the MTSCM 910. This may be accommodated by a cable connection that interfaces the cellular phone 908 to the MTSCM 912 housing 910. Through this connection, the MTSCM 912 receives the video signal from the cellular phone 908 (step 1204). The video signal as received may be configured to accommodate a video display on the screen provided by the cellular phone 908. The cable connection is an example of a wired connection interfacing the cellular phone 908 to the MTSCM 912. An alternative wired connection is a seat that directly interfaces the two without a cable. A wireless connection may also be provided, although it may currently be less practical to provide than the wired connection because of the potential for high throughput rate requirements. The wireless connection may also implement any conventional known technology including but not limited to a Bluetooth connection.

The MTSCM 912 processes the video signal to provide a converted video signal that has a display format and/or signal power level appropriate for an external display terminal 914 that is separate from the cellular phone 908 (step 1206). The display format and/or signal power level of the external display terminal 914 may be different from that of the cellular phone 908 but there may also be embodiments where the format is the same. Even if the formats are the same, conversion of the signals to accommodate display on the external display terminal 914 would still be implemented to adjust the power level for driving the external display, and possibly to minimize throughput requirements. This signal conversion is described further with reference to FIGS. 10 and 11, below.

Figure 13:
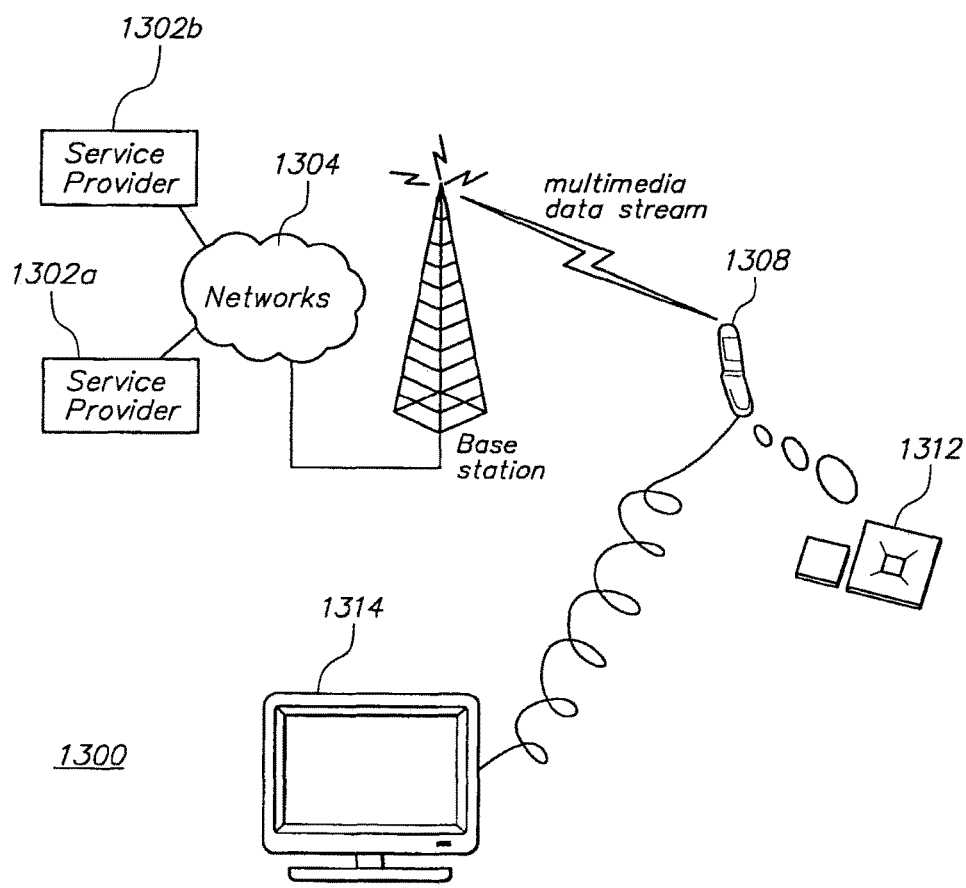
FIG. 13 is a schematic diagram illustrating another example of a system in which mobile terminal signal conversion may reside.

Still referring to FIGS. 9 and 13, following signal conversion, the MTSCM 912 provides the converted video signal to the external display terminal 914 to accommodate the corresponding video display on a screen provided by the external display terminal 914 (step 1208). This may be accommodated through a connection between the MTSCM 912 housing 910 and the external display terminal 914 as shown.

As used herein, mobile terminal refers to typically handheld mobile devices such as cellular phones and personal digital assistants. Although these devices include an execution platform as well as input and display capabilities, such devices are distinguished from personal computers, such as desktop or laptop computers, which are not designed for convenient handheld usage.

Figure 10:
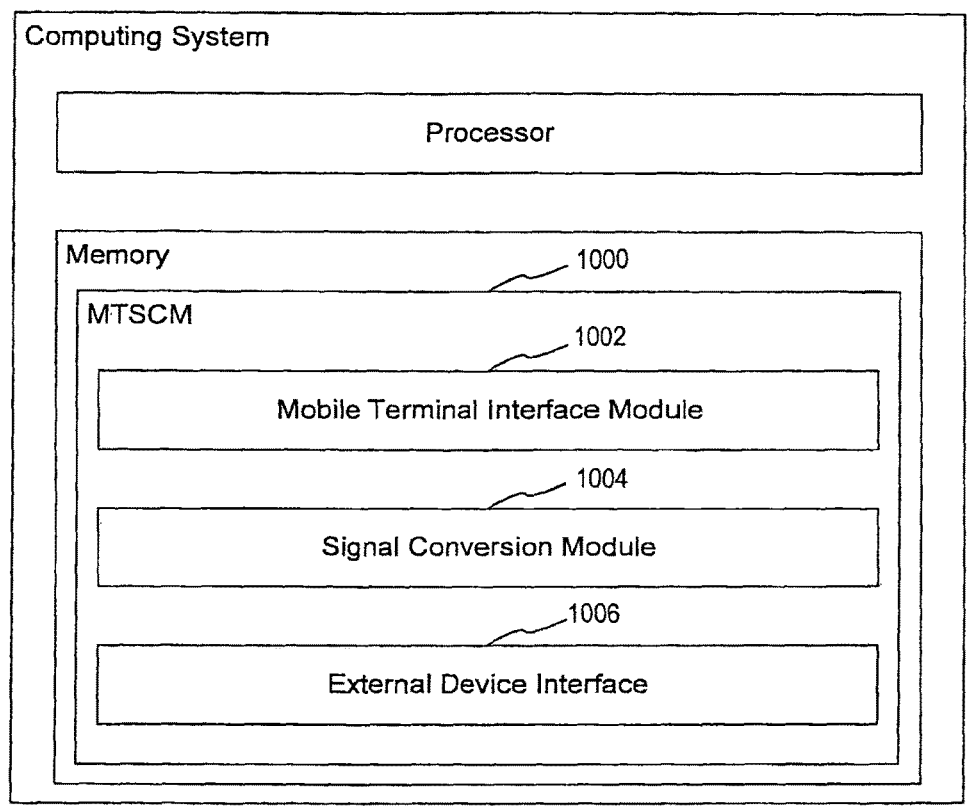
FIG. 10 is a block diagram illustrating an example of a mobile terminal signal conversion module.

FIG. 10 is a block diagram illustrating an example of an MTSCM 1000 in accordance with the present invention. The MTSCM 1000 may be provided as software, firmware, hardware, or any combination thereof.

Where the MTSCM 1000 is provided as software, it operates in the context of an execution platform. That is, the MTSCM 1000 includes instructions that are stored in memory for execution by a processor. Any conventional or to-be-developed execution platform may be used. The processor, memory, and related elements such as a power supply are well known and need not be described herein to convey an understanding of the invention. Additionally, FIG. 10 illustrates one modular breakdown for the components of the MTSCM 1000. It should be understood that the described functionality may alternatively be provided by an MTSCM having fewer, greater, or differently named modules from those illustrated in the figure.

Additionally, although modules as shown to reside in a common location, it is noted that the functionality may reside in separate components of a system that includes a mobile terminal, an external monitor, and (optionally) an intermediate device housing the MTSCM and interfacing the mobile terminal and external monitor. In other words, the overall functionality of the MTSCM may be separated such that portions of the overall functionality are respectively provided by the mobile terminal, separate intermediate housing, and/or the external display device.

The MTSCM 1000 may also be provided in the form of a chipset, configured for inclusion in a mobile terminal, dedicated separate signal conversion device, or external display terminal, and to provide the described mobile terminal signal conversion functionality.

The MTSCM 1000 includes a mobile terminal interface module 1002, a signal conversion module 1004, and an external device interface module 1006.

The mobile terminal interface module 1002 accommodates receiving the multimedia signal from the mobile terminal. A conventional physical interface provides a connection between the MTSCM 1000 and the mobile terminal through which the signals flow to the MTSCM 1000. The mobile terminal interface module 1002 recognizes the multimedia signal and stores the signal for processing by the remaining modules. Buffering and the like may be implemented to accommodate storage and signal processing, as described further below.

The signal conversion module 1004 is in communication with the mobile terminal interface module 1002 and thus accesses the received multimedia signal. The signal conversion module 1004 recognizes the multimedia signal format, and processes the multimedia signal to provide a converted signal. The converted signal may have a format and a signal power level that differs from the one used by the mobile terminal, as appropriate for one or more types of external devices to which the MTSCM 1000 is connected. Various examples of the type of devices to which the MTSCM 1000 may be connected are illustrated and described in connection with FIG. 11, below.

The external device interface 1006 is in communication with the signal conversion module 1004 and thus accesses the converted signal. The external device interface 1006 also allows connection to the external (e.g., display) device. The external device interface 1006 may provide both the feeding of the converted signal to the external device, and driving the external device. Alternatively, the external device interface 1006 may merely feed the converted signal to the external device, with the external device including internal elements for driving its signal reproduction (e.g., display) facilities.

Figure 11:
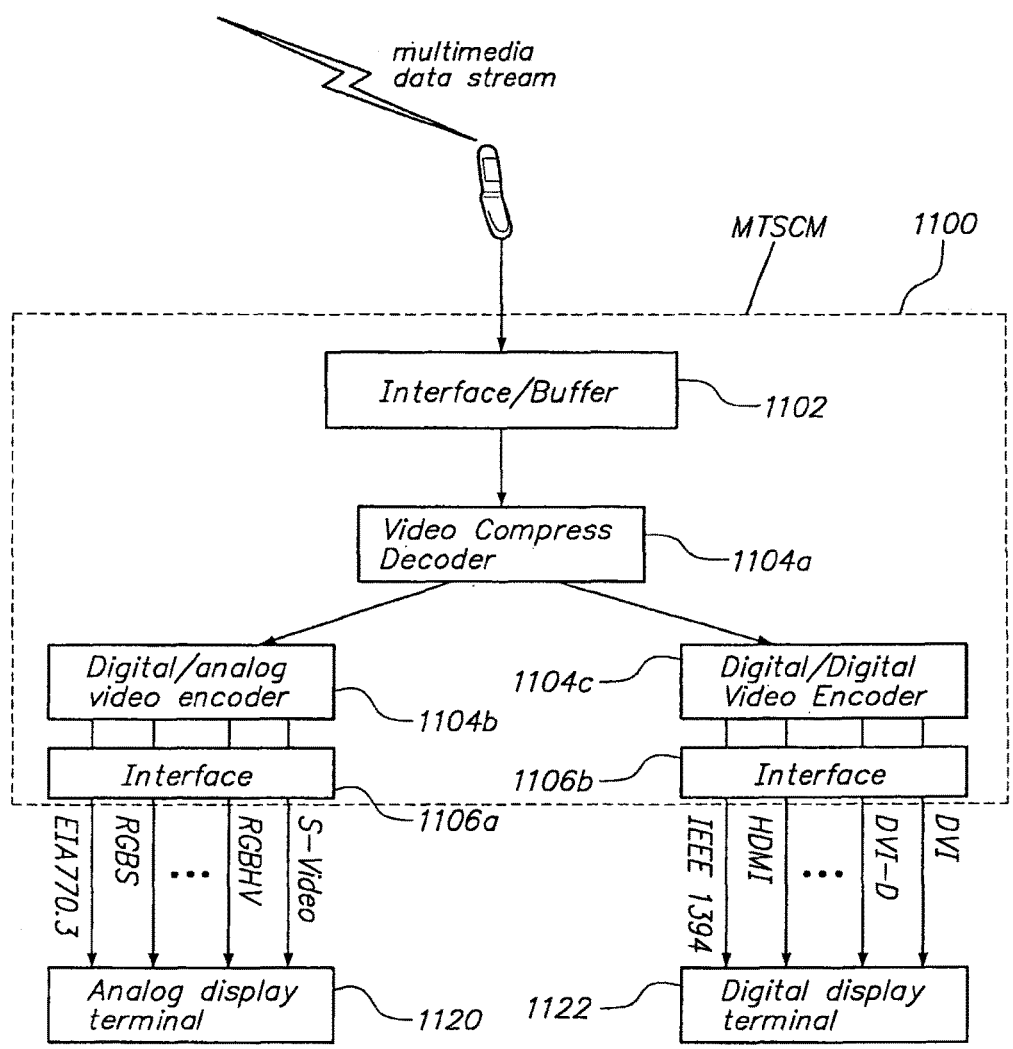
FIG. 11 is a block diagram illustrating another example of a mobile terminal signal conversion module.

FIG. 11 is a block diagram illustrating another example of the MTSCM 1100. The MTSCM 1100 includes additional detail regarding the signal conversion aspect, and illustrates examples of differing types of external devices to which the MTSCM 1100 may provide converted signals. The illustration and corresponding description are provided by way of example. Although numerous connections are illustrated, it should be understood that the present invention may be practiced in the context of providing as few as one, and as many as all of the listed connections. It should also be understood that there may be additional examples that are not listed herein, but which are encompassed by the teachings described herein.

The MTSCM 1100 includes an interface/buffer module 1102 that is analogous to the previously described mobile terminal interface module. The buffer and interfacing are configured to accommodate signal processing by the remaining elements in support of the requirements and expectations of users of the multimedia signal output (e.g., adequate buffering and processing rate to provide real time audio/video). The mobile terminal video compression format may of course vary, but currently the most likely format is MPEG-1 or MPEG-2. Buffering and throughput rate may also be provided as desired by the designer. Currently, it is believed that 200 Mb is an adequate buffer size, although buffers of 500 Mb or more may of course be provided. Additionally, a throughput rate of approximately 10 Gb/s will be adequate for many current Systems, but may be increased as demands and technology evolve.

The Video Compress Decoder 1104a receives the multimedia signal. The multimedia signal is typically provided in a compressed format to accommodate increased signal transfer rates. An example of a compression scheme is that provided by one of the MPEG standards (e.g., MPEG-1, MPEG-2, MPEG-4). The Video Compress Decoder 1104a is configured to include the appropriate compression/decompression (CODEC) module to accommodate decompression of the received multimedia signal. For example, where the compression scheme is MPEG, the Video Compress Decoder 1104a includes an MPEG CODEC to accommodate processing of such multimedia signals.

As an alternative to provision of the Video Compress Decoder 1104a in the MTSCM 1100, the functionality may be provided within the cellular phone or other mobile terminal. However, this may be less practical because of the high bandwidth that would be required between the cellular phone and the MTSCM 1100 to deliver the decompressed signal, and the corresponding likelihood of a larger buffer requirement for the MTSCM 1100.

The Video Compress Decoder 1104a outputs a decompressed digital multimedia signal that is passed to the Digital/Analog Video Encoder (DAVE) 1104b and/or the Digital/Digital Video Encoder (DDVE) 1104c. The DAVE 1104b is configured to prepare signals for analog external display terminals 1120, and the DDVE 1104c is configured to prepare signals for digital external display terminals 1122. The DAVE 1104b and DDVE 1104c respectively receive the decompressed multimedia signal and convert the signals to the format(s) and signal power level(s) required for the terminals to which they interface.

Examples of formats used by analog display terminals 1120 include S-video, RGBHV, RGBS, and EIA770.3 as illustrated. Similarly, the DDVE 1104c provides output using standards such as DVI, DVI-D, HDMI, and IEEE1394. The signals respectively provided by the DAVE 1104b and DDVE 1104c are provided to the terminals through conventional interfaces 1106a-b. The DAVE 1104b functionality may be embodied as a video card that is configured accordingly. Examples of video cards that may be configured to provide the described functionality include but are not limited to the Diamond Stealth S60, ASUS V9400-X, or RADEON 7000.

Ultimately, the signals are used to provide a display on the external display, as required according to the particular type of display. For example, the video data stream may be a digital RGB signal which represents the intensity of the red, green and blue light respectively at different position. This signal is converted to analog by a D/A converter. This converted analog signal is quantified to the voltage and format required by the standard, such as the input of cathode-ray-tube (CRT) monitor. This standard video signal will drive a set of electron guns, which produce a controlled stream of electrons to display of red, green and blue light respectively on a CRT screen. This is but one example and the present invention is not limited to a particular technology (e.g., CRT) for the external display.

As described, in one embodiment the MTSCM may be independently housed separately from both the mobile terminal and external display terminal, with respective connections to the other devices to provide a system configuration that includes the three pieces of hardware (mobile terminal, conversion box, external display terminal). This configuration provides the flexibility of allowing any standard mobile terminal and/or display to be potentially interface with the MTSCM without imposing constraints on the mobile terminal or external display terminal manufacturers. A possible drawback to this configuration is that additional hardware is introduced into the system.

In lieu of the three component system, the MTSCM may be located in either the mobile terminal or the external display. FIG. 13 is a schematic diagram illustrates an example of a system 1300 in which the MTSCM mobile terminal signal conversion may reside within the mobile terminal 1308. The components and functionality of the service providers 1302a,b network 1304 and base station 1306 for delivering multimedia signals to the mobile terminal 1308 is the same as for the analogous elements of FIG. 9 and need not be re-described. Similarly, the external display terminal 1314 may be any of the various types named above.

The MTSCM 1312 provides the same functionality described above. However, in contrast to residence in a separate housing, the MTSCM 1312 is a component of the mobile terminal 1308. A potential advantage of this system 1300 is that, again, any standard equipment can serve as an external display terminal 1314, without a constraint on the display manufacturer. Additionally, only a simple wired or wireless interface is required to connect the external display with the mobile terminal 1308. This means, for example, that the user will not be required to carry a bulky conversion module in addition to their cellular phone.

A potential drawback to this system 1300 is that the execution platform of the mobile terminal 1308 may be designed to accommodate only traditional functionality, so for some Systems it may be challenging to add the MTSCM functionality to the existing platform. Additionally, the MTSCM will consume power that may unduly exhaust the limited power supply offered by the mobile terminal 1308 battery. It is useful for this embodiment to provide power to the mobile terminal 1308 through the cable connection to the external display terminal 1314, but again this may require modification to the mobile terminal 1308 as the existing charger interface may be insufficient.

Figure 14:
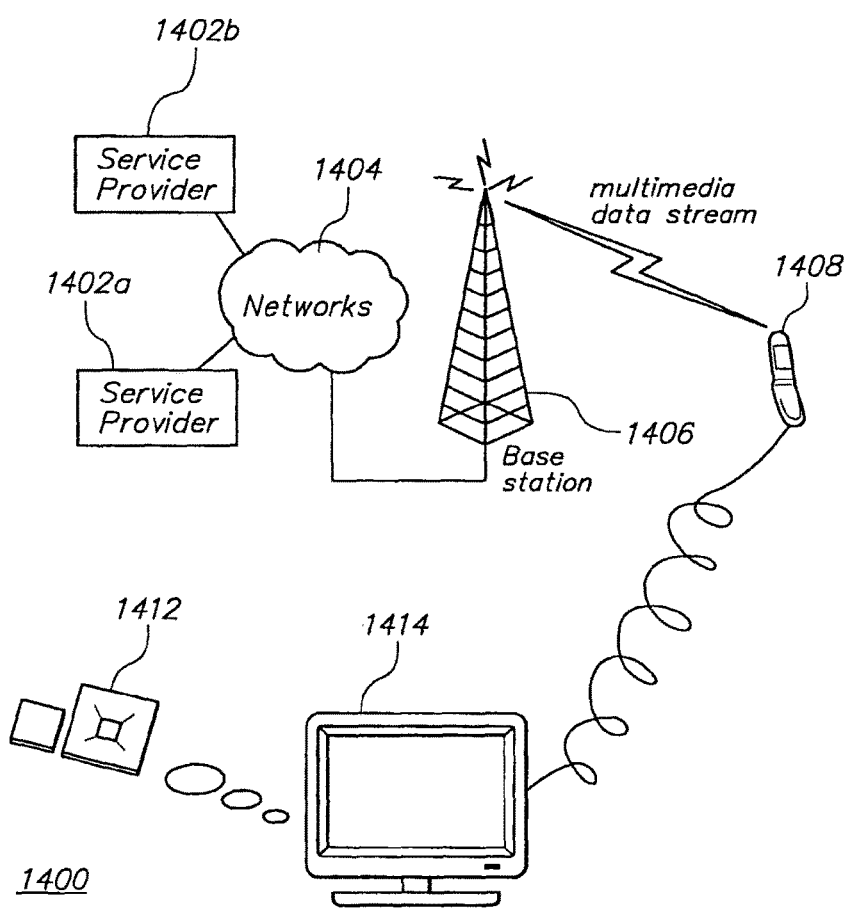
FIG. 14 is a schematic diagram illustrating still another example of a system in which mobile terminal signal conversion may reside.

FIG. 14 is a schematic diagram illustrating another example of a system 1400, in which the MTSCM 1412 resides within the external display terminal 1414. As with FIG. 13, the components and functionality of the service providers 1402a,b network 1404 and base station 1406 for delivering multimedia signals to the mobile terminal 1408 is the same as for the analogous elements of FIG. 9 and need not be re-described.

Here, the mobile terminal 1408 need only be connected directly to the external display terminal 1414. However, in lieu of having the MTSCM 1412 functionality reside within the mobile terminal 1408, it is part of the external display terminal 1414. The power supply and execution platform issues associated with placing the MTSCM 1414 in the mobile terminal are resolved with this system 1400, and any mobile terminal 1408 can potentially be connected to any MTSCM-ready external display without requiring modification, other than provision of an output interface. A potential drawback of this configuration is that it adds a component to the standard external display terminal, and corresponding costs.

Figure 15:
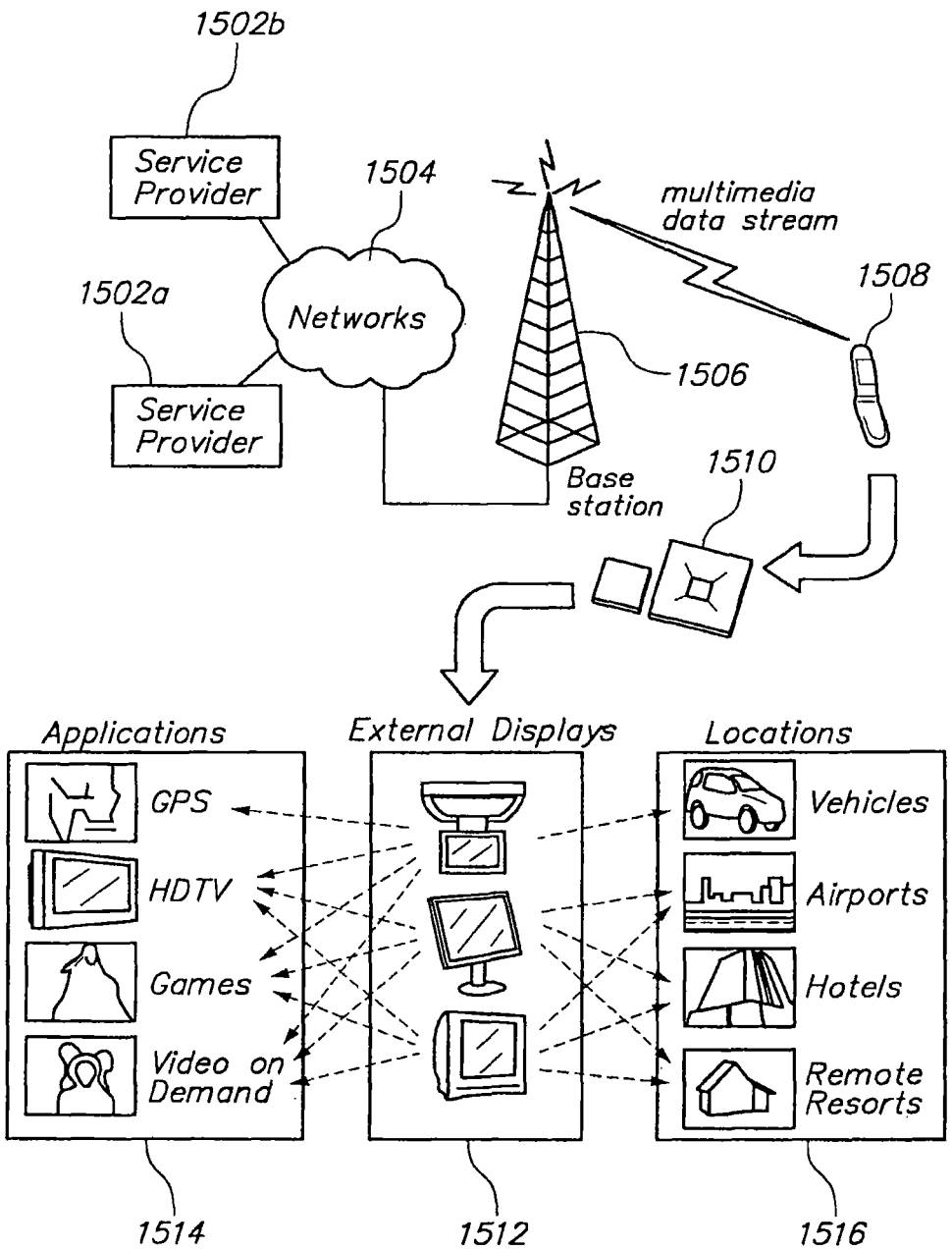
FIG. 15 is a schematic diagram illustrating examples of mobile terminal signal conversion applications.

FIG. 15 is a schematic diagram illustrating examples of mobile terminal signal conversion applications 1500 in accordance with the present invention. These applications 1500 are provided by way of example, to give the reader an understanding of the potential contexts in which embodiments of the present invention may operate. The present invention is not limited to the disclosed applications, nor are all potential applications required for any given embodiment.

The basic architecture for provision of the wireless communications signal and corresponding multimedia signal is as described above for the service providers 1502a-b, network 1504, base station 1506 and mobile terminal 1508. The MTSCM 1510 may be separate or reside in the mobile terminal 1508 or display terminal 1512. Examples of applications 1514 where a larger screen and potentially superior audio may be enjoyed include video conference, HDTV, games, GPS, and video on demand. Additionally, embodiments of the present invention will accommodate enjoyment of full multimedia capability in locations 716 including vehicles, airports, hotels and remote resorts. Thus, for example, the present invention accommodates usage inside a vehicle, a plane or any type of transportation, enabling the passenger to browse the Internet, watch TV, play games, participate in a video conference or call, and work on all sorts of software with full functionality.

Figure 16:
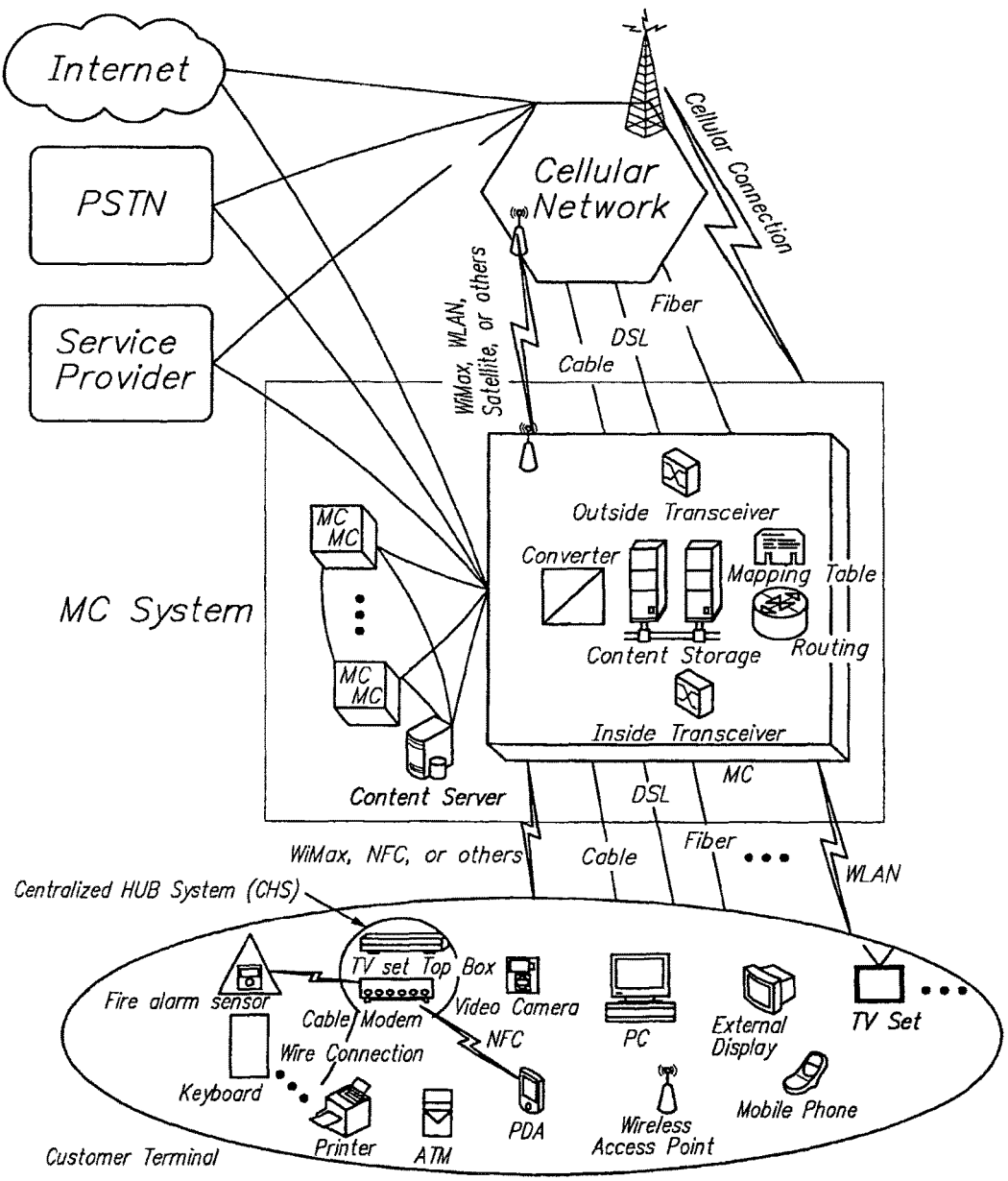
FIG. 16 is a schematic diagram illustrating a control system of multimedia communications of different user terminals.

FIG. 16 is a schematic diagram illustrating a control system for multimedia communications between different user terminals.

According to one aspect of this embodiment, a converting server that is variously positioned in network environments provides a routing function and a connecting function, and functions bi-directionally. Accordingly, this aspect provides for the transmission and receipt of content and converts such content in both directions depending upon the connected devices and corresponding protocols used by such devices.

According to another aspect of this embodiment, cellular television functionality is provided. Here, a television in form and functionality also includes cellular communication features as well as the above-described conversion functionalities. Preferably, one or more "channels" corresponding to the cellular application are provided in the cellular television so that the content received in this fashion may be accessed and viewed by a user in a fashion similar to that used for accessing traditional television channels.

According to still another aspect, one or more embodiments of the invention provide efficient integration for Internet, wireless networks, cable, DSL, satellite, and TV communications to enable communications among potentially different user terminals. The user terminals include home and office appliances (such as TV, computer) and wireless terminals (such as mobile phone, PDA). In a system configured according to this aspect, a Management Center (MC) System receives, selects, converts, compresses, decompresses, and routs data to the user terminals. Various examples are presented and will be apparent to the ordinarily skilled artisan once instructed according to the teachings of this aspect. By way of example, signals such as those from a fire alarm or theft sensor are sent through the MC System to a user's cell phone and/or 911 Center. Some processing functions may be performed by the MC System in combination with a user terminal and other MC Systems. In another example, a user's phone call (wireless or wired) is routed to a telephone, mobile terminal, computer, and/or TV as designated by the user.

The MC System functionality includes receipt, conversion and transmission of content in two directions. It also includes facilities for mapping and routing content to various connected devices and data storage for storing content that is served locally or to remote devices.

Receiving, converting and transmitting multimedia content may be performed in two directions using the MC System. For example, this may include receiving and transmitting signals from cellular networks, Internet, PSTN, other Management Centers, as well as receiving and transmitting signals from user terminals including televisions, monitors, diaper monitoring, a video camera, fire alarm, theft sensor, etc.

With regard to conversion, the MC System includes a converter module with routines for selecting, extracting, compressing, decompressing, adjusting data, and converting the data format and/or power lever and/or data package size/format.

The MC System also includes a mapping table and a routing module. The mapping table is described further below. It matches phone numbers, cable ports, DSL ports, IP addresses, etc. The routing module is for routing data to destinations through designated channels. The routing module accommodates routing the received data that is inbound from a variety of sources including but not limited to cable, broadcast television and Internet. It also accommodates routing to a variety of interfaces found on receiving terminals, including but not limited to RS232, USB2.0, and video cable port. The routing module receives the relevant information concerning routing from the results of looking up the same in the mapping table, and carries out the routing accordingly.

Finally, the MC System includes data storage such as a hard disk. This allows the MC System to store content to assist faster and more efficient data receiving and transmission to user terminals. The MC System may also conveniently retain converted content (e.g., compressed, coded, decrypted, decompressed) for subsequent additional access. This converted content may be provided internally or transmitted externally from the MC System.

It is also noted that the MC System may include software and/or hardware for filtering and treating viruses, such as viruses that involve the cellular network and corresponding cellular communications. For example, the MC System may periodically or persistently check for virus signatures when content is being transmitted or received by the MC System. Virus screening processes may thus be applied to multimedia content items in conjunction with their conversion, and at the same location (the domain of the MC System). This may be useful because virus screening may be applied to multimedia content before and/or after it is converted. Treatment may include blocking or quarantining viruses that are detected, deleting virus data or files, and communicating the possible presence of attacks to other MC Systems or external systems.

When a communication is inbound to the MC System, it may include a data package that identifies the destination device. This may be in the form of a unique device identifier that is associated with each device managed by the MC System. The mapping table is queried for the presence of the unique identifier. Once this is successfully performed, corresponding information regarding the processing of the communication may be automatically gathered from the mapping table.

Additionally, or alternatively, the MC System (and/or CHS) can obtain formatting, addressing, and other information by referencing portions of the received data package according to a predefined protocol. For example, information within the received data package may indicate the format (e.g., TCP package in Internet) for transmission and the format (e.g., data package defined by WCDMA standard in 3G) for receiving, as well as the destination address corresponding to the converted data format. The overhead information within the received data package can inform the MC/CHS regarding the next transmission protocol and matched format. That is, the data package received by the MC/CHS includes some defined extra data besides the desired content data. This information informs the MC/CHS regarding the inbound data format transmission protocol, and also the outbound data format and the transmission protocol corresponding to the data format.

For example, if the data package contains the identifier $DI_1$ it is determined that the communication is intended for the main television in the household. In a simple example, all communications to a given device may be required according to the same format and same address. For example, a regular video output may be directly connected via cable between a video output from the MC System to the video input of the main television (e.g., by coaxial cable, component cables, HDMI cable). With regard to this example, the MC System includes a regular output for making the connection to the television.

There may also be network-based connections, such as to a personal computer (or home LAN router) or directly to a television equipped with a network interface card and related functionality. In these instances the address information (and corresponding entries in the mapping table) would include the network address of the particular device. The MC System is equipped with its own network interface card and corresponding output to engage in these communications. These and other communications such as to a cellular phone via either the use of the cell phone number or a direct local wireless communication may be made, again as indicated in the mapping table.

There may also be situations where multiple different processes and corresponding conversion and addressing need to be applied for a given device. For example, a television set may be connected to both a network connection and the video output of the MC System. As another example, a cellular phone may have alternative communication capabilities as noted. In these circumstances, the mapping table may also include multiple different entries designating the address, signal format, etc.

Thus, the information in the mapping table may also be correlated to several processing category codes for a given device. For example, processing category code #1 for the television set may indicate that the inbound communication should be addressed, converted (if applicable) and routed to the television through the video output. This might be merely feeding conventional television signals to the television. On the other hand, processing category code #2 for the television may indicate that the inbound communication should be addressed, converted and routed through the network connection. Still further, some special content may require additional or different processing (e.g., conversion, decryption, etc.) as compared to other content. Additional processing category codes may allow such content to be processed appropriately. The processing category code may (like the device identifier) be a number that is included in the data package.

The data package may also be variously provided to the MC System. In one embodiment, the data package may be contained in a header area in packet data sent to the MC System by the source. Still further, at times the data package may itself contain information used in converting and/or addressing the appropriate device. For example, the data package itself may contain the network address of the destination device in lieu of looking for the same in the mapping table. As another example, all or part of key information for decrypting content may also be provided in the data package. As still another example, the data package may contain a flag to track an indication as to whether a virus screening process has completed successfully.

Devices that are intended to work with the MC System may also be equipped with software and/or hardware that allows them to insert and deliver the appropriate information in communications with the MC System. For example, a cellular phone may be equipped with software that provides the appropriately configured data package in initiating communications with the MC System that are directed to destination devices.

The MC System variously processes data depending upon corresponding devices and purposes for the data. For example, the data received from cellular networks are selected and then converted to be displayed on home or office appliances with different types of display screens. Similarly, some content can be displayed more properly by mobile phone displays.

In addition, some data are also compressed and re-organized at the MC System so that they have certain data package sizes and formats for matching the requirements of the relevant transmission networks. For example, the signals sent from a wet diaper, fire alarm, and/or theft sensor may be transmitted to a user's cell phone or 911 Center. This information may be compressed before transmission over the wireless network, which allows increased efficiency when using the wireless communication channel. Additionally, security and encryption protocols (e.g., SSL) and error prevention protocols and coding schemes (e.g., Huffman, Solomon, or Turbo LDPC coding) may be applied to ensure that the information that is transmitted remains secure and without error.

By way of example, this aspect of the invention may be applied to home appliances. The home appliances (e.g., TV set, PC, Handset, Printer, PALM, camera, Headset, game controller, refrigerator, etc.) may also function through a centralized HUB system (CHS). Such a HUB system is previously described in detail above. The CHS communicates with the MC System and/or Internet and/or other networks. The CHS can also be built into a cable modem, TV set top box, or other device. The signals, for example, from a wet diaper, fire alarm, or theft sensor can also be sent from the CHS. Finally, it is noted that the CHS may perform the functions described for the MC System.

The commonly practiced wireless connection centralized by wireless access point is based on WLAN technology, which is IP-oriented technology. Since the IP addresses may exhaust over time, each consumer electronics item such as headset, game controller, etc. configured to have an IP address is costly and fails to serve the user's needs well. One or more embodiments of the present invention offer two aspects in this regard. First, an intelligent management system centered by traditional connection equipment, such as TV set top box, cable modem, DSL modem or the like unites, manages, and optimizes the consumer electronics' functions. Also provided is a non-IP based wireless connection among these consumer electronics devices.

As shown in FIG. 16, the CHS communicates with the Internet through ADSL or cable and cellular base stations through wireless connection. The consumer electronics items communicate with the CHS through wireless channels such as Bluetooth, UWB, NFC or wire line connection. CHS is the center of this wireless communication system.

A handset (e.g., cellular phone) can receive Internet data through CHS and/or MS instead of communicating with a cellular base station. This communication channel is more reliable, less costly, and offers improved bandwidth compared to conventional connections between base station and the cellular phone.

There may be a corresponding connection between the CHS and the cellular network. This may implement a traditional wireless connection between the CHS and a cellular base station, with the communications implementing conventional wireless communications protocols. Another possibility is a leased line or wireless line connecting the CHS to the core cellular network. The CHS preferably includes a WiFi router function as well as the ability to route addresses between IP and cellular telephone number. It also is able to report to the cellular network with regard to the location of a particular user, so that information designated for that particular user may be directed to the CHS accordingly (e.g., calls, content ordered by particular user via cellular phone, etc.). It also may include any necessary conversion functions. In addition to reporting the location of a user to the cellular network, the MC System (or CHS) may also report roaming information to other MC Systems (or CHS). This allows subsequent communications between users without involving the cellular network. That is, a first user may be located in the covered area for a first MC System, and a second user may be located in the covered area of a second MC System. While this circumstance remains, communications between the first and second users via their mobile terminals may involve the wireless connections from the MC Systems (as well as the connection between MC Systems, which may, for example, be an IP connection).

In addition, the information sent to the cellular phone can be delivered to a TV for a better display in accordance with another aspect of the present invention. Furthermore, the communication between CHS and an oven with sensors and corresponding conditions can be variously triggered, such as through the detection of boiling water or the temperature of the food in an oven. A signal to arouse the attention of whomever is cooking the food or boiling water is transmitted to the TV, acoustic system, cellular phone, computer, beeper, mobile terminal, PDA, etc.

Another example of the application of the invention is that a wireless transceiver can be installed in a child's diaper. When the diaper is wet, the communication between diaper and CHS is triggered. Corresponding signals will be delivered to TV, cellular, day care center, etc.

Internet content is one source of data transmitted to users' terminals through the MC System. One aspect of this invention is the structured location of the Content Server and/or MC Systems, as shown in the FIG. 16.

As described in further detail above, a cache of locally applicable content caches particular Internet content that is determined to be locally applicable based upon the monitoring of the Internet content accessed by users from the particular location. This content may be content that has also been converted as described herein. The particular Internet content is preferably cached at a local content storage placed within local Management Center. Alternatively, the particular Internet content is cached at Content Server which is placed logically proximate to two or more Management Centers sharing the Internet content. Logical proximity may be variously carried out, such as through physical proximity or by provision of dedicated bandwidth and resources. Requests for Internet content for the particular location may thus be served from the cache, to optimize delivery, where the cache contains the requested content.

In addition, the caching of locally applicable Internet content may be maintained on a layered basis, such that a first layer of local applicability corresponds to Internet content requested by users in a first geographical area in which the particular location resides, and at least one succeeding layer of local applicability corresponds to Internet content requested by users in at least one succeeding geographical area that encompasses and is larger than the first geographical area.

Merchants or other commercial entities may also provide some form of access to information related to the locally applicable Internet content, with commercial incentives such as coupons or advertisements being delivered to users based upon that information.

The logical proximity based on physical proximity or provision of dedicated bandwidth and resources also applied to the locations of MC Systems and/or Content Servers. MC Systems and/or Content Servers are located according to the local service requirements, dedicated bandwidth and other resources, geographical and demographical situations, cost, etc. The MC Systems can also be structured and placed in layers as described in the layered structure of Content Servers. The comparative positioning of MC Systems and Content Servers are determined based on service requirements, resources, costs, and monetary incentives Importantly, the Management Centers and Internet Content Servers are structured for efficient transmission of data and to avoid bottleneck problems.

It is noted that this aspect is not limited to Internet content. The MC Systems and Content Servers may store content from various resources.

A variety of data transmission protocols may be used to transmit multimedia content to the MC System, including from cellular networks (e.g., 3G), Internet, Service Providers, and from other MC Systems.

A set of transmitter(s) and/or receiver(s) for connection with external resources is equipped at the MC System. The connection channels for data transmission may include wired line connections (e.g., DSL, Fiber, Cable, DSL, least line, etc.) between the MC System and outside networks (e.g., Cellular Network, Internet, Service Provider networks). Additionally, wireless connections (e.g., WiMax, Satellite communications (e.g., VSAT system), traditional communications with cellular base stations, point-to-point or point-to-multipoint wireless connections) may provide the connection between the MC System and outside networks. MC Systems may also connect, communicate, route, and relay content among and between each other. The connections among MC Systems are structured by efficient data transmission, service requirement, cost, bandwidth and other resources availability, and the relationships with Internet Content Servers, Cellular Networks, local Service Providers, and other MC Systems.

A variety of communications may also be applied for the communication channels between the MC System and the various local user terminals. At the user terminal side, the users use TV, computer, DSL modem, Cable modem, WLAN access point, mobile terminals, and various sensors that communicate with the MC System.

A set of transmitter(s) and/or receiver(s) are equipped for the data transmission between the MC System and user terminals. Communication channels between the MC System and user terminals include the following: (1) direct connection using the available transmission port/standard such as USB, RS232, TV cable, Ethernet, Telephone line, etc.; (2) Wireless Personal Area Network such as UWB, Bluetooth, WLAN, etc.; (3) Long-range wireless connections such as WiMax, Satellite, e.g., VSAT, TV broadcast, etc.; or (4) Wire-line connection such as DSL, Cable, Ethernet, etc.

The data transmission between an MC System and user terminals can be one-way or two-way. One-way data transmission includes data sent from the MC System to the user terminals and the data sent to the MC System from user terminals. For example, the MC System sends data to user terminals (e.g., advertisement broadcast to TVs, computers, mobile terminals, etc.). Similarly, the user terminals send data to the MC System (e.g., signals sent from a fire alarm to an MC System.). The data transmitted between an MC System and a user terminal is preferably bidirectional. In this circumstance, transmitter and receiver at both sides are equipped.

The operations on data processing and transmission at an MC System can be shared with a plurality of user terminals and/or other MC Systems. In some circumstances, some functions of the MC System described above can be done by a user terminal so the MC System is omitted. One aspect of the invention is a TV or other display that is equipped to receive RF signals sent from cellular base stations. The cellular television demodulates, and/or compresses/decompresses data, and/or converts the signals to the appropriate format before displaying the image/video. The conversion and transmission provided with the television can also be two-way. The cellular television with a video camera/microphone can also record and extract the multimedia information, which can be transmitted to other users' terminals through cellular network or Internet. The cellular television is equipped to extract and/or convert, and/or compress, and modulate the multimedia information before sending it to the cellular base station. The cellular television also preferably has a separate channel for displaying multimedia information from the cellular network or other networks beyond traditional TV programs. Users may also use the TV remote controller to dial telephone numbers like a telephone dial panel.

Figure 17:
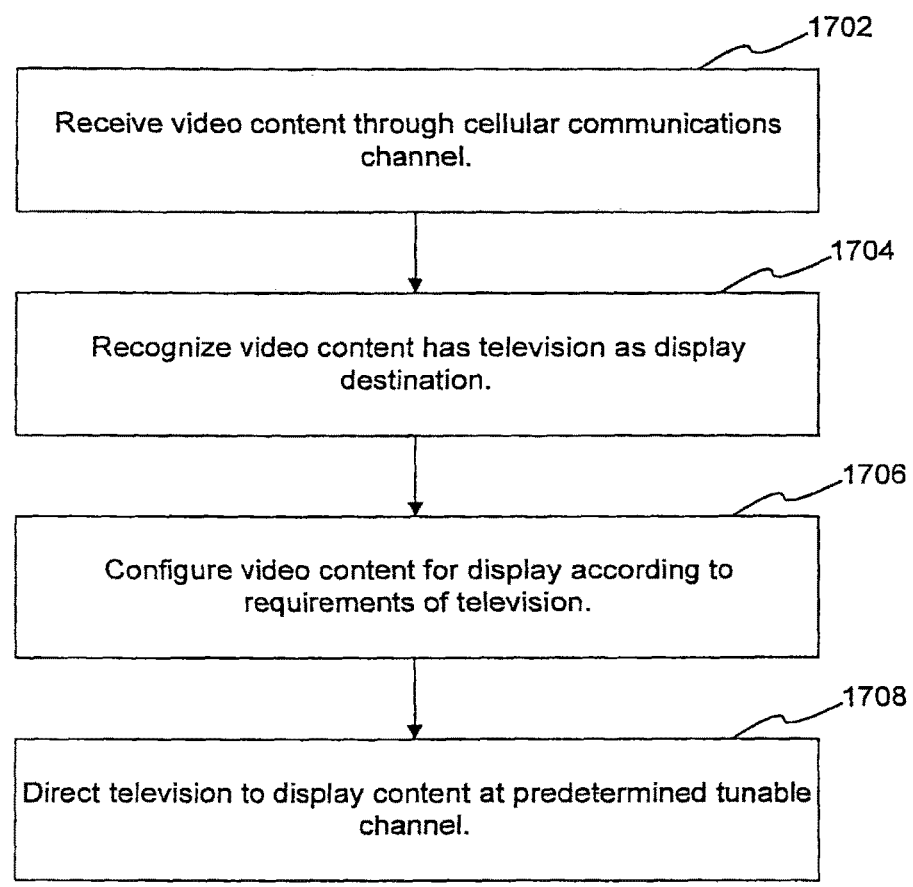
FIG. 17 is a flow diagram illustrating an example of directing a television to display content using signals received from a remote location through a cellular communications network.

FIG. 17 is a flow diagram illustrating a process 1700 for directing a television to display content using signals received from a remote location through a cellular communications network. In one embodiment, the process is carried out within a television set that is equipped to receive the signals wirelessly from a cellular base station and provide the corresponding conversion and direction to display the content on a given channel. In that regard, the housing of the television set includes conventional cellular phone technology for at least receiving (and possibly sending, if desired) calls via a connection to a cellular network. The television set is also equipped with processing capability for carrying out the signal conversion requirements, as described in detail above regarding the MTSCM.

In an alternative embodiment, a set top box is configured to receive the wireless signal, and to output signals appropriately formatted for the television. In still another embodiment, the MC System is equipped to receive a wireless signal, and to perform the conversion and routing to the television set. In either of these circumstances, the set top box or MC System is similarly equipped to provide the noted cellular communications capability and MTSCM functionality. It is also noted that there may be embodiments where the functionality is divided between the set top box, television set, MC System and/or CHS in various ways involving at least two and sometimes all three devices.

The process initiates upon receipt 1702 of video content through a cellular communications channel. This communication may be received, for example, at the initiation of a cellular phone user who wishes to send the content. The connection may, for example, be made using a regular cellular telephone call to a designated number corresponding to the television. At this time, the content as sent from the remote cellular phone to the television will be formatted as required by the cellular network. The MTSCM functionality converts such signals from the cellular network and related format to the format used by the television (e.g., SD or HD standards).

Where it is recognized 1704 that video content has the television as a display destination, the video content is then configured 1706 for display according to the requirements of the television, for example as described regarding the MTSCM functionality. Recognition 1704 that the content is destined for the television set may be presumed where a dedicated number or known routing of signals to the television set at a given interface is provided.

Finally, the television is directed 1708 to display the converted content on a predetermined channel. This predetermined channel may, for example, be a tunable channel that is otherwise unused for other forms of content. To view video content in this fashion, the user merely uses a channel button or the like to navigate to the appropriate channel, and then the converted content is shown on the display screen of the television. In the alternative where the set top box is used to provide the noted functionality, the tuning may be provided through a remote that controls the set top box. A given channel on the set top box may correspond to the content received in this fashion. The output of the set top box provides the converted content through a conventional connection to the television such as an HDMI, component cable, S-video or other connection.

Figure 18:
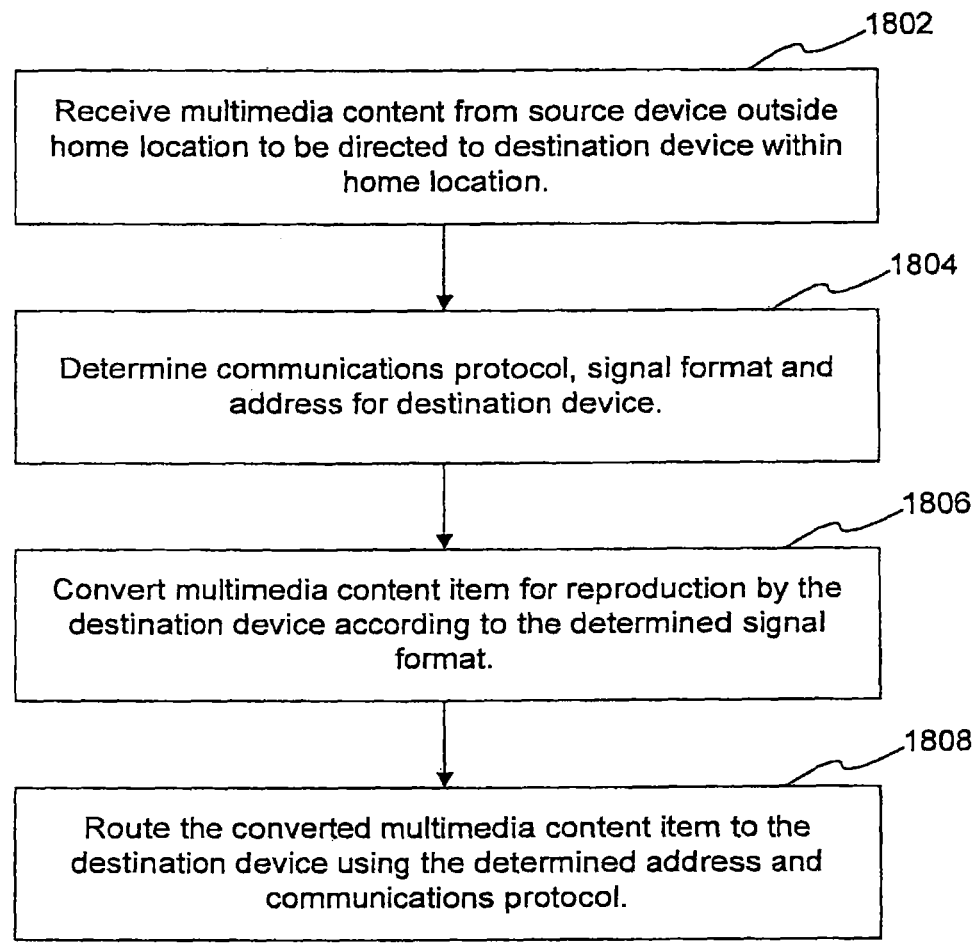
FIG. 18 is a flow diagram illustrating an example of converting and routing multimedia content to different terminals.
Figure 19:
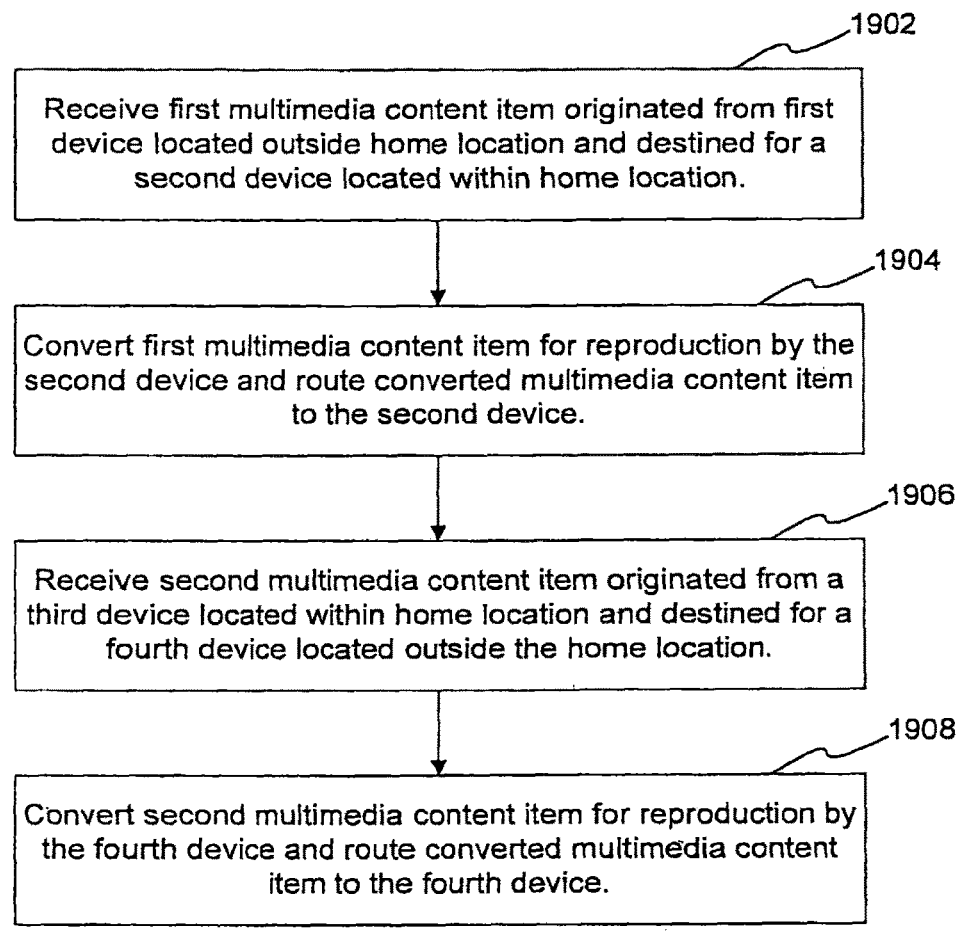
FIG. 19 is a flow diagram illustrating an example of bidirectional operation involving transmitting and routing multimedia content into and out of the home.
Figure 20:
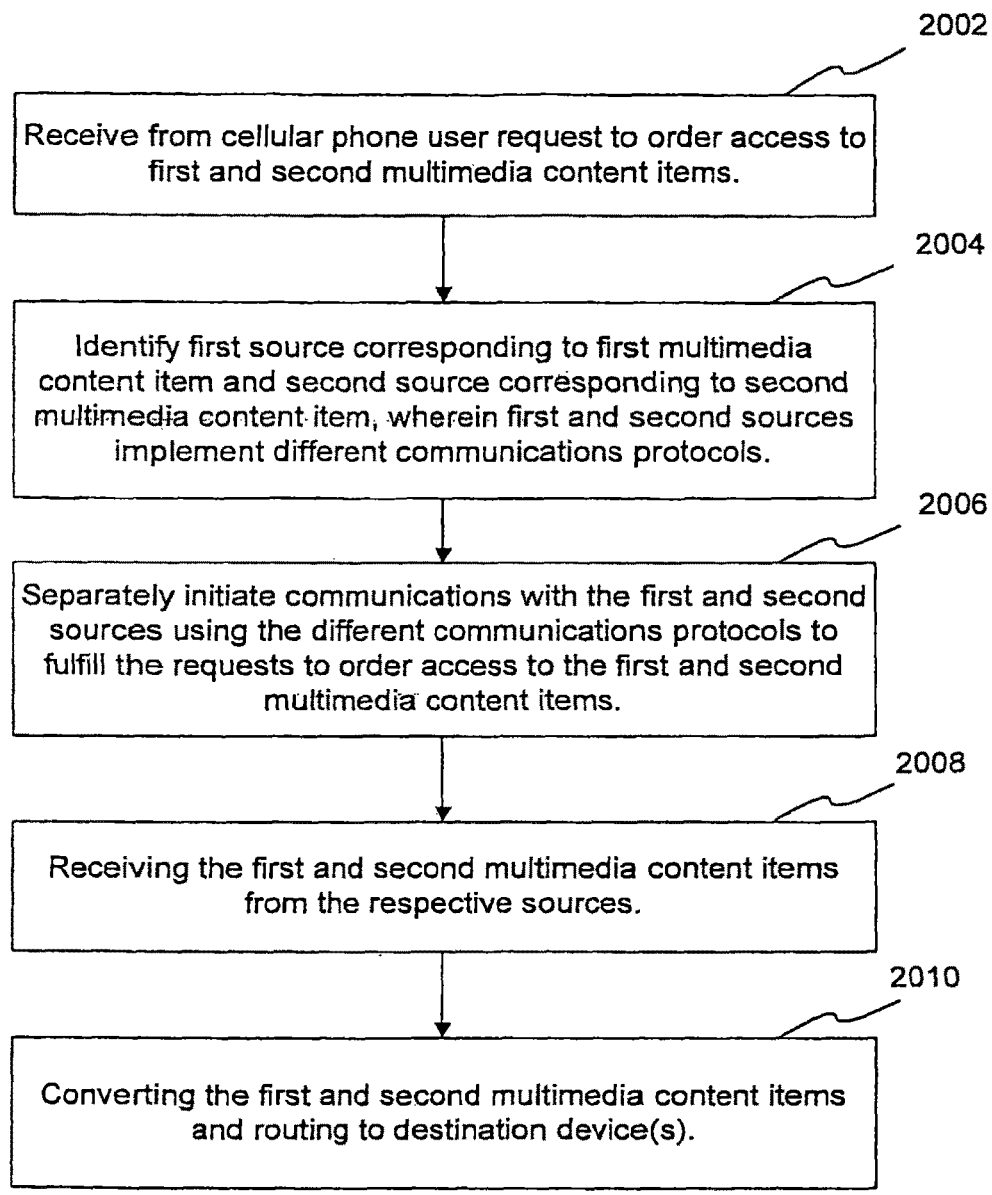
FIG. 20 is a flow diagram illustrating an example of receiving and accommodating completion of multimedia content requests corresponding to different sources.

Turning now to several other aspects of the present invention, FIGS. 18-20 illustrate examples wherein the MC System converts and routes content to particular devices.

According to a first aspect, the MC System is configured to convert and route multimedia content to a variety of different (e.g., household) devices, which require addressing and may include not only different communications protocols, but also different formats. FIG. 18 is a flow diagram illustrating a process 1800 of conversion and routing multimedia content to different terminals.

The process 1800 initiates upon receipt 1802 of multimedia content from a source outside the home location, to be directed to a destination device within the home location. The destination device may comprise different devices having different formats and receiving signals through different communications protocols.

The MC System then determines 1804 the communications protocol, signal format and address for the destination device. This, for example, may be performed either by referring to the data package information, mapping table information, or a combination thereof as described above.

The inbound multimedia content is then converted 1706 for reproduction by the destination device according to the determined signal format for that device. Finally, the converted multimedia content is routed 1708 to the destination device using the determined address and communications protocol corresponding to the destination device.

According to another aspect, the MC System offers bidirectional conversion, wherein content not only may be inbound to various different devices, but may also be communicated to various remote devices. This function may similarly be carried out using the various connections available with the MC System as well as the corresponding information in the mapping table and data packages.

FIG. 19 is a flow diagram illustrating an example of bidirectional operation involving a first device transmitting inbound content to a second device within the home governed by the MC System, and a third device transmitting outbound content to a fourth device outside the home.

The process 1900 entails receiving 1902 a first multimedia content item originated from a first device located outside the home location and destined for a second device within the home location. The first multimedia content item is then converted 1904 for reproduction and routed to the second device. Similarly, the second multimedia content item is received 1906 from the third device located within the home location and destined for a fourth device located outside the home. The second multimedia content item is converted 1908 for reproduction by the fourth device and the converted multimedia content item is routed to the fourth device.

According to still another aspect of the present invention, the MC System allows a user to remotely make orders for content using a cellular phone, wherein the content may come from a variety of different sources. FIG. 20 illustrates a process 2000 for receiving and accommodating completion of multimedia content requests corresponding to different sources.

The process 2000 initiates by receiving 2002 from the cellular phone user requests access to first and second multimedia content items. Examples of requests may include individual content purchases, selection of content previously purchases, selection of content that does not need to be purchased, and others. For example, the cellular phone may be used to directly contact the MC System. Another way this may be done is by using a cellular phone to communicate with the MC System with intervening communication occurring with the cellular base station. That is, with reference to FIG. 16, the cellular phone may be used to communicate with the cellular base station, and the cellular base station may then communicate with the MC System using the various communication channel options as shown. The first and second multimedia content items may of course be ordered on separate occasions and may correspond to content available from completely different sources.

The MC System identifies 2004 a first source corresponding to a first multimedia content item as well as a second source corresponding to a second multimedia content item. These sources may use any number of different communications protocols to carry out the delivery of content to the home.

The MC System then separately initiates 2006 communications with the first and second sources using the different communications protocols to fulfill the requests to order access to the first and second multimedia content items. The first and second multimedia content items are then received 2008 by the MC System and converted for reproduction by the destination device and routed accordingly (2010).

Various devices and various content sources may be applicable according to this embodiment. For example, an initial step may involve the user communicating with the MC/CHS using his cellular phone (e.g., directly, or through an intervening cellular base station). The user may then make various types of requests to the MC/CHS. For example, the MC/CHS may be instructed to make a call to another user's cellular phone. Alternatively, the user may instruct the MC/CHS to obtain information corresponding to a request, such as current news stories based upon a previously or currently submitted keyword (e.g., news regarding President's veto of a law). Corresponding format and addressing information is then provided to the MC/CHS. For example, the MC/CHS may be instructed that the IP address of the user's PC is the destination address for the requested cellular phone call, and the cable port address of the user's television may be the destination address for the requested news. Finally, the MC/CHS engages in appropriate conversion and routing to deliver the requested content accordingly. For example, the MC may communicate with the cellular network to find the other user to whom the cellular phone call is desired, and convert the received data package defined as the cellular network to a TCP package, providing the user's PC IP address as the destination address. Network protocols may then be used to transmit the converted data to the user's PC (e.g., over the Internet (TCP/IP) or through a direct network connection). With regard to the provision of the news corresponding to the search query, the MC/CHS may use the MC content layer structure to find the best source and route for the requested content. For example, it may seek the news at a local Internet content server (which may be the MC System itself, as the MC System is configured to store content that may be variously served as described herein). The MC System converts the corresponding content to a television format and transmits it to the television such as through a direct wired connection or a wireless connection (e.g., via UWB between the TV and CHS).

According to still another aspect of the present invention, a method for optimizing the delivery of content that is commonly requested by a plurality of users in a particular location is provided. This entails monitoring network content requested by users corresponding to the particular location, receiving a request for a particular content item from a given user in the particular location, wherein the particular content item is ordinarily served from a location outside the particular location, determining that the particular content item is also requested by other users in the particular location, and concurrently serving the particular content item to the given user and the other users using a server that is logically proximate to users in the particular location, in lieu of separately serving the particular content item to the given user and the other users from locations outside the particular location. In one embodiment, the layered approach previously described is used to make determinations as to whether content is locally applicable. At that location, requested content may be monitored and determinations as to whether the content is commonly requested within the particular locality may be made.

Figure 21:
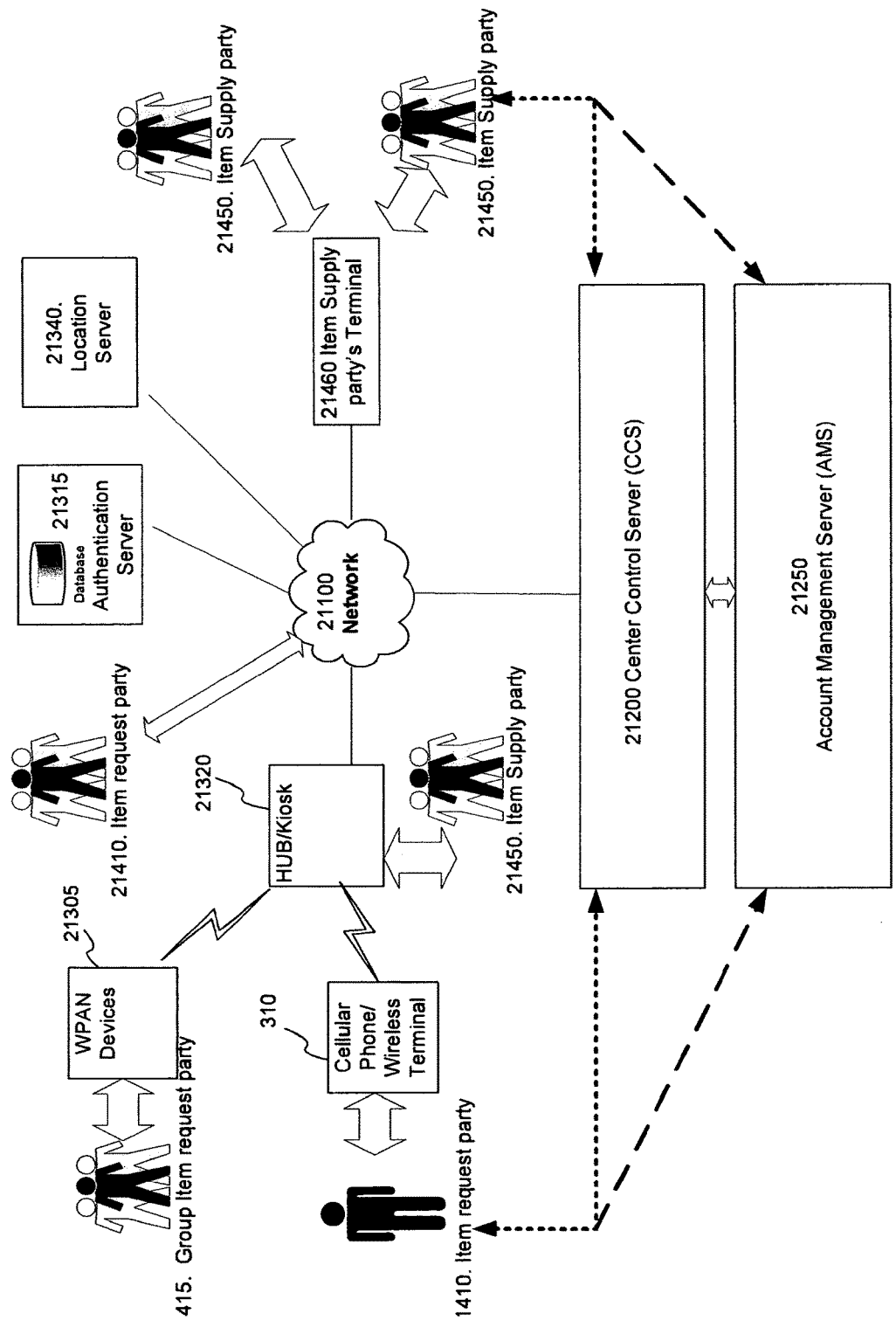
FIG. 21 is a schematic diagram illustrating the architecture of an example of a system in accordance with the present invention.

FIG. 21 illustrates an example of a system architecture in accordance with the present invention. The system includes Center Control Server 21200, which is connected to a wireless HUB 21320, Authentication Server 21330, Location server 21340, Account Management Server 21250, and user terminal(s) 21460 through a network 21100, such as the Internet. The wireless HUB 21320, along with Authentication Server 21330, authenticates user's identification through a short range Electromagnetic (EM) radiation and provides the user with access to secure data communication with a wireless terminal such as a cellular phone or a PDA. The Center Control Server 21200, through various functional modules, manages the data flow and coordinates the functions of the servers and user terminals. User location information is sent from the Location Server 21340 and processed to initiate, accelerate, and optimize the flow of information and corresponding processes.

Various aspects described herein may be embodied as systems, methods or computer programs. Computer program embodiments may be stored on a computer readable medium such as a magnetic disk, optical disk, non-volatile memory, or other tangible computer readable media. Such computer programs variously include program instructions that are executable by a processor to perform operations comprising those described in detail herein.

One aspect of the invention implements a cellular network, a wireless personal area network (WPAN) and wireless identification technology. Various technologies are applicable to this aspect of the invention, including but not limited to 3G technology for the cellular network; Zigbee, Bluetooth, or UWB technologies for the WPAN; and RFID (e.g., NFC) for the wireless identification technology.

The present invention facilitates secure data transmission through the wireless HUB 21320. The wireless HUB 21320 first receives and recognizes a unique identifier corresponding to a mobile terminal through a wireless connection. Once this authentication is processed, the wireless HUB 21320 establishes a communication channel with the user terminal for secure data transmission. The data is routed via the secure communication channel to the Center Control Server 21200 and processed by the function modules.

FIG. 3 illustrates and provides a system process in accordance with this aspect of the invention. In FIG. 3, the secure communication channel is separate from the short range wireless connection used to receive the unique identifier in order to achieve a greater bandwidth. Alternatively, the authentication and data transmission upon the completion of the authentication can share a wireless communication channel.

The wireless HUB (WHUB) 21320 is located in a public or private location. For a public location, the WHUB 21320 is preferably housed in a kiosk. The kiosk may be located on a street, or in an airport, shopping mall, or any location that is perceived as convenient and likely to include user traffic. For private locations, the WHUB 21320 is preferably configured for usage in locations like homes or hotel rooms. In these environments, the WHUB 21320 may be provided in a smaller device such as part of a Set Top Box (STB).

The handset 21310 is equipped with a tag that provides a unique identifier that can be wirelessly communicated to the WHUB 21320. A preferred tag is a Near Field Communication (NFC) tag 21312. NFC provides short-range wireless connectivity via EM radiation that uses magnetic field induction to enable communication between the devices. It has a short range of a few centimeters, which is believed to provide security advantages for applications of this aspect of the present invention. Although NFC is preferred, RFID or other substitutes can also be provided. The handset 21310 also includes a WPAN transceiver 21314, which allows an additional communication channel between the handset and the WHUB.

The wireless WHUB 21320 is similarly equipped with an NFC reader 21322, a WPAN transceiver 21324 and a network adaptor 21326. The NFC technology accommodates secure and automatic authentication and data exchange between the NFC tag and NFC reader.

Figure 24A:
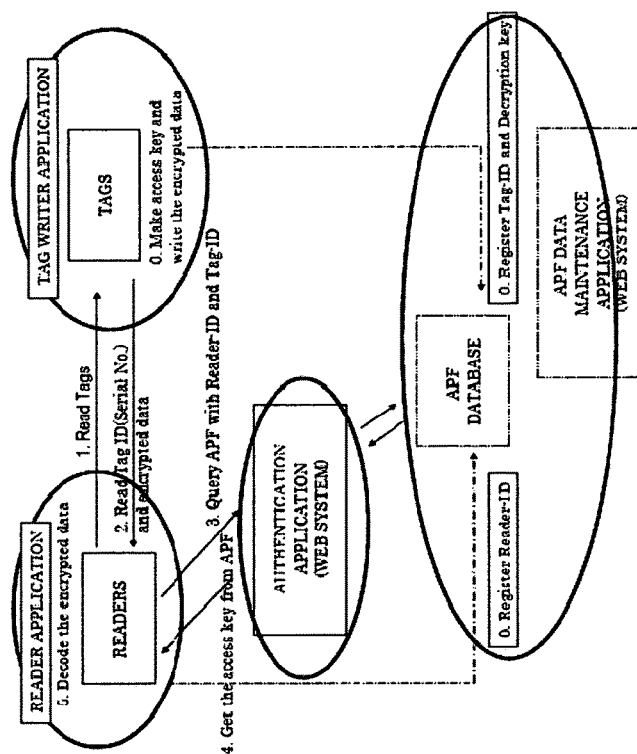
FIGS. 24A-B are schematic diagrams illustrating an example of an authentication process in accordance with the present invention.
Figure 24B:
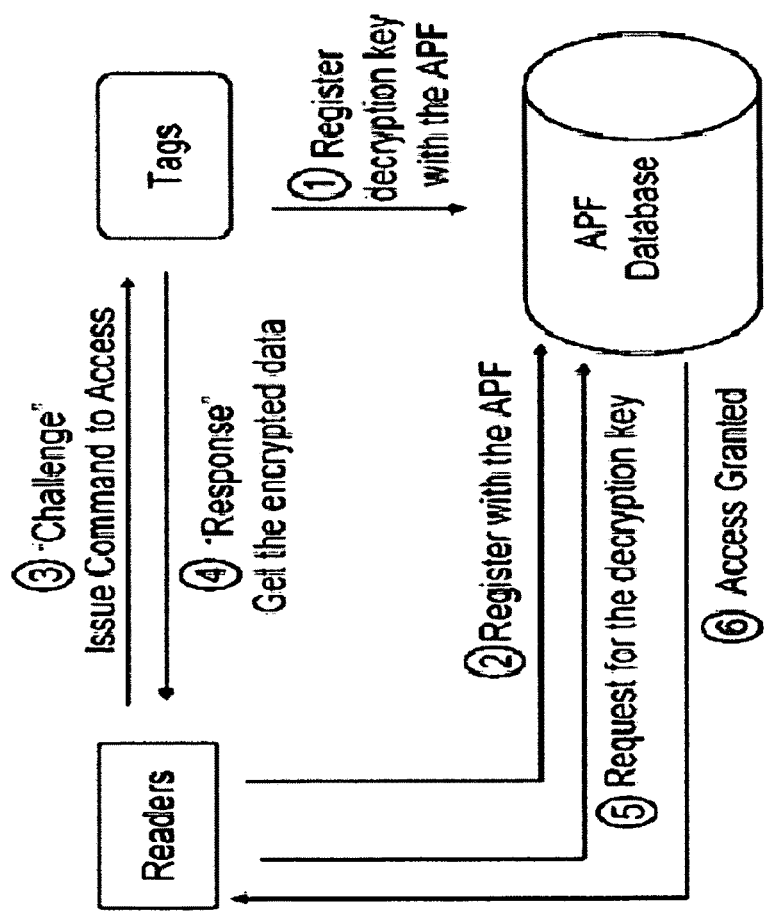

The process of authentication may be based upon a Tag ID and password 21002. The Tag ID and password 21006 are sent to the authentication server, which then returns a notification 21012 confirming authentication. Preferably, this authentication indicates whether the individual is who he or she claims to be, but does not address the access rights of the individual. The authentication server may reside within or outside the WHUB 21320. The authentication processes are further illustrated in FIGS. 24A-B.

The communication through the separate secure communication channel (e.g., WPAN) is then established upon the completion of authentication. The WPAN functionality is used to communicate between the handset and the WHUB, so that content related to a requested action may be securely exchanged. In this example, the requested action is a purchase request 21004.

According to one aspect of the present invention, the NFC is uniquely associated with other information that allows an appropriate action (payment, alert, etc.) to take place. For example, when the system is being used to accommodate mobile payment, the RFID tag can be associated with the user's bank account. Further, both the WHUB 21320 and wireless handset/terminal 21310 are authorized by the Authentication Server 21330. Once the devices are authenticated (i.e., the WHUB is a genuine WHUB), a second secure communication channel with more capabilities is established between the handset 21310 and WHUB 21320. This allows the action request and transaction information to be reliably transmitted between the two devices. Once the user's terminal 21310 is associated with the user's bank account, the WHUB 21320 can perform the functions of an ATM for the user to manage his bank account (e.g., depositing or withdrawing money from the user's bank account).

A communication of the second secure wireless connection or both wireless connections can implement a WPAN transceiver, which has a higher data rate and longer operational range compared to NFC. The secure communication can be implemented by hardware (e.g., a dedicated hardware chipset) and software (e.g., data encryption algorithm) The secure communication allows the exchange of transaction process information such as price and credit card information for a purchase request and bidding proposals among transaction parties. It is also noted that the WHUB 21320 is optionally configured with a wireless communication capability such as cellular network communication. The WHUB 21320 is also preferably configured to operate with a system that delivers Internet content.

The WHUB 21320 can also exchange data with other WPAN devices 21350, and the WPAN can include NFC functions for authentication purposes.

The NFC communication system used in this invention is an inductively coupled RFID system. Its working frequency is designed to utilize either low frequency (LF) 125 kHz or high frequency (HF) 13.56 MHz, due to the fact that higher usable field strengths can be achieved in the operating range of the reader (e.g., 0-10 cm) in a lower frequency band than would be the case in a higher frequency band.

Figure 24C:
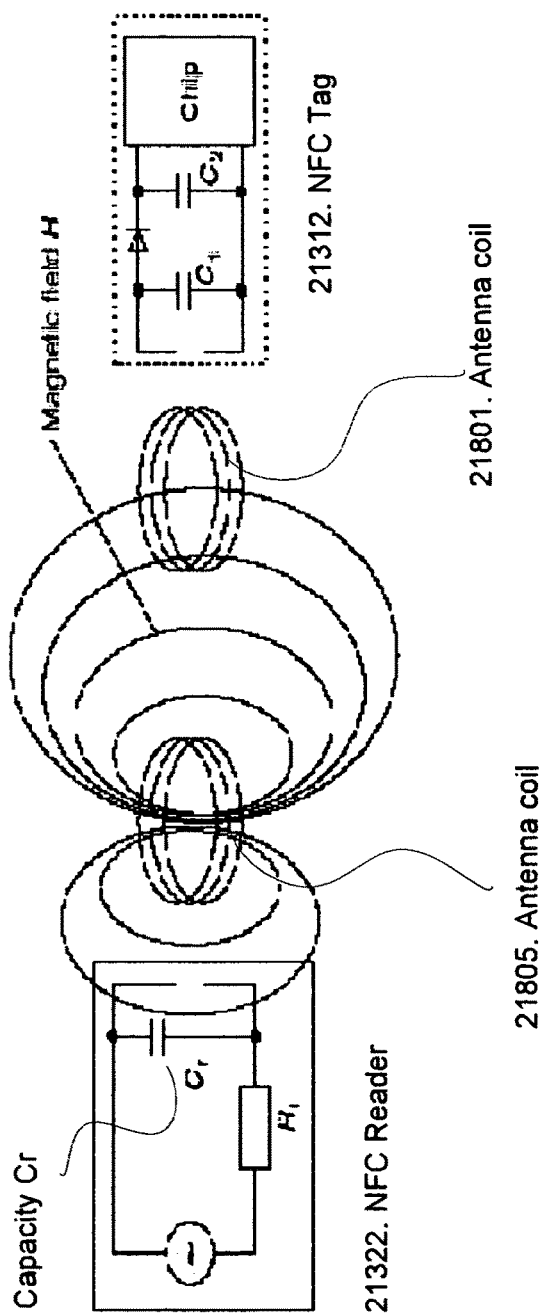
FIG. 24C is a schematic diagram illustrating an example of an NFC communication system in accordance with the present invention.

Due to the short distance between the reader and NFC tag, this NFC system employs inductive coupling for data transmission. Energy needed for the operation of the NFC tag 21322 can be provided by the NFC reader 21322 (FIG. 24C). For this purpose, the reader's antenna coil 21805 generates a strong, high frequency electromagnetic field, which penetrates the cross-section of the coil area and the area around the coil. Because the wavelength of the frequency range used (125 kHz: 2400 m, 13.56 MHz: 22.1 m) is several times greater than the distance between the NFC reader's antenna and the NFC tag, the electromagnetic field may be treated as a simple magnetic alternating field with regard to the distance between NFC tag and antenna.

NFC uses magnetic field induction to enable communication between devices when they're touched together, or brought within a few centimeters of each other. The energy and wave transmission are based on Maxwell's equation $$\begin{cases} \dfrac{\nabla \times B}{\mu} = j + \dfrac{\partial D}{\partial t} \\ \nabla \times E = -\dfrac{\partial B}{\partial t} \\ \nabla \times E = 0 \end{cases} \quad (1)$$

where B is the magnetic induction, E is the electric field, D is the electric displacement, and H is the magnetic field. The definition for cur $\nabla \times A$ is $$\nabla \times A = \left(\dfrac{\partial A_z}{\partial y} - \dfrac{\partial A_y}{\partial z}\right)\vec{x} + \left(\dfrac{\partial A_x}{\partial z} - \dfrac{\partial A_z}{\partial x}\right)\vec{y} + \left(\dfrac{\partial A_y}{\partial x} - \dfrac{\partial A_x}{\partial y}\right)\vec{z} \quad (2)$$

A plane electric wave travel in the horizontal ("x") direction space is represented as $$\dfrac{\partial^2 E}{\partial x^2} = \dfrac{1}{c^2}\dfrac{\partial^2 E}{\partial t^2}$$

where c is the speed of light. The same form can be applied to magnetic field wave in a place perpendicular the electrical field. Both E&B field are perpendicular to the travel direction x:

$$E = E_m \sin(kx - \omega t)$$

$$B = B_m \sin(kx - \omega t) \tag{3}$$

The WHUB 21320 communicates with Location Server 21340 for the mobile terminal 21310 location. The Location Server 21340 may detect the mobile terminal 21310 location using various techniques such as Time Difference of Arrival (TDOA), Received Signal Strength Indication (RSSI), GPS/AGPS, and cellular tower. The location information is used to promote merchandise trading and accelerate and optimize the transaction process. The user location information can be further used for security purposes. For example, a user detected at location A may be declined to a request for a cash advance or withdrawal that is made from a WHUB 21320 that is actually at a different location B.

Received signal strength indication (RSSI) based location mechanism is typically used in the environment where the density of fixed reference signal sources (such as cell tower, access points) is high. The transmitting power of a reference signal source is denoted as $P_t$, and the distance between the reference signal source and the mobile device is d. The RSSI can be calculated as follows:

$$P_r = P_t - 20 \log_{10}(4\pi f/c) - 20 \log_{10} d \tag{4}$$

where f is the RF frequency.

The RSSI based location mechanism constitutes two steps: 1) site survey to generate radio map and 2) table looking based location estimation. In step 1, a radio map is generated via either manual site survey or some automotive software algorithm. The radio contains list of positions with correlated RSSI values. After a radio map is generated, the location of a mobile device is estimated by comparing the instant RSSI from different reference signal sources with the radio map. The location in the radio map with the RSSI data that match the current RSSI data will be considered as the mobile terminal's location.

Another position tracking method that may be used to provide the location information to the Location Server 21340 would typically involve a mobile user who is operating on an OFDM wireless communication system. The OFDM system is one of the modulation schemes for next generation wireless communication systems. An OFDM system with N sub-carriers employs M-ary digital modulation, a block of $\log_2 M$ input bits is mapped into a symbol constellation point $d_k$ by a data encoder, and then N symbols are transferred by the serial-to-parallel converter (S/P). If T denotes the symbol interval, the symbol interval in the OFDM system is increased to NT, which makes the system more robust against the channel delay spread. Each sub-channel, however, transmits at a much lower bit rate of $\log_2 M/NT$ bits/s. The parallel symbols $(d_0 d_1 \ldots d_k \ldots d_{N-1})$ modulate a group of orthogonal sub-carriers, which satisfy $$\frac{1}{NT} \int_0^{NT} \exp(j2\pi f_i t) \cdot \exp(j2\pi f_j t) \, dt = \begin{cases} 1 & i = j \\ 0 & i \neq j \end{cases} \tag{5}$$

where $f_i = \frac{i}{NT}, (i = 0, 1, \ldots, N-1)$

The baseband transmitted signal can be represented as $$s(t) = \frac{1}{\sqrt{NT}} \sum_{k=0}^{N-1} s_k e^{j2\pi f_k t} \ (0 \leq t \leq NT) \ f_k = \frac{k}{NT} \tag{6}$$

The average energy for the complex baseband symbol $s_k$ is denoted by $2E_s$. Then $s_k$ is given by:

$$s_k = \sqrt{2E_s} \cdot d_k \tag{7}$$

where $d_k = d_{k,r} + j \, d_{k,i}$, is the signal constellation point (e.g. BPSK, QPSK, QAM, etc.) with normalized variance $E[|d_k|^2] = 1$. The real and imaginary parts $d_{k,r}$ and $d_{k,i}$ are statistically independent, identically distributed and $E[d_{k,r}] = E[d_{k,i}] = 0$.

A command frequency selective randomly varying channel with impulse response $h(t, \tau)$ is considered. Within the narrower bandwidth of each sub-carrier, compared with the coherence bandwidth of the channel, the sub-channel is modeled as a frequency nonselective Rayleigh fading channel. Hence, the channel impulse response $h_k(t, \tau)$ for the $k^{th}$ subchannel is denoted as $$h_k(t, \tau) = \beta_k(t) \cdot \delta(\tau) \tag{8}$$

where $\beta_k(t)$ is a stationary, zero mean complex-valued process described as follows. It is assumed that the processes $\beta_k(t), k=1, \ldots, N$, are complex-valued jointly stationary and jointly Gaussian with zero mean and covariance function $$R_{\beta_k \beta_l}(\tau) = E[\beta_k(t+\tau) \beta^*_l(t)], k, l = 0, \ldots, N-1. \tag{9}$$

For each fixed k, the real and imaginary parts of the process $\beta_k(t)$ are assumed independent with identical covariance function. Further assumed is the factorable form $$R_{\beta_k \beta_l}(\tau) = R_1(\tau) R_2(k-l), \tag{10}$$

with $R_1(\tau)$ and $R_2(k-l)$ specified below. $R_1(\tau)$ gives the temporal correlation for the process $\beta_k(t)$ which is seen to be identical for all $k=0, \ldots, N-1$. $R_2(k-l)$ represents the correlation in frequency across subcarriers. In this circumstance it is assumed that the corresponding spectral density $\Psi_1(f)$ to $R_1(\tau)$ is given by the Doppler power spectrum, modeled as Jakes model, i.e., $$D(f) = \begin{cases} \dfrac{1}{\pi F_d \cdot \sqrt{1 - \left(\dfrac{f}{F_d}\right)^2}} & |f| \leq F_d \\ 0 & \text{otherwise} \end{cases} \tag{11}$$

where $F_d$ is the (maximum) Doppler bandwidth. Note that $$R_1(\tau) = J_0(2\pi F_D \tau) \tag{12}$$

where $J_0(\tau)$ is the zero-order Bessel function of the first kind. In order to specify the correlation in frequency across subcarriers, an exponential multipath power intensity of the form $$S(\tau) = \alpha e^{-\alpha \tau}, \tau > 0, \alpha > 0 \tag{13}$$

is adopted, where $\alpha$ is a parameter that controls the coherence bandwidth of the channel. The Fourier transform of $S(\tau)$ yields $$\psi_2(f) = \frac{\alpha}{\alpha + j2\pi f} \tag{14}$$

which provides a measure of the correlation of the fading across the subcarriers. Then $$R_2(k-l)=\psi_2(\Delta f(k,l)) \quad (15)$$

where $\Delta f=1/NT$ is the frequency separation between two adjacent subcarriers. The 3 dB bandwidth of $\Psi_2(f)$ is defined as the coherence bandwidth of the channel and easily shown to be $f_{coherence}=\sqrt{3}\alpha/2\pi$. This model is applicable to many practical wireless OFDM systems and physical channel scenario.

The given value of the first arrived path $t_0$ and noise vector n are both zero mean random variable with probability density function represent as $$p(s|t_0) = \frac{1}{\text{Det}(Z_s)\pi^N} \exp(-s^* Z_s^{-1} s) \quad (16)$$

The value $t_0$ is obtained by applying ML when equation (16) is maximized Therefore, the location of the mobile user is estimated based upon the value of $t_0$.

According to one aspect of the invention, the financial transaction may or may not immediately follow authentication. The cellular phone may be configured to include browsing capability, which allows the cellular phone to be used to communicate with merchants prior to making a purchase request. Internet content can also be accessed by the cellular phone in association with a transaction request.

Also, the cellular phone may access Internet content through methods other than through the WHUB.

Various purchase types may be made with the purchase request. Examples may include a physical item that is separately shipped to an address, a download that is made available immediately, possibly to the cellular phone, a service, etc.

It is also noted that a purchase request is just one form of an action that may be carried out. Other business or financial transaction information processed by the system include but are not limited to bill payment, populating an account with funds, online shopping transactions, dynamic and reverse bidding, and others.

As necessary, additional information may also be required in association with a requested action. For example, account identification information or passwords to access an account for the transaction parties hosted by the system or an external server may be required. In these circumstances, the Account Management Server 21250 sends a request to the WHUB for the information. The WHUB may store such information and respond to such a request. Alternatively, the WHUB may further exchange information with the user (through the handset), in order to obtain the additional information requested.

In connection with the purchase request 21004, a payment request 21014 is made between the WHUB 21320 and Account Management Server 21250 through the network connection. The payment request 21014 allows the user to complete the transaction related to the purchase request 21004. To accommodate a satisfactory completion of the payment request, the Account Management Server 21250 corresponds with a payment gateway, and sends a solution 018 indicating the success or failure of the payment request.

Upon an indication of a successful payment request, the WHUB 21320 receives a receipt 21022 or confirmation number from the Account Management Server relating to the requested action, and passes 21024 that and related information to the handset confirming completion of the action. This may be a receipt, confirmation numbers, coupon codes, or the like.

According to another aspect of the invention, Account Management Server (AMS) 21250 opens and manages accounts for users. The system users are categorized into two transaction parties: the Item Request Party (IRP) and Item Supply Party (ISP). The ISP's income is remitted instantly or periodically to the ISP's bank account from ISP's account with Account Management Server 21250. This solution has unique advantage for cross-border financial transactions, particularly, for those countries that don't have compatible credit card payment infrastructure across borders.

Figure 25:
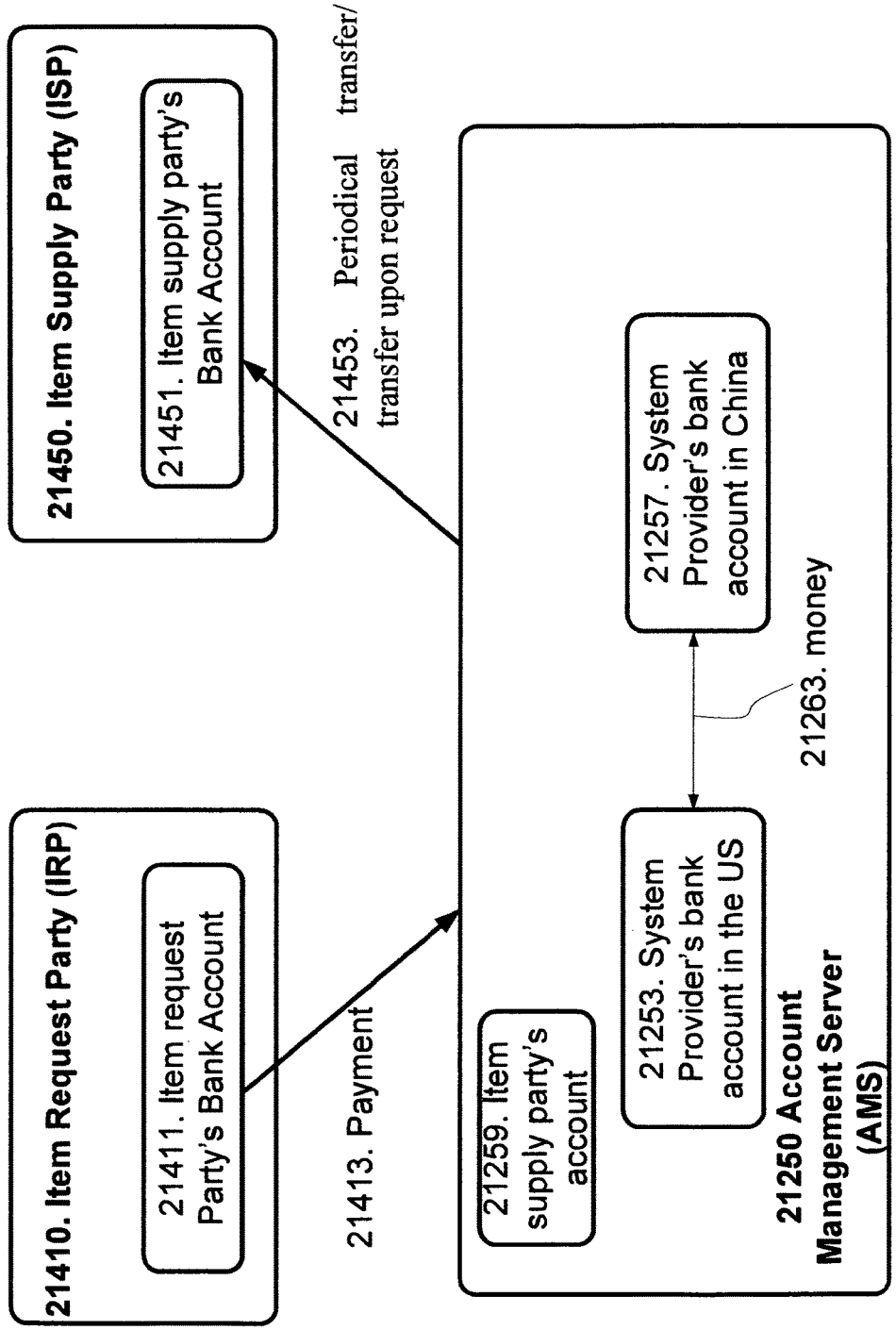
FIG. 25 is a block diagram illustrating an Account Management Server and corresponding functionality.

FIG. 25 illustrates certain functionality of the Account Management Server corresponding to an example of a payment solution for a transaction processed according to one aspect of the present invention. In this example, the IRP 21410 is a US tourist who has purchased tourism service package in China from a Chinese travel agency (the ISP 21450). The credit payment of the IRP 21410 is transmitted 21413 to the system provider's bank account in the US 21253. The Account Management Server 21250 adds the credit to the ISP's account with Account Management Server. The payment to the ISP's bank account in China is transmitted from the system provider's bank account in China 21257, e.g. with the Bank of China, as soon as the IRP in the US confirms the purchase. Hence, the charge related to cross border money transmission is avoided for every single international trade and business processed by the system. The accumulated payment in the system provider's bank account at one country can be transmitted to the account at another country periodically. Or the payment from IRPs at country A to ISPs at country B cancels out the payment from IRPs at country B to ISPs at country A so cross country money transmission can be avoided. Further, the system provider may choose the same international bank for its accounts at different countries to reduce the cross border financial transmission fee. This aspect of the present invention not only allows sellers of international business to receive payments promptly, it also benefits the online buyers and sellers with lower transmission fee for international trade and business. In addition, it provides an improved payment solution to the countries without sound credit card operations.

Figure 22:
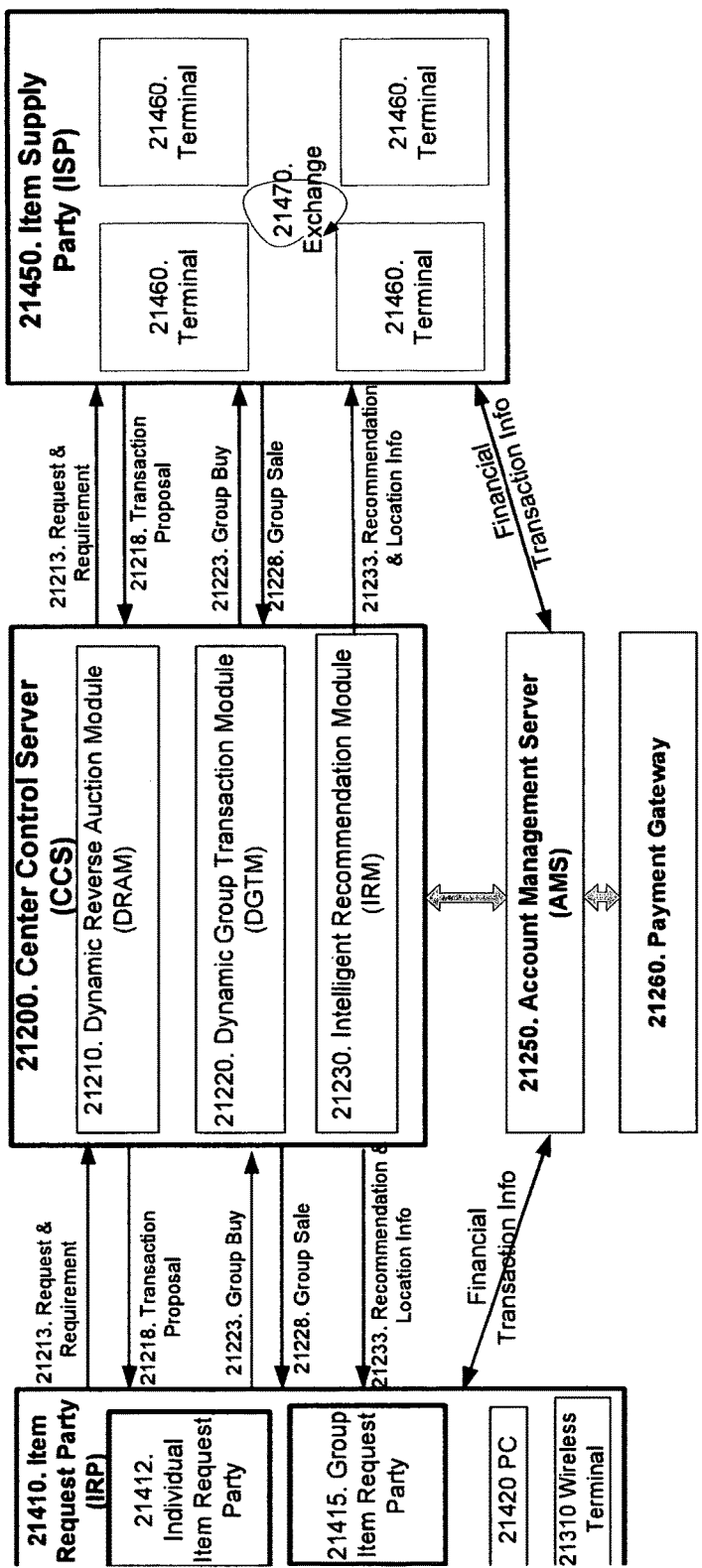
FIG. 22 is a block diagram illustrating an example of Center Control Server Modules in accordance with the present invention.
Figure 23:
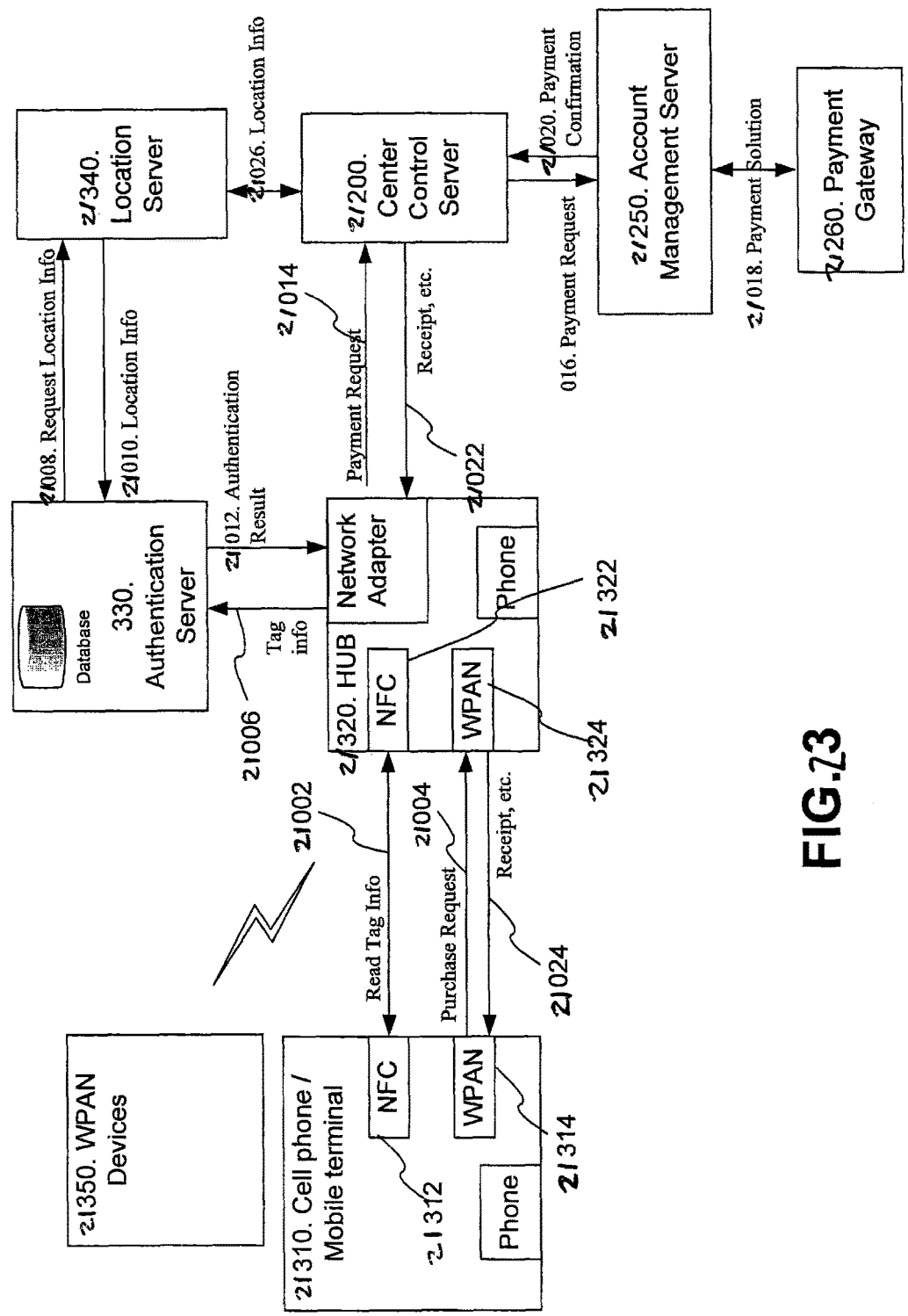
FIG. 23 is a block diagram illustrating an example of a wireless communication structure of a system in accordance with the present invention.

FIG. 22 is a block diagram illustrating the Center control Server 21200 configured to provide an information platform for the information process. In this embodiment, the system provides registered users with user terminals 21460, 21310 and 21420. IRP request information is from Center Control Server to ISPs' terminals according to ISPs' particular needs. Users can access their terminals from a server, a wireless terminal, and the like. Account Management Server 21250 manages the payment of the transaction based on the mechanism described in FIG. 25. Intelligent Recommendation Module 21230 provides the users with information related to the transaction such as market competition information and transaction parties' credit and location information. Dynamic Reverse Auction Module 21210 and Dynamic Group Transaction Module 21220 manage the transaction information process.

Figure 26:
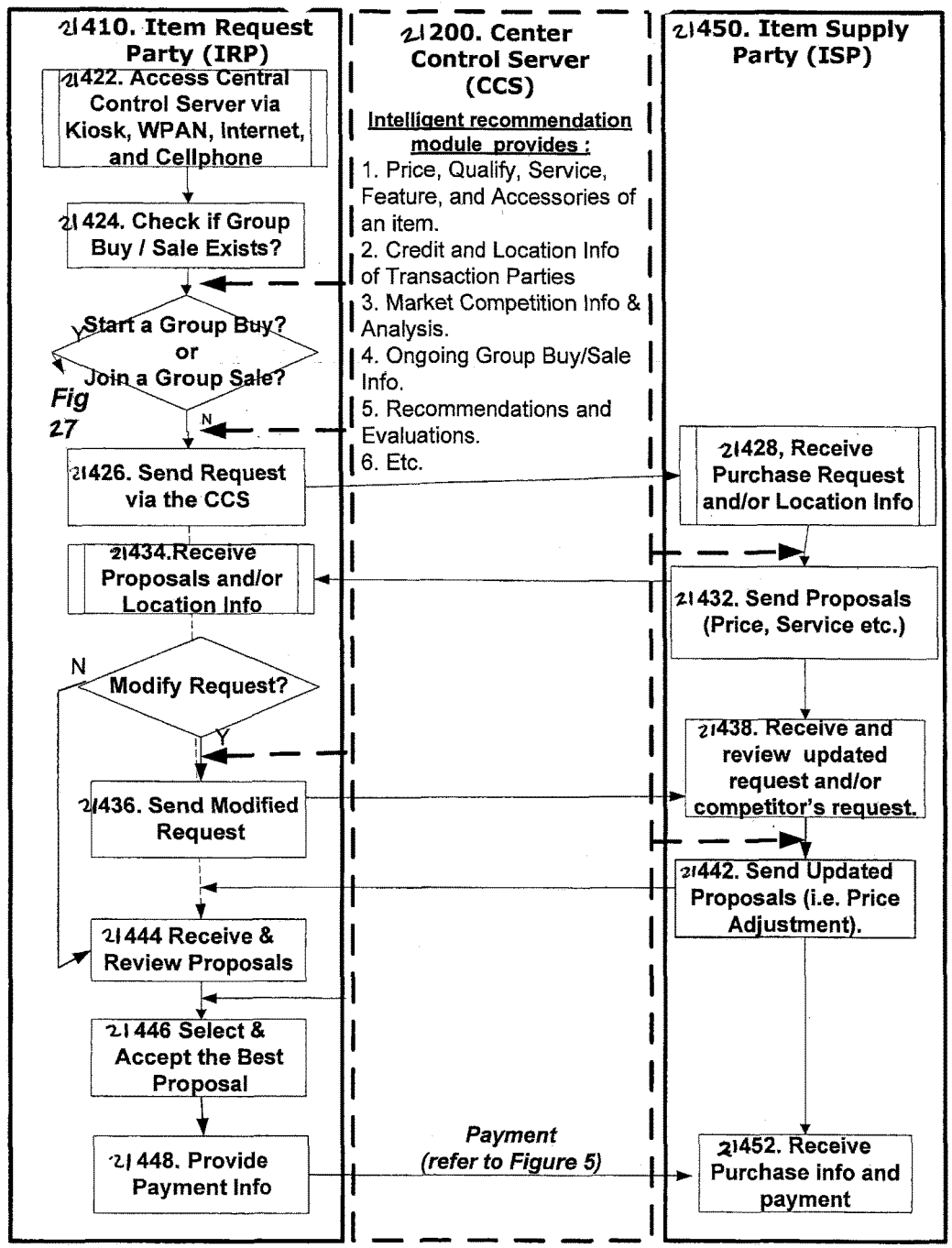
FIGS. 26 and 27 are functional block diagrams illustrating processes in accordance with the present invention.
Figure 27:
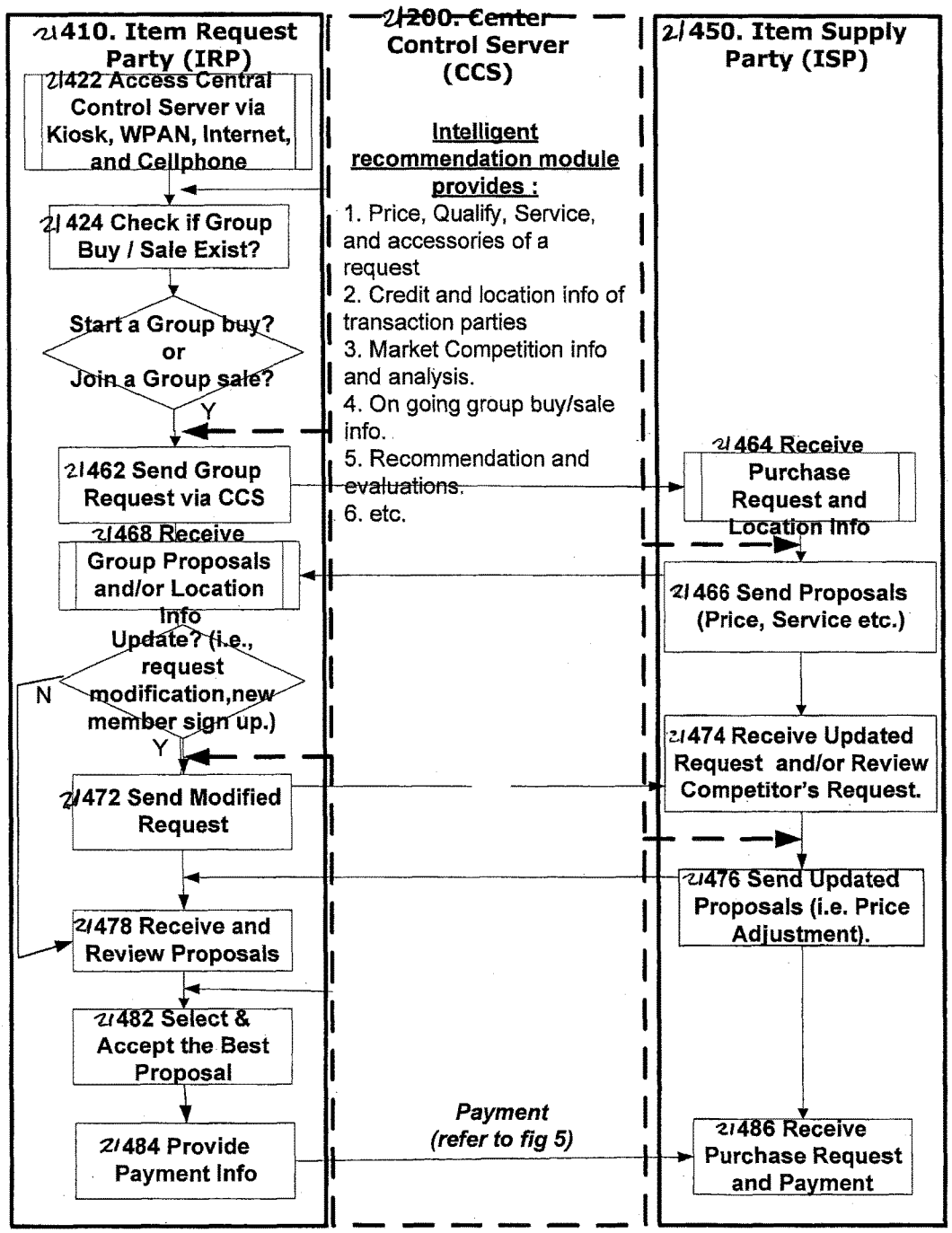
Figure 28:
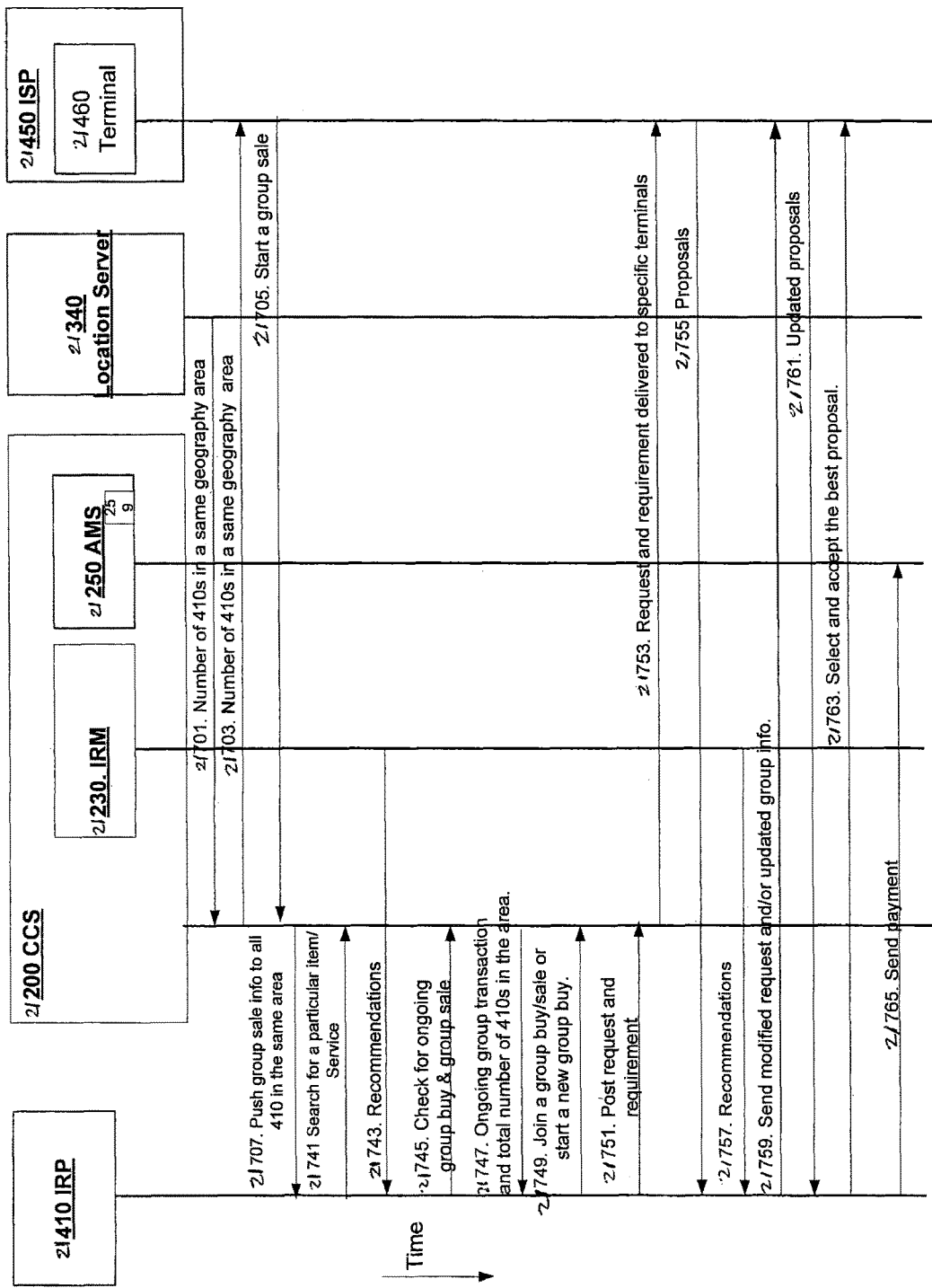
FIG. 28 is an event diagram illustrating an example of information flow in accordance with the present invention.

FIGS. 26 and 27 illustrate an example of information flow among the Item Request Party (IRP) 21410, center control server (CCS) 21200, Location Server (21340), and Item Supply Party (ISP) 21450. In the invented system, ISPs bid instead of IRPs. In addition, the IRP leads the bidding process by submitting (step 21426) and modifying (step

21436) requests and requirements of items or services. The ISPs, at their customized terminals, access IRP's requests (step 21428), submit transaction proposal/offers (step 21432), and monitor the competitors' proposals and modification of requests in real time (step 21438). The requests and requirements may alter during the process according to the real-time competition information (step 21436). During the real time progress of the information process, the Center Control Server (CCS), via Intelligent Recommendation Module (IRM) 21230, provides IRPs and ISPs with market competition information pertaining to IRP's requests and ISP's proposals including but not limited to prices from market competitors, quality, accessories of the requested items or services, credit rating and locations of transaction parties, analysis and recommendations, and ongoing bidding activities and group buy/sale negations related with the requests and proposals.

Figure 29:
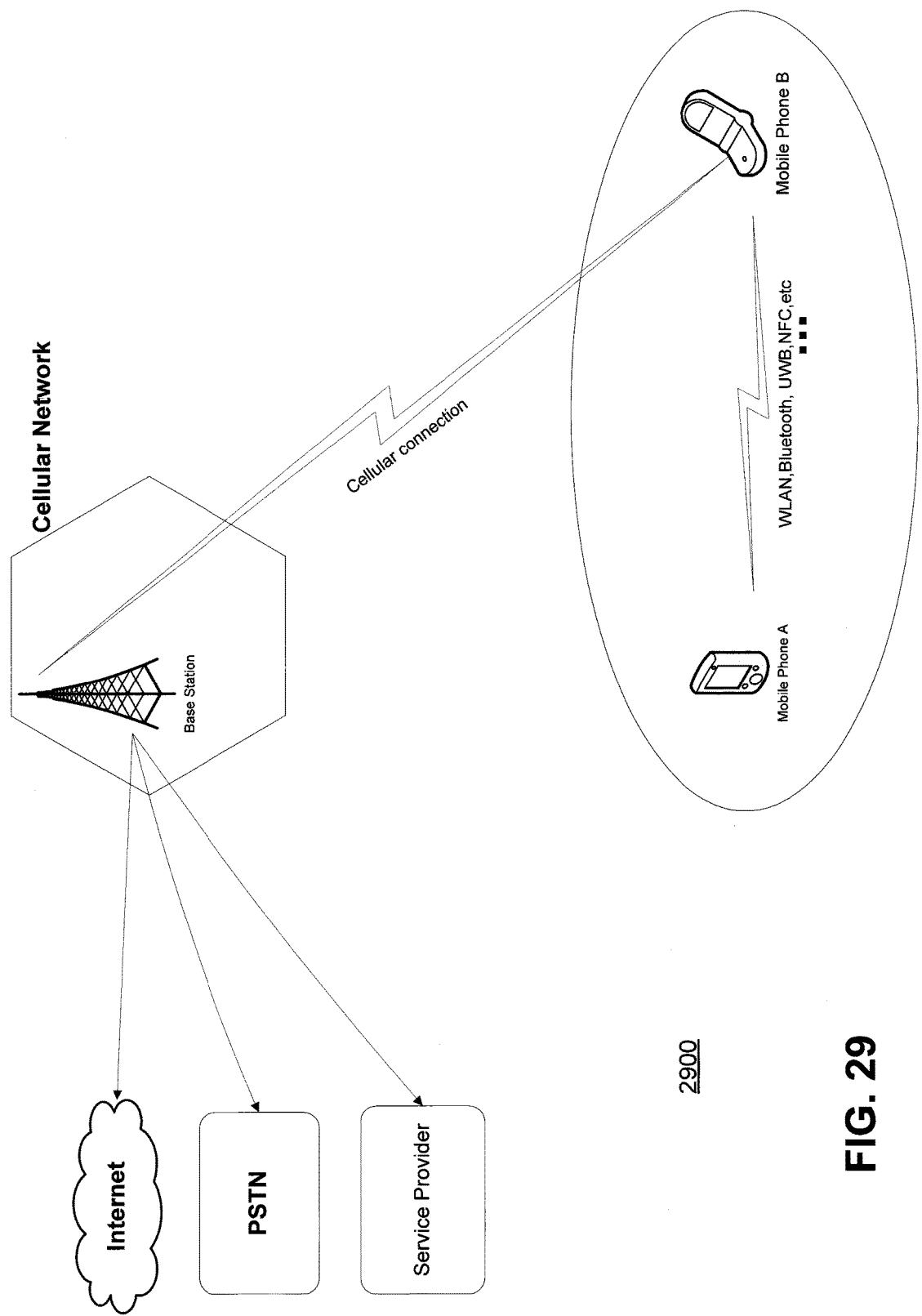
FIG. 29 illustrates an example of a system that facilitates efficient communication access by a mobile terminal.

FIG. 29 illustrates an example of a system 2900 that facilitates efficient communication access by a mobile terminal (e.g., mobile phone A). This may be useful where the user of the mobile terminal A cannot adequately access their assigned cellular network, but where they still want to make or receive a call or data exchange using the cellular network. It may also be useful where the user can adequately access the cellular network, but does not wish to apply direct cellular network access because of the availability of an easier-to-access local access point and corresponding resources.

There are a variety of reasons why a mobile terminal might not be able to adequately access the cellular network directly. For example, the mobile terminal may be unable to communicate with a cellular network base station because of a bad communication situation such as a deep fade due to multipath, shadowing, and/or the Doppler effect. Many users are familiar with situations where their mobile has no signal coverage from any cellular base station. Also, the capacity of a cell may be full. Other situations may also be present, such as battle field conditions, power outages or emergencies where an unusual number of people attempt to access the network, etc.

According to one example, in this system 2900 another mobile terminal B may be in a good communication situation with respect to its cellular network. Additionally, this mobile terminal B is preferably within a short range communication distance with the mobile terminal A. In this fashion, the first mobile terminal A uses the second mobile terminal B as a relay point to reach a cellular network base station.

A variety of communication techniques may be used for the communication between mobile terminal A and mobile terminal B, including but not limited to WiFi, Bluetooth, UWB, RFID, Infrared communication, etc.

Preferably, although the mobile terminal A uses mobile terminal B as a relay to the cellular network, the relay is transparent, so that the user of mobile terminal A uses the mobile terminal in the same fashion that they would during ordinary direct communications that go over the cellular network. Thus, for example, the user of terminal A simply dials a telephone number corresponding to a remote terminal device user (regular phone, cellular phone, etc.) and the call is completed, without requiring the user to engage in additional communications or with additional interfaces in order to carry out the communication process. Terminal A will typically pair with Terminal B before the communication process using a communication such as a point-to-point Bluetooth communication. Once they are paired, one of the terminals (e.g., B) may operate as a wireless access point for the other terminal (e.g., A). Thus, from the perspective of the user of mobile terminal A, the usage and communication functionality would still appear to be that of normal usage involving the cellular network. In the example of a telephone call, this would involve the user observing and interacting with, for example, a touch screen depiction of the phone keypad just as they would during normal usage.

Similarly, incoming calls would be routed to and received by the mobile terminal A as though the normal communication using the cellular network were being implemented. Thus, a remote user of another mobile device (phone, cell phone, etc.) would dial the regular number assigned to mobile terminal A, and the call would be received at mobile terminal A accordingly.

From the perspective of the cellular network, the communications preferably appear to be coming from the mobile terminal A as though they were coming directly from the mobile terminal A in a regular cellular communication. In order to carry this out, mapping and routing are implemented so that the communications are directed between the mobile terminal A through the relay involving the mobile terminal B and ultimately through to the cellular network.

Mapping and routing are variously described herein, including but not limited to FIG. 16 as described above. It should be noted that the mapping and routing functions may reside at various locations, including within mobile terminal A, within mobile terminal B and/or within an intermediate system such as the MC system as described herein.

In one example, the mapping table inside the MC system accommodates cross-matching of the phone number and SIM card between mobile terminal A and mobile terminal B. Authentication of the SIM card and corresponding communications of any necessary key information may be made between the cellular network and the mobile terminal A using the relay communication. If desired, a secondary encryption may be used for the communications between mobile terminal A and mobile terminal B, if such an authentication is desired by the cellular network service provider. Whether this is required or not, the necessary communications to authenticate user access are provided through the relay communication and according to the mapping tables.

It should be noted that due to current pragmatic considerations, it is preferable that mobile terminal A and mobile terminal B have the same cellular service provider. This preference, however, is dependent up logistics and constraints among the users and their cellular service providers. With system access constraints removed, an alternative environment involves the mobile terminal A and mobile terminal B having different service providers.

According to this alternative, provided that both users have cooperating service providers, mobile terminal A may use mobile terminal B despite the two users having different cellular service providers. To carry out this alternative, the cellular base station may be equipped to deal with relayed communications, or the mapping may include fields corresponding to the first and second mobile terminals involved in the relayed communication, so that the communications may be directed accordingly.

Figure 30:
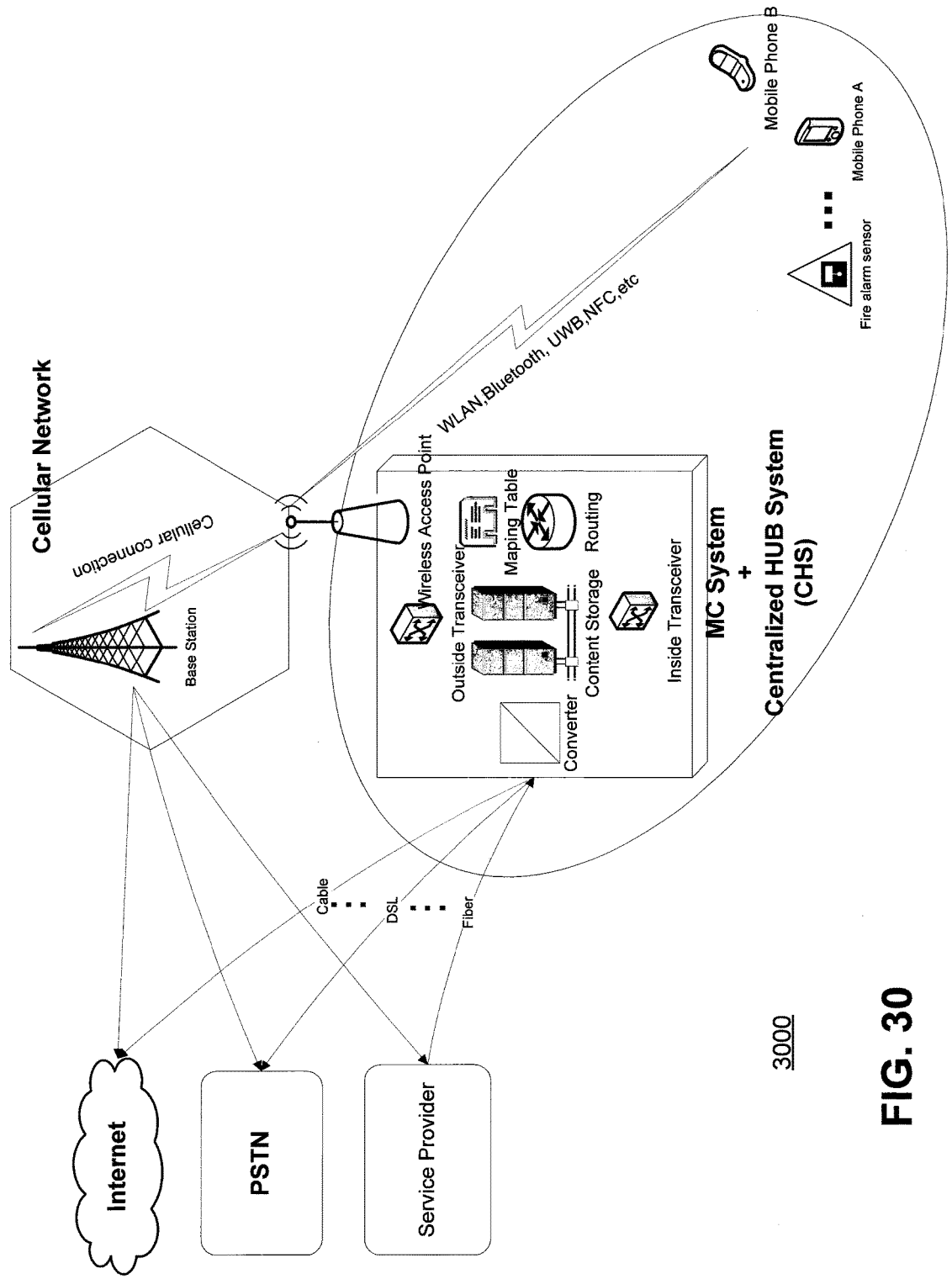
FIG. 30 illustrates an example of a system wherein a modified WIFI access point provides a relay point for a mobile terminal.

FIG. 30 illustrates another example of a system 3000, wherein a modified WIFI access point provides a relay point for mobile terminal A.

This system 3000 may be useful under the same potential situations with regard to direct cellular network access by mobile terminal A as described above. For example, the reception may be very poor, etc.

Here, a WIFI access point is available for mobile terminal A. Mobile terminal A uses the WIFI access point as a relay point to reach a base station, or to be connected with a PSTN network, or to be connected with high speed internet.

As described regarding FIG. 29, mapping and routing are provided to carry out the relayed communication, and the mapping may again be provided by the MC system. In one example, the mapping table inside the MC system cross-matches the MAC address and the unique physical address (e.g., SIM card) between the modified WIFI access point and the mobile terminal A. Also, the MC system is configured to accommodate whatever SIM card related authentication of mobile terminal A is required by the cellular network.

At some point in the relayed communication, a communication with the cellular network is made. To do this, the WIFI access point may be equipped with cellular network communication capability as illustrated in the figure. It should be understood, however, that the communication may be transmitted away from the WIFI access point to another location that is more convenient or suitable for cellular network access. All of the same principles of relaying, mapping and corresponding communications described herein still may apply to such an alternative.

The intention of the MC system and corresponding relayed communications is not to merely provide VOIP to the mobile terminal A. Instead, with the relayed communication and corresponding techniques as described herein, the mobile terminal A can receive phone calls from anywhere and can also call any one without requiring the user to engage in advance administrative procedures such as logging into a system, etc.

It should also be appreciated that mobile terminal A can seamlessly roam from the cellular network to the WIFI access point. Thus, the user of mobile terminal A may use the mobile terminal A normally while outside the WIFI access point location (home, or office, or whatever location the WIFI access point is servicing). However, once the mobile terminal A enters the range of the WIFI access point, the mobile terminal A may be switched to accessing the WIFI access point. This technique may be used to enhance the data receiving capabilities of the mobile terminal A, and to allow a reduction of the number of terminals directly accessing the cellular network base station for calls or other cellular network demands, when it is not necessary to do so. Significantly, this allows the cellular network provider to potentially re-direct the relay communication to accommodate base station demand management. That is, supposing that a lot of callers are using cellular network base station X, and that a user of mobile terminal A is within WIFI access point range. Base station X is also the closest cellular network base station, and would normally be the base station through which mobile terminal A would gain access to the cellular network for calls, etc. According to this aspect of the invention, with the mobile terminal A accessing the network through the relayed communication involving the WIFI access point, and the mapping information provided by the MC system, the communications to and from mobile terminal A may be directed to another base station, without ever having to burden base station X (even for any initial portion of the communication whatsoever).

Other than being equipped in order to carry out communications with the cellular base station as described above, and to include the MC system functionality as described herein, a WIFI access point that is equipped as the relay point may be as is otherwise provided. For example, the WIFI access point may be a multipurpose device as provided by a cable internet service provider, with the additional functionality of cellular communication capability and corresponding MC System functionality.

As illustrated in FIG. 30, the communication between mobile terminal A, mobile terminal B and/or sensors in the location serviced by the wireless access point may be WLAN, Bluetooth, UWB, NFC, etc., or any combination thereof.

The MC System and CHS of FIG. 30, or the MC System as described in connection with FIG. 29, may be provided as an apparatus that comprises a processor and memory. The memory includes program code executable by the processor to perform the operations for directing a relayed communication to the cellular network as described herein. The program code may also be stored on the memory, or any non-transitory computer readable medium (e.g., RAM, CD-ROM, magnetic disk, etc.).

Figure 31:
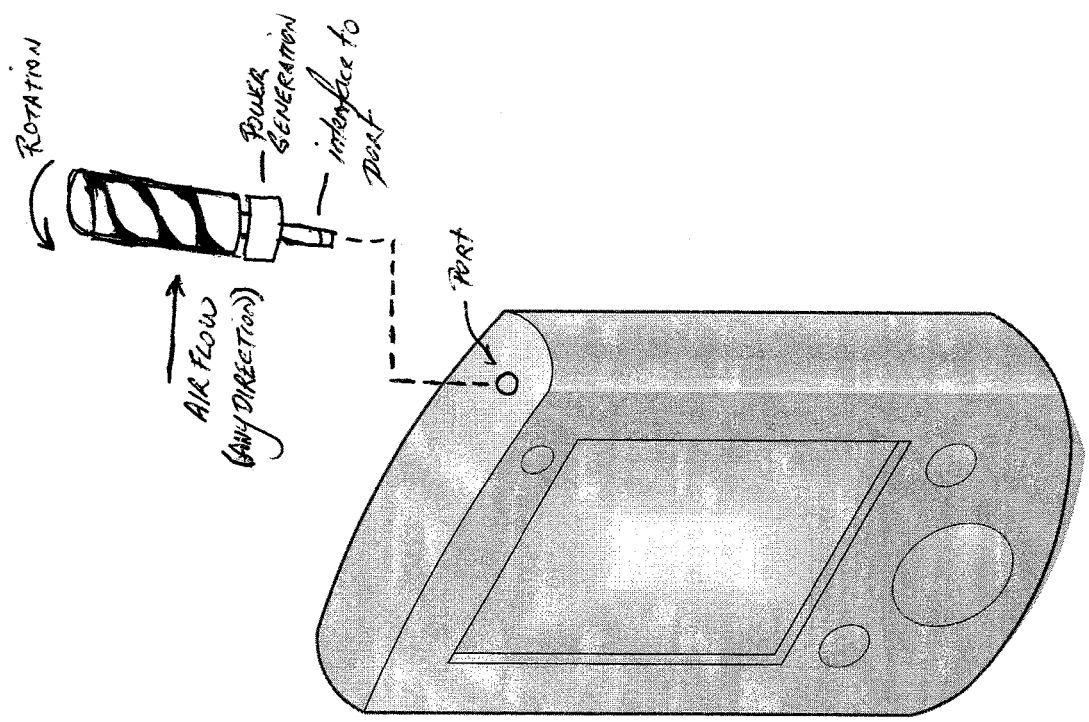
FIG. 31 is a schematic diagram illustrating a mobile terminal such as a cellular phone that is equipped to interface with a wind-powered alternative energy generation device.

FIG. 31 is a schematic diagram illustrating a mobile terminal such as a cellular phone that is equipped to interface with a wind-powered alternative energy generation device. The wind-powered alternative energy generation device includes an external rotational element that is configured to rotate when exposed to moving air. As evident from the figure, the rotational element may preferably be such that it is not directionally dependent. In other words, the device does not need to be pointed in a particular direction corresponding to the incoming wind. The wind-powered alternative energy device also includes an interface that preferably interfaces with a conventional input ("port") through which the mobile terminal device ordinarily may receive power through conventional alternative devices such as USB power cords. The wind-power alternative energy device includes the rotational component that rotates to drive a power generator within a power generation portion, which in turn delivers power to the mobile terminal device through the port.

The power generated by the wind-powered alternative energy device is dependent upon the rotational rate delivered to the power generation portion as well as the dimensions (radius, length) of the power generating components within the power generation portion.

When the mobile terminal is very low on power, the wind-powered alternative energy generation device may be used as an alternative source of power so that the user may make or receive an emergency call.

Although illustrated in connection with a mobile terminal device, the wind-power alternative energy device is also useful for providing power to residential or commercial properties located in isolated areas and/or where wind is normally available.

According to another aspect, this present invention facilitates negotiation and competition among transaction parties using user's location information. Center Control Server obtains the location information from Location Server. With the location information of IRP, certain request and requirement are sent only to ISP close to the IRP. Further, the location information of IRP is used to initiate "group buy" request (step 21462 in FIG. 27) by IRP within a same geographical location. According to this embodiment, individual IRP with similar demand may organize into groups and negotiate with ISPs collectively. Further, ISP can use the IRP's location information to organize "group sale" by outputting discount group sale information only to the IRP located in a same geographical area via Center Control Server. One application of this invention is in retail industry: retail buyers pay discount price available only for bulk purchase and manufacturers benefit from increased sale, reduced cost and improved operation efficiency.

In the process of transaction information, the formation of group is integrated into the process of ISP's bidding and IRP's request modification. In step 21472 in FIG. 27, the variables of group purchase request modified include group formation requirement and information such as the time left before the deal is closed, size of the group, price, quantity, quality, services, and accessories of the item requested, etc. These variables alter simultaneously and continuously and affect the change of each other. The related market competition information and recommendations are sent to the IRPs and ISPs from Center control Server. And the two transaction parties monitor the status of information variables of the competition real time.

This embodiment of the invention significantly improves the static reverse bidding process in applications. The dynamic feature of the negotiation process enables ISPs and IRPs to locate each other most efficiently and effectively eliminating traditional distribution channels and layers of middlemen and bypassing obstacles presented by time and space.

A good application of this aspect of invention is in E-commerce. With the invented process, the buyers buy the most optimum products with the best price based on real time competition among sellers in the global context. Since the buyers themselves define requests and product requirements, sellers are able to target the clientele effectively. In addition, the sellers' benefits are beyond being informed of market demand real time—they are able to update the customers of the latest product information through their terminals.

The location information of the users provided by Location Server can be used to start a "group buy" bidding by IRPs in a same geographical area, e.g. skiers at a ski resort. Furthermore, an IRP can initiate a dynamic reverse auction among ISPs from a designated geographical area. In addition, ISP can select IRPs according to IRPs locations to promote "group sale" products or services. Critically, according to users' location information, the location of the nearby wireless HUBs along with the information of ongoing bidding, negotiation, and group transaction promotion processed by the system are sent to user's terminals. Last but not least, the user's location information is used to authenticate a user and/or restrict his activities in a geographical area such as withdrawing money from some wireless HUBs.

Besides location information, the request and transaction proposals can be sent to ISPs according to other criteria. Exclusive ISP receives information that is blocked to his competitors. Further, ISPs can be categorized into classes for receiving market demand and competition information of varied level of quality and/or at different time interval.

Another embodiment of the invention provides transaction parties to trade by exchanging their products and services without monetary transactions. This embodiment of invention also provides credits or a system currency for circulation among the users.

In another embodiment of the invention, a user's participation of the transactions or programs processed at the system is motivated through system credit or other kind of reward. The system credit is used among system users for trading goods, services. The credit is calculated with a rate, which increases with acceleration based on the participation of the user or the credit accumulated through participation. The rate can also be determined together with other variables such as user's participation of an ongoing promotion or the number of system users referred.

One embodiment of the invention is that an immediate acceptance price for IRP's request is indicated and/or a corresponding deposit is made in an escrow account managed by the Account Management Server. As soon as an ISP proposes a transaction that meets the immediate acceptance price, the transaction is confirmed and the deposit is transferred to an ISP's account.

The above applications of the disclosed method and system are merely example of the invention, provided for the sake of completeness and for the education of the reader by way of concrete examples. The invention can be embodied in various forms and applied in different industry sectors. Combinations and sub-combinations of the various embodiments described above will occur to those familiar with this field, without departing from the scope and spirit of the invention. Therefore, the following claims should not be limited to the description of the embodiments or otherwise constrained in any way to the details of implementation.

Thus embodiments of the present invention produce and provide multimedia communications between different terminals. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A management system comprising:
a centralized hub system comprising an encoder, and a decoder,
the centralized hub system being associated with a unique hub identifier stored in at least one mapping table, the centralized hub system configured to:
    receive, through a wireless communication network, an information content requested by a user in connection with identification of the centralized hub system based on recognition of the unique hub identifier, the information content carried by a compressed digital video signal;
    perform a conversion of the compressed digital video signal, the conversion comprising decompressing, by the decoder, the compressed digital video signal to a decompressed digital video signal, further followed by encoding, by the encoder, the decompressed digital video signal to produce an encoded decompressed digital video signal for transmission through a high definition digital output interface to accommodate production of the information content on a high definition digital television; and
    communicate information for managing a household item status of a household item in conjunction with a short range wireless communication regarding an updated status of the household item, the short range wireless communication comprising a wireless signal, the wireless signal comprising information corresponding to a unique identifier associated with the household item.

2. The management system of claim 1, wherein the wireless communication network is a wireless local area network (WLAN); and wherein the centralized hub system is further configured to communicate the information through the WLAN for said managing the household item status.

3. The management system of claim 1, wherein the centralized hub system is further configured to receive information about a user's request for a multimedia information content for production by a digital television;
    wherein the management system is configured to perform a processing of the user's request for the multimedia information content in association with transmission of the multimedia information content to the digital television through a high definition multimedia interface (HDMI) for said production.

4. The management system of claim 3, wherein the management system is further configured to search a content server for the multimedia information content; and wherein the management system is further configured to route the multimedia information content to accommodate said production by the digital television.

5. The management system of claim 1, wherein the short range wireless communication is triggered by a detection, by a sensor, of the updated status.

6. The management system of claim 1, wherein the short range wireless communication is a Zigbee communication.

7. The management system of claim 1, wherein the short range wireless communication is a Bluetooth communication.

8. The management system of claim 1, wherein the management system further comprises a software configured to provide a data package from a cellular phone in initiating communications with a management center system that are directed to destination devices, the software being configured for installation on the cellular phone; and wherein the centralized hub system is one of the destination devices.

9. The management system of claim 8, wherein the data package comprises information for a network address corresponding to the centralized hub system and information for the unique hub identifier.

10. The management system of claim 9, wherein the management system is further configured to search a content server for the information content; and wherein the management system is further configured to route the information content according to the network address.

11. The management system of claim 8, wherein a unique identifier of the cellular phone is registered in the at least one mapping table and associated with the unique hub identifier.

12. The management system of claim 8, wherein a unique identifier corresponding to each of the destination devices is registered in the at least one mapping table and associated with a network address for each of the destination devices.

13. The management system of claim 12, wherein a unique identifier corresponding to each of the destination devices is associated with an appropriate communication protocol and a signal format for communications.

14. The management system of claim 1, wherein the centralized hub system is further configured to receive a purchase request for a product or a service from a user; and wherein the management system is configured to perform a processing of the purchase request based on authentication of the user.

15. The management system of claim 14, wherein the processing of the purchase request comprises identifying payment information for the purchase request in connection with identifying the user.

16. The management system of claim 15, wherein the processing of the purchase request further comprises sending the payment information through a payment gateway for the processing of the purchase request.

17. The management system of claim 1, wherein the wireless communication network is a wireless local area network.

18. The management system of claim 1, wherein the high definition digital output interface is configured to connect to a cable to transmit the encoded decompressed digital video signal.

19. The management system of claim 18, wherein the high definition digital output interface is a high definition multimedia interface (HDMI).

20. The management system of claim 18, wherein the centralized hub system is configured to receive power directly from the high definition digital television through a cable connection.

21. The management system of claim 20, wherein the high definition digital output interface is a high definition multimedia interface (HDMI).

22. The management system of claim 18, wherein the decoder and the encoder are included in a mobile terminal; and wherein the mobile terminal is further configured to receive power via the cable through the high definition digital output interface and to transmit the encoded decompressed digital video signal through the high definition digital output interface to the cable.

23. The management system of claim 22, wherein the mobile terminal is configured to receive the power to support said encoding and said decompressing.

24. The management system of claim 22, wherein the high definition output interface comprises modification on a charger interface of the mobile terminal to facilitate receiving the power.

25. The management system of claim 1, wherein the centralized hub system is configured to receive the information content from a mobile terminal.

26. The management system of claim 25, wherein the high definition digital output interface is a high definition multimedia interface (HDMI).

27. The management system of claim 26, wherein the centralized hub system is configured to receive power directly from the high definition digital television through a cable connection.

28. The management system of claim 1, wherein the centralized hub system is configured to receive power directly from the high definition digital television to support said conversion.

29. The management system of claim 1, wherein the centralized hub system is included in a user terminal.

30. The management system of claim 29, wherein the user terminal is a cellular phone.

31. The management system of claim 1, wherein the centralized hub system is included in a set top box.

32. The management system of claim 1, wherein the management system is further configured to route data between a digital television and a cellular phone.

33. The management system of claim 1, wherein management system is configured to receive and transmit a video content from a video camera.

34. The management system of claim 33, wherein the video content is encrypted.

35. The management system of claim 1, wherein the management system is further configured to:
receive a multimedia signal;
determine, a communication protocol, a signal format, and an address of a destination;
convert the multimedia signal to produce a converted signal for production of a corresponding multimedia information content at the destination according to the determined signal format; and
route, the converted signal to the destination based on the address and the communication protocol.

36. The management system of claim 35, wherein the corresponding multimedia information content is the information content; and wherein the destination is the centralized hub system.

37. The management system of claim 1, wherein the centralized hub system is configured to receive the short range wireless communication through a Zigbee connection.

38. The management system of claim 1, wherein the wireless communication network is a cellular communication network.

39. The management system of claim 1, wherein the centralized hub system comprises a Wifi router.

40. The management system of claim 1, wherein the management system comprises a content server; wherein the content server comprises commercial incentive information; and wherein the management system is configured to send the commercial incentive information to the user based at least in part on a relevance of the commercial incentive information with the information content requested.

41. The management system of claim 1, wherein a request for the information content is received from a cellular phone.

42. The management system of claim 1, wherein a request for the information content is received from a cellular phone; and where a unique identifier of the cellular phone is associated with the unique hub identifier.

43. The management system of claim 1, wherein the centralized hub system is configured to collect usage information.

44. The management system of claim 43, wherein the usage information comprises utility information.

45. The management system of claim 1, wherein the centralized hub system is further configured to communicate the information for managing the household item status to a 911 center.

46. The management system of claim 1, wherein the centralized hub system is configured to receive the short range wireless communication through a Bluetooth connection.

47. The management system of claim 1, wherein the information content is a news.

48. The management system of claim 1, wherein the centralized hub system is further configured to receive the short range wireless communication.

49. The management system of claim 1, wherein the short range wireless communication is a fire alarm or a theft alarm.

50. The management system of claim 1, wherein the management system is further configured to send a notification regarding the updated status to a user terminal.

51. The management system of claim 50, wherein management system is configured to send the notification to a cellular phone.

52. The management system of claim 1, wherein the management system is configured to notify a user of the updated status according to a configuration setting; and
wherein the configuration setting specifies when or how to notify the user of the updated status.

53. The management system of claim 1, wherein the management system is configured to notify a user of the update status according to a configuration setting; and
wherein the configuration setting specifies when and how to notify the user of the updated status.

54. The management system of claim 1, wherein the management system is configured to perform a security process or an error correction on the information content.

55. The management system of claim 1, wherein the management system is configured to perform a virus screening on the information content.

56. The management system of claim 1, wherein the management system is configured to:
monitor a request for the information content; store the information content that is determined to be locally applicable based upon monitoring of the request.

57. The management system of claim 56, wherein the management system is configured to refresh stored information contents based on an updated monitoring of the request.

58. The management system of claim 1, wherein the management system is configured to route the information content from a content server that is logically approximate to the user of the centralized hub system.

59. The management system of claim 58, wherein the content server is determined as being logically proximate based on at least one of the following:
a bandwidth resource for sending the content;
a home location associated with the centralized hub system;
a location of a base station through which the information content is routed;
a location of a base station associated with the centralized hub system;
a dedicated resource for transmitting the information content;
a location of a base station through which the request for the information content is transmitted; or
comparing a location of the centralized hub system with a location identified for the information content.

60. The management system of claim 1, wherein the short range wireless communication is initiated by a detection of the updated status; and wherein the short range wireless communication is through a Zigbee communication channel.

61. The management system of claim 1, wherein the short range wireless communications is initiated by a detection of the update status; and wherein the short range wireless communication is through a Bluetooth communication channel.

62. The management system of claim 1, wherein the short range wireless communication is initiated by a detection of the update status.

63. The management system of claim 1, wherein the centralized hub system is configured to receive a phone call through a cellular base station, the phone call being directed to a user of the centralized hub system.

64. The management system of claim 1, wherein the centralized hub system is configured to receive an instruction of making a call to a cellular phone and communicate a data from the cellular phone to accommodate the phone call.

65. A non-transitory computer readable medium storing program code executable by a processor to accommodate information communication and management, the program code including instructions comprising:
instructions for receiving, by a central hub system, a multimedia signal through a wireless communication network, the multimedia signal comprising a compressed digital video signal;
instructions for decompressing, by the centralized hub system, the compressed digital video signal to a decompressed digital video signal;
instruction for encoding, by the centralized hub system, the decompressed digital video signal to produce an encoded decompressed digital video signal for transmission through a high definition digital output interface to accommodate production of a corresponding multimedia content on a high definition digital television;

instructions for transmitting, by the centralized hub system, the encoded decompressed digital video signal to the high definition digital television through the high definition digital output interface and through a cable, the high definition digital output interface connected to the cable;

instructions for communication, by the centralized hub system, information for managing an item status of an item based on a signal regarding an updated status of the item, the signal being triggered by a detection of the updated status, the signal comprising information corresponding to a unique identifier associated with the item.

66. The non-transitory computer readable medium storing program code of claim 65, wherein the high definition digital interface is a high definition multimedia interface (HDMI).

67. The non-transitory computer readable medium storing program code of claim 65, wherein the centralized hub system is included in a user terminal; wherein the instructions further comprise: instructions for receiving power by the user terminal through the cable and through the high definition digital interface; and wherein the encoded decompressed digital video signal is transmitted, through the high definition digital output interface to the cable, for said production of the corresponding multimedia content on the high definition digital television.

68. The non-transitory computer readable medium storing program code of claim 65, wherein the instructions further comprise: instructions for receiving a phone call through a cellular base station, the phone call being directed to a user of the centralized hub system.

69. The non-transitory computer readable medium storing program code of claim 65, wherein the multimedia signal is received through a cellular network.

70. The non-transitory computer readable medium storing program code of claim 65, wherein the multimedia signal is received from a mobile terminal.

71. The non-transitory computer readable medium storing program code of claim 65, wherein the multimedia signal is received from a wireless local area network.

72. The non-transitory computer readable medium storing program code of claim 65, wherein the instructions further comprise: instructions for receiving power directly from the high definition digital television through a cable connection to support the decompressing and the encoding.

73. The non-transitory computer readable medium storing program code of claim 65, wherein the multimedia signal is received from a cellular phone.

74. The non-transitory computer readable medium storing program code of claim 73, wherein the high definition digital output interface is a high definition multimedia interface (HDMI).

75. The non-transitory computer readable medium storing program code of claim 65, wherein the instructions further comprise: instructions for receiving power through a cable; and wherein the encoded decompressed digital signal is transmitted, through the cable, for said production on the high definition digital television.

76. The non-transitory computer readable medium storing program code of claim 65, wherein the instructions further comprises instructions for receiving, by the centralized hub system, the signal regarding the updated status.

77. The non-transitory computer readable medium storing program code of claim 76, wherein the signal is received through a short range wireless communication.

78. The non-transitory computer readable medium storing program code of claim 77, wherein the short range wireless communication is a Zigbee communication.

79. The non-transitory computer readable medium storing program code of claim 77, wherein the short range wireless communication is a Bluetooth communication.

80. The non-transitory computer readable medium storing program code of claim 76, wherein the signal is received through a wireless local area network.

81. A centralized hub system comprising:
an input interface configured to receive a multimedia signal through a wireless communication network, the multimedia signal comprising a compressed digital video signal;
at least one processing unit configured to perform a conversion of the multimedia signal, and
a high definition digital output interface configured to connect to a cable,
wherein the conversion comprises decompressing, by a decoder, the compressed digital video signal to a decompressed digital video signal, further followed by encoding, by an encoder, the decompressed digital video signal to produce an encoded decompressed digital video signal for transmission through the high definition digital output interface to accommodate production of a corresponding multimedia content on a high definition digital television;
wherein the centralized hub system is further configured to transmit the encoded decompressed digital video signal to the high definition digital television through a predetermined communication channel in conjunction with a navigational command for the predetermined communication channel, the predetermined communication channel being the high definition digital output interface connected to the cable;
wherein the navigational command is from a channel button;
wherein the centralized hub system is further configured to communicate information for managing an item status of an item based on a signal regarding an update status of the item, the signal being triggered by a detection of the updated status; and
wherein the signal regarding the updated status of the item comprises information corresponding to a unique identifier associated with the item.

82. The centralized hub system of claim 81, wherein the centralized hub system is further configured to receive power through the high definition digital output interface and through the cable.

83. The centralized hub system of claim 82, wherein the centralized hub system is further configured to communicate the information for managing the household item status to a cellular phone.

84. The centralized hub system of claim 81, wherein the centralized hub system is a user terminal.

85. The centralized hub system of claim 81, wherein the centralized hub system is included in a cellular phone.

86. The centralized hub system of claim 81, wherein the wireless communication network is a cellular communication network.

87. The centralized hub system of claim 81, wherein the multimedia signal is received from a mobile terminal.

88. The centralized hub system of claim 81, wherein the centralized hub system is further configured to receive power directly from the high definition digital television through a cable connection.

89. The centralized hub system of claim 88, wherein the high definition digital output interface is a high definition multimedia interface (HDMI).

90. The centralized hub system of claim 89, wherein the multimedia signal is received from a mobile terminal.

91. The centralized hub system of claim 81, wherein the centralized hub system is further configured to receive the signal regarding the updated status of the item through a short range wireless communication.

92. The centralized hub system of claim 91, wherein the centralized hub system is further configured to receive the signal regarding the updated status of the item through a wireless local area network.

93. The centralized hub system of claim 91, wherein the short range wireless communication is a Zigbee communication.

94. The centralized hub system of claim 91, wherein the short range wireless communication is a Bluetooth communication.

95. The centralized hub system of claim 81, wherein the centralized hub system further comprises a software configured to provide a data package from a cellular phone in initiating communications with a management center system that are directed to destination devices, the software being configured for installation on the cellular phone; and wherein the centralized hub system is one of the destination device.

96. The centralized hub system of claim 95, wherein the data package comprises information for a network address corresponding to the centralized hub system and information for a unique identifier of the centralized hub system.

97. The centralized hub system of claim 81, wherein the centralized hub system is further configured to receive a purchase request a product or a service from a user; and wherein the centralized hub system is configured to perform a processing of the purchase request based on authentication of the user.

98. The centralized hub system of claim 81, wherein the wireless communication network is a wireless local area network.

* * * * *